(12) United States Patent
Laroia et al.

(10) Patent No.: US 8,306,541 B2
(45) Date of Patent: Nov. 6, 2012

(54) DATA RATE METHODS AND APPARATUS

(75) Inventors: Rajiv Laroia, Basking Ridge, NJ (US);
Hui Jin, Annandale, NJ (US); Tom Richardson, South Orange, NJ (US);
Junyi Li, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 781 days.

(21) Appl. No.: 11/230,331

(22) Filed: Sep. 19, 2005

(65) Prior Publication Data

US 2006/0203765 A1    Sep. 14, 2006

Related U.S. Application Data

(60) Provisional application No. 60/659,502, filed on Mar. 8, 2005, provisional application No. 60/701,469, filed on Jul. 20, 2005, provisional application No. 60/701,434, filed on Jul. 20, 2005, provisional application No. 60/701,468, filed on Jul. 20, 2005.

(51) Int. Cl.
*H04W 72/00* (2009.01)
*H04W 4/00* (2009.01)

(52) U.S. Cl. ............... 455/450; 455/455; 455/452.1; 455/452.2; 370/329

(58) Field of Classification Search .......... 455/418–420, 455/424, 561, 450–453, 455, 522; 370/232, 370/235, 328, 329, 335–336
See application file for complete search history.

(56) References Cited

U.S. PATENT DOCUMENTS

| | | | |
|---|---|---|---|
| 5,923,650 A * | 7/1999 | Chen et al. | 370/331 |
| 6,643,275 B1 | 11/2003 | Gustafsson et al. | |
| 6,661,777 B1 | 12/2003 | Blanc et al. | |
| 6,807,160 B1 | 10/2004 | Laroia et al. | |
| 6,807,426 B2 | 10/2004 | Pankaj | |

(Continued)

FOREIGN PATENT DOCUMENTS

EP      1 213 868      6/2002

(Continued)

OTHER PUBLICATIONS

Dong In Kim, Ekram Hossain, Vijay K. Bhargava; Dynamic Rate Adaptation Based on Multidimensional Multicode DS-CDMA in Cellular Wireless Networks, IEEE Transactions on Communications, vol. 51, Mo. 2, Feb. 2003, pp. 247-260.

(Continued)

*Primary Examiner* — George Eng
*Assistant Examiner* — Nam Huynh
(74) *Attorney, Agent, or Firm* — Donald C. Kordich

(57) ABSTRACT

A wireless terminal receives an uplink traffic channel segment assignment including a maximum uplink rate option indicator. Each uplink rate option corresponds to a number of information bits, coding rate and modulation method. The maximum rate option indicator indicates the highest rate option that the wireless terminal is permitted to use when transmitting in the assigned traffic channel segment from the perspective of the base station. In some embodiments, the wireless terminal uses interference measurements to further quality, e.g., conditionally reduce, the maximum uplink rate option that may be used. Then, the wireless terminal selects an uplink rate option to use which is less than the determined allowed maximum uplink rate option, e.g., based on the amount of user data to communicate. The wireless terminal transmits data in the assigned uplink traffic channel segment in accordance with the wireless terminal selected uplink rate.

46 Claims, 38 Drawing Sheets

U.S. PATENT DOCUMENTS

| | | | |
|---|---|---|---|
| 6,889,050 B1 | 5/2005 | Willars et al. | |
| 6,920,192 B1 | 7/2005 | Laroia et al. | |
| 7,013,143 B2 | 3/2006 | Love et al. | |
| 7,193,982 B2 | 3/2007 | Frerking et al. | |
| 7,346,035 B2 | 3/2008 | Lee et al. | |
| 7,383,057 B1 | 6/2008 | Senarath et al. | |
| 7,469,013 B1 | 12/2008 | Bolt et al. | |
| 7,486,620 B2 * | 2/2009 | Seol | 370/235 |
| 7,493,132 B2 | 2/2009 | Malladi et al. | |
| 7,512,153 B2 | 3/2009 | Kwon et al. | |
| 7,535,879 B2 | 5/2009 | Morioka et al. | |
| 7,542,517 B2 | 6/2009 | Kroeger | |
| 7,551,546 B2 | 6/2009 | Ma et al. | |
| 7,817,614 B2 | 10/2010 | Yang et al. | |
| 7,885,293 B2 | 2/2011 | Laroia et al. | |
| 7,894,324 B2 | 2/2011 | Laroia et al. | |
| 7,974,253 B2 | 7/2011 | Laroia et al. | |
| 2002/0044524 A1 | 4/2002 | Laroia et al. | |
| 2002/0151310 A1 * | 10/2002 | Chung et al. | 455/452 |
| 2002/0167969 A1 | 11/2002 | Eriksson et al. | |
| 2002/0181410 A1 * | 12/2002 | Bae et al. | 370/252 |
| 2002/0196731 A1 | 12/2002 | Laroia et al. | |
| 2003/0133409 A1 | 7/2003 | Corazza | |
| 2003/0219037 A1 * | 11/2003 | Toskala et al. | 370/496 |
| 2004/0001429 A1 | 1/2004 | Ma et al. | |
| 2004/0102219 A1 | 5/2004 | Bunton et al. | |
| 2004/0109432 A1 | 6/2004 | Laroia et al. | |
| 2004/0179480 A1 | 9/2004 | Attar et al. | |
| 2004/0214590 A1 | 10/2004 | Al-Housami et al. | |
| 2004/0219920 A1 | 11/2004 | Love et al. | |
| 2004/0224677 A1 | 11/2004 | Kuchibhotla et al. | |
| 2005/0002366 A1 | 1/2005 | Toskala et al. | |
| 2005/0036441 A1 | 2/2005 | Laroia et al. | |
| 2005/0036456 A1 | 2/2005 | Laroia et al. | |
| 2005/0041629 A1 | 2/2005 | Lee | |
| 2005/0043052 A1 | 2/2005 | Whinnett et al. | |
| 2005/0047360 A1 | 3/2005 | Love et al. | |
| 2005/0048975 A1 | 3/2005 | Ranta-Aho et al. | |
| 2005/0085197 A1 | 4/2005 | Laroia et al. | |
| 2005/0111397 A1 | 5/2005 | Attar et al. | |
| 2005/0128976 A1 | 6/2005 | Uehara et al. | |
| 2005/0143113 A1 | 6/2005 | Lee et al. | |
| 2005/0163056 A1 * | 7/2005 | Ranta-Aho et al. | 370/252 |
| 2005/0180315 A1 | 8/2005 | Chitrapu et al. | |
| 2005/0180354 A1 | 8/2005 | Cho et al. | |
| 2005/0220042 A1 | 10/2005 | Chang et al. | |
| 2005/0237932 A1 | 10/2005 | Liu | |
| 2005/0238053 A1 | 10/2005 | Iochi et al. | |
| 2005/0281232 A1 | 12/2005 | Kim et al. | |
| 2006/0040674 A1 * | 2/2006 | Vannithamby et al. | 455/452.2 |
| 2006/0120321 A1 | 6/2006 | Gerkis et al. | |
| 2006/0126748 A1 | 6/2006 | Lin et al. | |
| 2006/0128410 A1 | 6/2006 | Derryberry et al. | |
| 2006/0159120 A1 * | 7/2006 | Kim | 370/465 |
| 2006/0183483 A1 | 8/2006 | Hidaka | |
| 2006/0271704 A1 | 11/2006 | Chan et al. | |
| 2006/0279435 A1 | 12/2006 | Krishnan et al. | |
| 2007/0076807 A1 | 4/2007 | Jin et al. | |
| 2007/0086381 A1 * | 4/2007 | Lee et al. | 370/331 |
| 2007/0091852 A1 | 4/2007 | Malladi et al. | |
| 2009/0143030 A1 | 6/2009 | Hammerschmidt et al. | |
| 2009/0180563 A1 | 7/2009 | Schmidl et al. | |

FOREIGN PATENT DOCUMENTS

| | | |
|---|---|---|
| JP | 2000308146 A | 11/2000 |
| JP | 2003259437 | 9/2003 |
| JP | 2004247950 | 9/2004 |
| WO | WO03041302 A1 | 5/2003 |
| WO | WO2004100569 A2 | 5/2003 |
| WO | WO2005018115 A1 | 2/2005 |
| WO | WO 2005/020621 | 3/2005 |

OTHER PUBLICATIONS

PCT International Search Report, for International Application No. PCT/US2006/008998, pp. 1-4, (Jun. 20, 2006).

Notification of Transmittal of the International Preliminary Report on Patentability and the International Preliminary Report on Patentability, for International Application No. PCT/US2006/008998, pp. 1-9, (Feb. 21, 2007).

* cited by examiner

EXEMPLARY DATA RATE OPTIONS AVAILABLE TO A WT FOR UPLINK TRAFFIC SEGMENT

| DATA RATE OPTION | NUMBER OF FRAMES | NUMBER OF INFORMATION BITS | CODEWORD LENGTH | CODING RATE (APPROX.) | MODULATION CONSTELLATION | PER-TONE RELATIVE TRANSMISSION POWER OFFSET VALUE |
|---|---|---|---|---|---|---|
| 0 | 1 | 224 | 1344 | 1/6 | QPSK | 0 dB |
| 1 | 2 | 432 | 1344 | 1/3 | QPSK | 73/32 dB |
| 2 | 3 | 640 | 1344 | 1/2 | QPSK | 129/32 dB |
| 3 | 5 | 1056 | 1344 | 5/6 | QPSK | 247/32 dB |

Figure 7

EXEMPLARY DATA RATE OPTIONS AVAILABLE TO A WT FOR UPLINK TRAFFIC SEGMENT

| DATA RATE OPTION | NUMBER OF FRAMES | NUMBER OF INFORMATION BITS | CODEWORD LENGTH | CODING RATE (APPROX.) | MODULATION CONSTELLATION | PER-TONE RELATIVE TRANSMISSION POWER OFFSET VALUE |
|---|---|---|---|---|---|---|
| 0 | 1 | 224 | 1344 | 1/6 | QPSK | 0 dB |
| 1 | 2 | 432 | 1344 | 1/3 | QPSK | 0 dB |
| 2 | 3 | 640 | 1344 | 1/2 | QPSK | 0 dB |
| 3 | 5 | 1056 | 1344 | 5/6 | QPSK | 0 dB |

| BS SELECTED MAX RATE INDICATOR | | | DATA RATES WIRELESS TERMINAL CAN SELECT | | | | | | | | | | | | | | | |
|---|---|---|---|---|---|---|---|---|---|---|---|---|---|---|---|---|---|---|
| MSB | LSB | VALUE | 15 (HI) | 14 | 13 | 12 | 11 | 10 | 9 | 8 | 7 | 6 | 5 | 4 | 3 | 2 | 1 | 0 (LOW) |
| 0 | 0 | 0 | X |   | X |   | X |   | X |   | X |   | X |   | X |   |   | X |
| 0 | 1 | 1 | X | X | X | X | X | X | X | X |   |   |   |   |   |   |   |   |
| 1 | 0 | 2 |   |   |   |   | X | X | X | X | X | X | X | X |   |   |   |   |
| 1 | 1 | 3 |   |   |   |   |   |   |   |   | X | X | X | X | X | X | X | X |

← 1714 VALUE
← 1716 MSB
← 1718 LSB
← 1720 15 (HI)
← 1722 14
← 1724 13
← 1726 12
← 1728 11
← 1730 10
← 1732 9
← 1734 8
← 1736 7
← 1738 6
← 1740 5
← 1742 4
← 1744 3
← 1746 2
← 1748 1
← 1750 0 (LOW)

1700, 1702, 1704, 1706, 1708, 1710, 1712

Table 2300 (FIGURE 23)

| 2302 Uplink Traffic Channel Rate Option | 2304 Framing Format Type | 2306 Number of MAC Frames | 2308 Number of Information Bits (k) | 2310 Codeword Length (n) | 2312 Modulation Constellation |
|---|---|---|---|---|---|
| 0 | FIRST | 1 | 224 | 1344 | QPSK |
| 1 | FIRST | 2 | 432 | 1344 | QPSK |
| 2 | FIRST | 3 | 640 | 1344 | QPSK |
| 3 | FIRST | 4 | 848 | 1344 | QPSK |
| 4 | FIRST | 5 | 1056 | 1344 | QPSK |
| 5 | SECOND | 6 | 1280 | 2688 | QAM16 |
| 6 | SECOND | 8 | 1696 | 2688 | QAM16 |
| 7 | SECOND | 10 | 2112 | 2688 | QAM16 |

FIGURE 23

Table 2400 (FIGURE 24)

| 2402 Uplink Traffic Channel Segment In-Band Indicator X | 2404 Uplink Traffic Channel Segment Rate (If the assigned maximum rate option is not equal to 7) and (assignment was via a regular assignment) | 2406 Uplink Traffic Channel Segment Rate ((If the assigned maximum rate option is equal to 7) and (the assignment was via a regular assignment)) or (assignment was via a flash assignment) |
|---|---|---|
| 0 | 0 | 0 |
| 1 | 1 | 1 |
| 2 | 2 | 2 |
| 3 | 3 | 3 |
| 4 | 4 | 5 |
| 5 | 5 | 6 |
| 6 | 6 | 7 |

FIGURE 24

| EXEMPLARY QAM16 CONSTELLATION MAPPING | |
|---|---|
| SCALING FACTOR IS 1/SQRT(5)=.447214 | |
| BITS | COMPLEX SYMBOL |
| 0000 | (1,-3) |
| 0001 | (1,-1) |
| 0010 | (1,3) |
| 0011 | (1,1) |
| 0100 | (3,-3) |
| 0101 | (3,-1) |
| 0110 | (3,3) |
| 0111 | (3,1) |
| 1000 | (-1,-3) |
| 1001 | (-1,-1) |
| 1010 | (-1,3) |
| 1011 | (-1,1) |
| 1100 | (-3,-3) |
| 1101 | (-3,-1) |
| 1110 | (-3,3) |
| 1111 | (-3,1) |

3050

| EXEMPLARY QPSK CONSTELLATION MAPPING | |
|---|---|
| SCALING FACTOR IS 1.000000 | |
| BITS | COMPLEX SYMBOL |
| 00 | (1,1) |
| 01 | (1,-1) |
| 10 | (-1,1) |
| 11 | (-1,-1) |

DATA RATE METHODS AND APPARATUS

RELATED APPLICATIONS

The present application claims the benefit of U.S. Provisional Patent Application Ser. No. 60/659,502, filed on Mar. 8, 2005, titled "METHOD AND APPARATUS FOR IMPLEMENTING AND USING AN UPLINK RATE INDICATOR", U.S. Provisional Patent Application Ser. No. 60/701,469, filed on Jul. 20, 2005, titled "METHODS AND APPARATUS FOR SIGNALING UPLINK DATA RATE OPTION INFORMATION", U.S. Provisional Patent Application Ser. No. 60/701,434, filed on Jul. 20, 2005, titled "METHODS AND APPARATUS FOR WIRELESS TERMINAL UPLINK DATA RATE OPTION SELECTION", and U.S. Provisional Patent Application Ser. No. 60/701,468, filed on Jul. 20, 2005, titled "METHODS AND APPARATUS FOR IMPLEMENTING AND USING A MAXIMUM UPLINK RATE OPTION INDICATOR", each of which is hereby expressly incorporated by reference.

FIELD OF THE INVENTION

The present invention relates to methods and apparatus for improving the uplink communications for wireless communication devices, and more particularly to methods and apparatus for indicating and using uplink rate information in a wireless communications system.

BACKGROUND OF THE INVENTION

In wireless communications systems, a wireless terminal often needs to transmit uplink user data and/or other information to a base station. The base station functions as a point of network attachment for the wireless terminal. In some known systems, at least some of the wireless terminals are capable of transmitting uplink signals using different uplink coding rates, resulting in different uplink transmission rates of the user data/information. For example, consider one exemplary embodiment, where a wireless terminal is capable of transmitting uplink signals corresponding to an uplink traffic channel segment using different coding rates. The same modulation scheme may be used, e.g., quadrature phase shift keying (QPSK), and the same number of modulation symbols may be communicated during the segment, conveying the same number of total bits, irrespective of the coding rate selected. However, at a low coding rate, the wireless terminal may use a relatively low level of power and transmit a relatively small number of user data/information bits per total bits and a relatively high number of error correcting or redundant information bits per total number of bits. Conversely, at a high coding rate, the wireless terminal may use a relatively high level of power and transmit a relatively larger number of user data/information bits per total number of bits and a relatively low number of error correcting or redundant information bits per total number of bits.

In some known wireless communications systems, at least some of the wireless terminals are capable of transmitting uplink signals using different modulation schemes, e.g., QPSK, BPSK (Bi-Phase Shift Keying) and/or Quadrature Amplitude Modulation (QAM), with different numbers of bits being communicated on each modulation symbol depending of the modulation scheme used. Both the selected coding rate and the selected modulation scheme factor into the uplink data transmission rate. The uplink data transmission rate, sometimes referred to as the uplink data rate, can be specified in terms of the number of data and/or information bits per an uplink transmission unit. For example, the uplink data rate can be specified as the number of data and/or information bits per transmission symbol or the number of data/information bits per uplink segment or the number of data/information frames per uplink segment. An uplink segment in such a case is normally an uplink unit which can be used to transmit multiple symbols.

In some known systems, the base station assigns uplink traffic channel segments and decides the uplink data transmission rate that the wireless terminal should use which identifies the uplink coding rate, and if different modulation schemes are possible, the modulation scheme, that the wireless terminal should use. In such known systems, the mobile follows the base station commanded uplink data rate and transmits uplink signals accordingly without any discretion on the mobile's part. This approach is not very efficient as the base station has limited knowledge of the wireless terminal's condition at the time of uplink data transmission rate assignment. In addition, conditions at the wireless terminal can change from the time of uplink data transmission rate assignment to when the wireless terminal is ready to transmit on an assigned uplink traffic channel segment.

The base station can have reasonable knowledge of the overall levels of interference in the system and the potential levels of interference that a wireless terminal's uplink signals at a commanded data rate at a known power level can cause in the system. Indeed, a base station receiving feedback reports from a plurality of WTs and controlling scheduling is generally in a much better position to evaluate system interference levels than an individual wireless terminal. However, the base station has an incomplete set of information as to determine what uplink data rate the wireless terminal should use at the time of its uplink transmission. Some contributing factors can be better measured and/or evaluated by the wireless terminal.

The base station can have an estimate of the amount of data to be transmitted on the uplink by a given wireless terminal. However, the wireless terminal knows the actual amount of information that needs to be transmitted at the time the assigned uplink traffic segment messages are coded. For example, the base station may be unaware of new user data that has arrived subsequent to a wireless terminal request message, or the base station may be unaware of buffered user data that has been subsequently dropped following a wireless terminal request message. Typically, this results in operational inefficiencies. For example, if a wireless terminal has been commanded to use a higher data rate than it actually needs, the wireless terminal typically pads the extra (empty) information locations with zero's and transmits at the relatively high power level associated with the high data rate. This results in the wireless terminal unnecessarily consuming valuable battery energy and creating a higher level of interference in the system than if it had transmitted at the lower data rate which would have satisfied its needs. Conversely, if the base station had commanded the wireless terminal to use a low data rate because its estimate of the data uplink requirements was low; however, if requirements changed subsequent to the wireless terminal's request but prior to the wireless terminal uplink traffic channel segment message coding/modulation, the wireless terminal could end up communicating fewer user data/information bits (or data/information frames) in the uplink traffic channel segment than would have been possible at a higher data rate. This contributes to latency delays in the system.

In addition, the wireless terminal typically has better and more current information as to its battery power level, transmission power available for data and other signal transmission after a portion of the transmission power is allocated to a particular set of signals, e.g., control channels, operational drain, and operational power needs than the base station. The wireless terminal also typically has better knowledge of changes in the channel conditions, e.g., changes due to the wireless terminal moving or changes in the rate of movement, the wireless terminal entering a tunnel, the wireless terminal moving from a rural to city environment, etc., than the base station. In many cases it is not practical, effective, or convenient to convey such information to a base station, e.g., either from an overhead standpoint or from a time latency standpoint or such information to the extent that it is conveyed is somewhat out of date by the time it arrives at the base station.

In view of the above discussion, it is apparent that neither the base station nor the wireless terminal normally has the complete set of information on factors which influence the best choice of uplink data transmission rate for a wireless terminal to use. It would be advantageous if new methods and apparatus were developed which allowed for both the base station and wireless terminal to participate in the selection of the uplink data rate to be used by the wireless terminal.

SUMMARY OF THE INVENTION

The present invention relates to methods and apparatus for improving the uplink communications for wireless communications devices, and more particularly to methods and apparatus for communicating maximum uplink rate option information and selecting an uplink rate option to use, corresponding to an assigned uplink traffic channel segment. The wireless communications system is, in some embodiments, an orthogonal frequency division multiplexing (OFDM) system, e.g., a multiple access spread spectrum OFDM system, and maximum uplink rate option information is communicated using OFDM signaling.

A base station assigns an uplink traffic channel segment to wireless terminal and selects a corresponding base station selected maximum uplink rate option that the assigned wireless terminal is permitted to use for transmission in the assigned segment. The base stations communicates, via downlink signaling, the assignment of the uplink traffic channel segment to a wireless terminal and a corresponding maximum uplink rate option indicator conveying the base station selected maximum uplink rate option. In various embodiments, an assignment message includes the assignment identifying the wireless terminal to which the uplink traffic channel segment is being assigned and a corresponding maximum uplink rate option indicator.

A wireless terminal, operating in accordance with the present invention, receives an uplink traffic channel segment assignment of a corresponding uplink traffic channel segment to the wireless terminal and a maximum uplink rate option indicator, the maximum uplink rate option indicator including a value which can be used to determine an indicated maximum uplink rate option. In some embodiments, the wireless terminal is operated to conditionally further reduce the maximum uplink rate option from the base station selected maximum rate option in determining the indicated maximum uplink rate option.

In various embodiments for at least some uplink traffic channel segments assigned to the wireless terminal, the wireless terminals selects one of a plurality of rate options from a plurality of predetermined rate options corresponding to the indicated maximum uplink rate option. The plurality of rate options corresponding to the indicated maximum uplink rate option each having data transmission rates less than or equal to the data transmission rate of the indicated maximum uplink rate option, e.g., where a data transmission rate is a number of information bits communicated in the segment or a number of frames, e.g., MAC frames, communicated in the segment. The wireless terminal transmits data in the assigned uplink traffic channel segment in accordance with the selected one of the plurality of rate options corresponding to the indicated maximum uplink rate option.

In some embodiments, for at least some assigned uplink traffic channel segments, the wireless terminal determines the indicated maximum uplink rate option from the value included in the maximum uplink rate option indicator and additional information. The additional information includes, in some embodiments, information indicating whether the maximum uplink rate option indicator was received in a first or second assignment channel. In some embodiments for some assignment channels, the additional information includes interference information, e.g., interference information corresponding to a beacon ratio report performed by the wireless terminal.

In various embodiments, the wireless terminal stores mapping information between each of a plurality of uplink rate options and an encoding method, where at least two of the plurality of uplink rate options correspond to coding different numbers of information bits in the assigned segment. In various embodiments, the wireless terminal stores information for each of a plurality of uplink data rate options and a modulation method. In some such embodiments, at least two of the plurality of uplink rate options correspond to different modulation methods, e.g., QPSK and QAM16. For example, each of the wireless terminal supported uplink data rate options, in some embodiments, corresponds to a number of information bits to be communicated in an uplink traffic channel segment, a coding rate to be used, and a modulation method to be used, and the wireless terminal stores such information to be used to implement the wireless terminal selected uplink rate option.

A wireless terminal may receive a plurality of traffic channel segment assignments from the same base station, and, in some embodiments, each of the traffic channel segment assignments includes a corresponding maximum uplink rate option indicator. In some embodiments, at some times, at least one of the received assignments includes a maximum uplink rate option indicator that corresponds to a single predetermined uplink rate option, e.g., corresponding to the lowest traffic channel uplink rate option. In various embodiments, the lowest traffic channel uplink rate option uses QPSK modulation.

In some embodiments, for some types of assignment channels at least 8 different maximum rate options can be indicated. For example a three bit maximum uplink rate option indicator field can be used in an assignment message, and a wireless terminal associated each of the eight values which can be indicated with information indicating different numbers of information bits to be coded into the segment.

In some embodiments, for some types of assignment channels the maximum rate option indicator includes enough bits to be able to identify each of the supported uplink date rate options. For example, a wireless terminal may support 8 uplink data rate options, and the maximum uplink data rate option indicator includes 3 bits. In some embodiments, for some types of assignment channels the maximum rate option indicator value is communicated in the received signal using fewer bits than the number of bits required to signal to uniquely identify each of the selectable uplink rate options. For example, for some types of assignment channels, a maximum rate option indicator includes a single bit, but the wireless terminal supports 8 uplink rate options.

In various embodiments the maximum uplink rate option indicator includes a first number of bits if it is communicated using a first signaling method and a second number of bits if it is communicated using a second signaling message, the first and second number of bits being different. For example, in some embodiments the first number of bits is one, the second number of bits is three, the first signaling method includes the one-information bit maximum uplink rate option indicator as part of first assignment channel message and uses a non-coherent modulation method using a combination of zero and non-zero QPSK modulation symbols, and the second signaling method includes the three-bit maximum uplink rate option indicator as part of a second assignment channel message and uses a coherent QPSK modulation method.

While various embodiments have been discussed in the summary above, it should be appreciated that not necessarily all embodiments include the same features and some of the features described above are not necessary but can be desirable in some embodiments. Numerous additional features, embodiments and benefits of the present invention are discussed in the detailed description which follows.

BRIEF DESCRIPTION OF THE FIGURES

FIG. 7 is a table illustrating exemplary rate options available to a wireless terminal for an uplink traffic segment.

FIG. 13 is a table illustrating another set of exemplary data rate options available to a wireless terminal for an uplink traffic segment.

FIG. 17 is a table illustrating an exemplary relationship between base station selected maximum rate indicators and data rates that a wireless terminal can select in another exemplary embodiment of the present invention.

FIG. 23 is a table of exemplary uplink traffic channel rate options and corresponding sets of information for each rate option including coding rate and modulation type information, in accordance with various embodiments of the present invention.

FIG. 24 is a table illustrating exemplary mapping between an uplink traffic channel segment in-band indicator X and uplink traffic channel rate option values, in accordance with various embodiments of the present invention.

FIG. 30 illustrates exemplary QPSK constellation mapping and exemplary QAM16 constellation mapping tables.

DETAILED DESCRIPTION OF THE INVENTION

Figure 1:
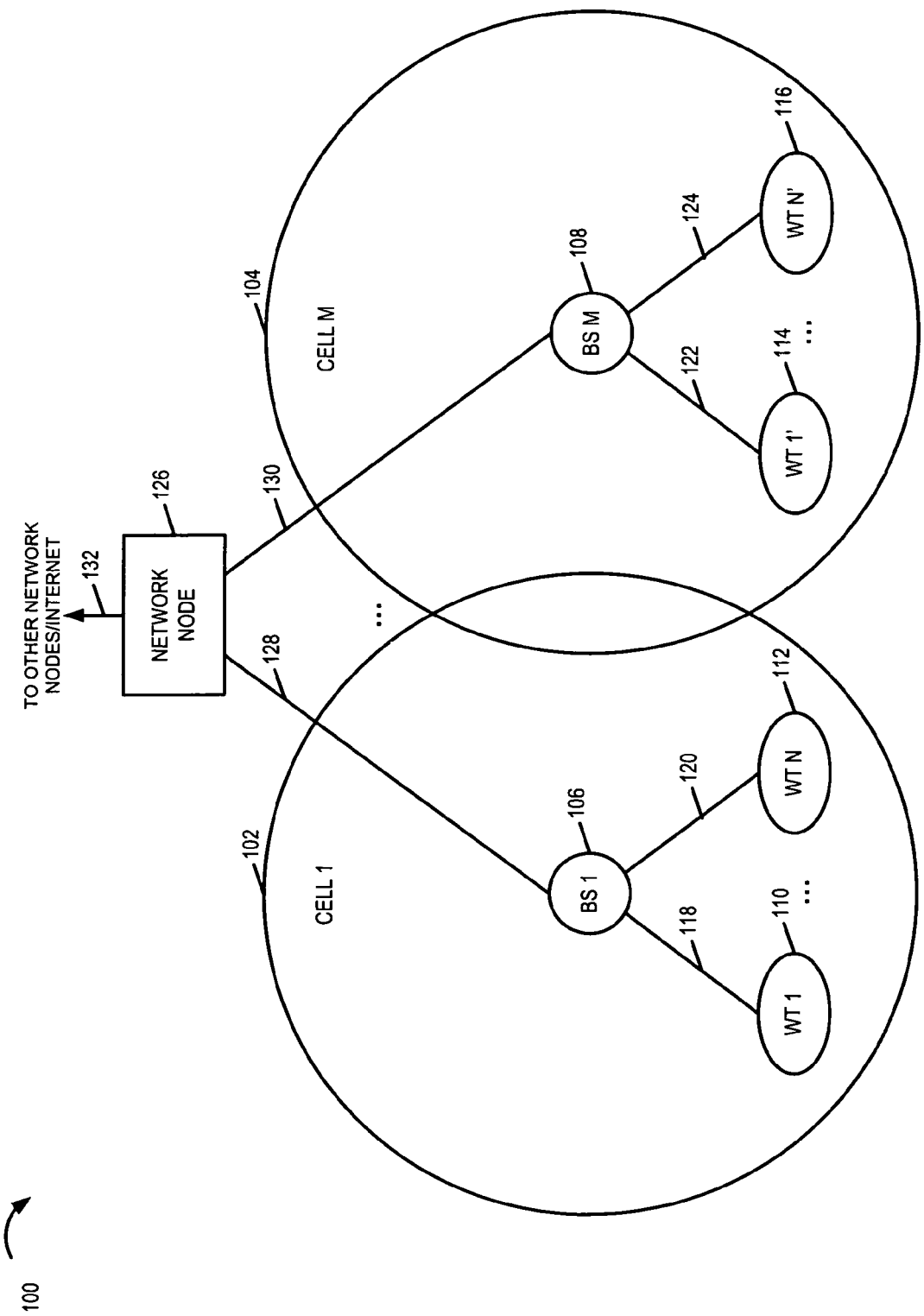
FIG. 1 is a drawing of an exemplary communications system, implemented in accordance with the present invention and using methods of the present invention.

FIG. 1 is a drawing of an exemplary communications system 100, implemented in accordance with the present invention and using methods of the present invention. System 100 includes apparatus and methods directed to improving uplink communications by selecting and communicating uplink data rate information. Exemplary system 100 may be, e.g., an orthogonal frequency division multiplexing (OFDM) multiple access wireless communication system. System 100 includes a plurality of cells (cell 1 102, cell M 104). Each cell (cell 1 102, cell M 104) represents a wireless coverage area for a corresponding base station (BS 1 106, BS M 108), respectively. A plurality of wireless terminal (WTs) (WT 1 110, WT N 112, WT 1' 114, WT N' 116) are included in system 100. At least some of the WTs are mobile nodes (MNs); the MNs may move throughout the system 100 and establish wireless links with different BSs, the BS corresponding to the cell in which the WT is currently located. In FIG. 1, (WT 1 110, WT N 112) are coupled to BS 1 106 via wireless links (118, 120), respectively; (WT 1' 114, WT N' 116) are coupled to BS M 108 via wireless links (122, 124), respectively.

The BSs (106, 108) are coupled to network node 126 via network links (128, 130), respectively. Network node 126 is coupled to other network nodes, e.g., routers, other base stations, AAA server nodes, Home Agent nodes, etc. and/or the Internet via network link 132. Network links 128, 130, 132 may be, e.g., fiber optic links. Network node 126 and networks links 128, 130, 132 are part of a backhaul network linking various BSs in different cells together and providing connectivity so that a WT located in one cell can communicate with a peer node in a different cell.

System 100 is shown having cells with one sector per cell. The methods and apparatus of the present invention are also applicable in systems having more than one sector per cell, e.g., 2, 3, or more than 3 sectors per cell and in systems having different numbers of sectors per cell in different portions of the system. In addition, the methods and apparatus of the present invention are also applicable to many non-cellular wireless communications systems including at least one base station and one wireless terminal.

Figure 2:
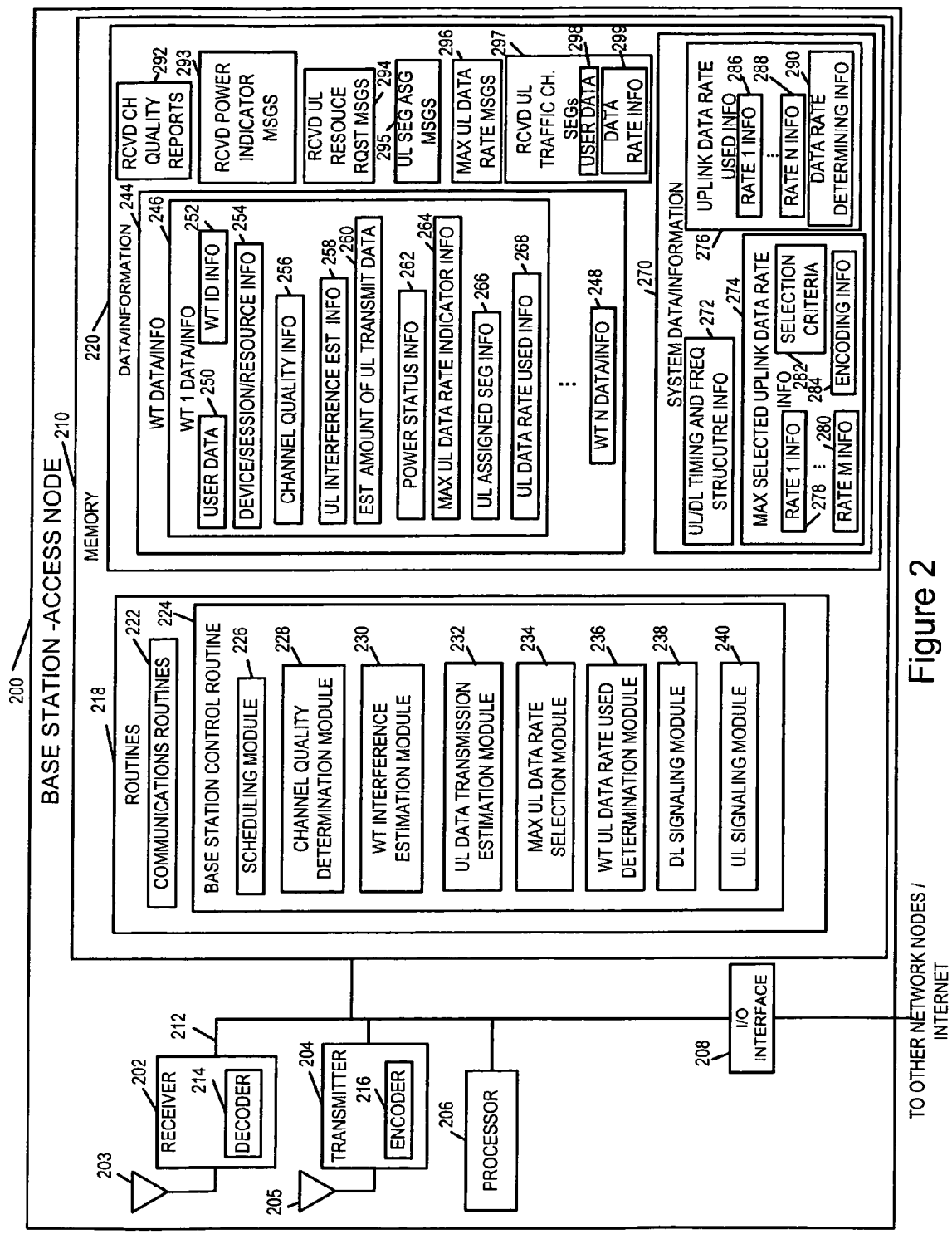
FIG. 2 is a drawing of an exemplary base station, implemented in accordance with the present invention and using methods of the present invention.

FIG. 2 is a drawing of an exemplary base station 200, implemented in accordance with the present invention and using methods of the present invention. Exemplary BS 200 is sometimes referred to as an access node. BS 200 may be any of the BS (106, 108) of system 100 of FIG. 1. Exemplary BS 200 includes a receiver 202, a transmitter 204, a processor 206, I/O interface 208, and memory 210 coupled together via a bus 212 over which the various elements may interchange data and information.

Receiver 202 is coupled to receive antenna 203 through which BS 200 may receive uplink signals from a plurality of wireless terminals. Receiver 202 includes a decoder 214 for decoding received encoded uplink signals. Received encoded uplink signals include uplink traffic channel signals including user data/information and data rate used information.

Transmitter 204 is coupled to transmit antenna 205 over which downlink signals are sent to a plurality of wireless terminals. Transmitter 204 includes an encoder 216 for encoding information prior to transmission. Downlink signals include assignments of dedicated uplink traffic channel segments and corresponding maximum uplink data rate indicator signals.

I/O interface 208 couples the BS 200 to other network nodes, e.g., routers, other base stations, AAA server nodes, Home Agent nodes and/or the Internet. I/O interface 208 provides an interface to a backhaul network providing interconnectivity between nodes in different cells.

Memory 210 includes routines 218 and data/information 220. The processor 206, e.g., a CPU, executes the routines 218 and uses the data/information 220 in memory 210 to operate the BS 200 and implement methods of the present invention.

Routines 218 include communications routines 222 and base station control routines 224. The communications routines 222 implement various communications protocols used by BS 200.

The base station control routines 224 control the operation of BS 200 including receiver 202 operation, transmitter 204 operation, I/O interface 208 operation, and the implementation of methods of the present invention. Base station control routines 224 include a scheduling module 226, a channel quality determination module 228, a wireless terminal interference estimation module 230, an uplink data transmission estimation module 232, a maximum uplink data rate selection module 234, a wireless terminal uplink data rate used determination module 236, a downlink signaling module 238, and an uplink signaling module 240.

The scheduling module 226, e.g., a scheduler, schedules uplink and downlink channel air link resources, e.g., segments, to wireless terminal users. Scheduler 226 operations include assigning uplink traffic channel segments to specific wireless terminals from a plurality of wireless terminal. Different uplink traffic channel segments may have different characteristics, e.g., more tones for a shorter duration or fewer tones for a longer duration, and the scheduler may take these differences into consideration when deciding which uplink traffic segment should be assigned to which user. Scheduler 226 may assign a number of uplink traffic channel segments to a wireless terminal at a point in time based upon an estimate of the amount of data to be transmitted by the WT 300. Each tone may be used to communicate a signal during an OFDM symbol transmission time period.

Channel quality determination module 228 determines, for each WT 300 under consideration, communications channel quality between the base station 200 and wireless terminal 300, e.g., based on received channel quality reports 292 from WT 300 and evaluated received uplink signals from WT 300. In some embodiments, the channel quality reports 292 are based upon WT 300 measurements of received known signals, e.g., pilot signals, beacon signals, etc., communicated as downlink signals from BS 200 to WT 300, and it is assumed that uplink channel quality corresponds to downlink channel quality.

Wireless terminal interference estimation module 230 estimates, for each WT 300 under consideration, the interference that will be caused to other wireless terminals if a specific wireless terminal 300 transmits uplink signals using one or more different uplink data rates.

Uplink data transmission estimation module 232 estimates, for each WT 300 under consideration, the amount of data that the wireless terminal 300 needs to transmit to the base station. The uplink data transmission estimation module 232 can base its estimation on things such as: received resource requests, unfulfilled received resource requests, previously allocated uplink traffic channel segments, an ack/nak ratio in response to received uplink traffic channel segment signals, uplink rate previously selected for use by the wireless terminal, type of wireless terminal, e.g., data terminal, voice cellular device, voice/video/messaging cellular device, etc., type of uplink signaling, e.g., voice, data, video, etc., service plan, and/or historical usage information corresponding to the WT 300.

Maximum uplink data rate selection module 234 selects a maximum uplink data transmission rate to be used by a WT 300 when transmitting uplink signals to the BS 200 on a corresponding assigned uplink traffic channel segment, said selected maximum uplink data transmission rate being one a plurality of possible transmission data rates. Maximum uplink data rate selection module 234 selects, for each assigned uplink traffic channel segment, a maximum data rate that the WT assigned the uplink traffic segment should use. Maximum uplink data rate selection module 234 bases its selection upon: the estimated quality of the wireless communications channel, the interference estimates, and/or received battery information corresponding to the WT 300.

WT uplink data rate used determination module 236 determines an uplink data transmission rate selected and utilized by the WT 300 for the uplink traffic channel segment from the received signals conveyed in the uplink traffic channel segment. In some embodiments, the utilized uplink data rate information is indicated by the location of additional energy beyond the energy used to communicate data on a predetermined subset of one or more signals used to communicate the data in the uplink traffic channel segment. Different subsets of signals having the additional energy can correspond to different possible data rates that could have been selected and used by the WT.

Downlink signaling module 238 controls operation of the transmitter 204 and its encoder 204 to transmit downlink signals including uplink traffic segment assignment information and associated maximum uplink data rate indicator, the base station selected maximum uplirk data transmission rate to be used by the WT 300 assigned the uplink traffic channel segment.

Uplink signaling module 240 controls operations of receiver 202 and its decoder 214 to receive and process uplink signals including: resource requests, channel quality reports, battery indicator messages and uplink traffic channel signals from a plurality of WTs. The uplink signaling module 240 also forwards each determined uplink data transmission rate, e.g., identifying coding rate information and/or modulation type information, from module 236 to decoder 214 to be used to recover user/data information conveyed in the corresponding uplink traffic channel segment signals.

Data/information 220 includes a plurality of sets of WT data/information 244 (WT 1 data/info 246, WT N data info 248) and system data/information 270. WT 1 data/information 246 includes user data 250, WT identification information 252, device/session/resource information 254, channel quality information 256, uplink interference estimate information 258, estimated amount of uplink transmit data 260, battery status information 262, maximum uplink data rate indicator information 264, uplink assigned segment information 266, and uplink data rate used information 268.

User data 250 includes user data/information such as e.g., data/info representing voice, text or video, received on uplink traffic channel segments from WT 1 intended to be forwarded to a peer node of WT 1 in a communications session with WT 1. User data 250 may also include user data/information sourced from a peer node of WT 1 to be communicated to WT 1 via downlink traffic channel segment signals.

WT identification information 252 includes, e.g., a base station assigned active user identifier and an IP address associated with WT 1. Device/session/resource information 254 includes uplink and downlink segments, e.g., traffic channel segments, assigned to WT 1 by scheduling module 226 and session information including address and routing information pertaining to peer nodes of WT 1 in communication sessions with WT 1.

Channel quality information 256 includes information obtained or derived from a received channel quality report 292 from WT 1 and channel quality information determined from measurements and evaluation of uplink signals from WT 1. Channel quality information 256 is an output of channel quality determination module 228 and is used as an input to maximum uplink data rate selection module 234.

Uplink interference estimation information 258 includes base station estimates of the potential interference levels that WT 1 is expected generate to other WTs if WT 1 transmits uplink signals at various uplink transmission rates being considered for selection by the BS as the maximum uplink data transmission rate. Uplink interference estimation information 258 is an output of module 230 and an input to module 234.

Estimated amount of uplink transmission data 260 is a BS 200 estimate, using information currently available to BS 200, of the current uplink data transmission needs of WT 1. Estimated amount of uplink transmission data 260 may be used by scheduling module 266 in determining the number of uplink traffic channel segments to assign to WT 1.

Power status information 262 includes information pertaining to WT 1 extracted from received power indicator messages 293. The power indicator messages 293 may provide information on remaining battery power and/or information referred to sometimes herein as backoff power information. Backoff power information indicates the amount of transmission power available after the allocation of power to a set of signals, e.g., a predetermined signals corresponding to one or more control channels, e.g., corresponding to a dedicated control channel (DCCH), which are subject to power control from the base station. The power control may be, e.g., a closed loop power control process. The total amount of output transmission power for the WT may be limited by law or other constraints, e.g., battery power, such that after the WT allocates power to a predetermined set of signals there is a limited amount of transmission power available for the transmission of other signals, e.g., user data. The allocation of the power to the predetermined set of signals may be performed under direction of one or more control signals from the base station instructing the WT to increase or decrease the amount of power used to transmit the predetermined signals. In some embodiments, the base station measures one or more received signals in the set of predetermined signals and instructs the WT to adjust the power level of the predetermined signals to increase or decrease the transmission power dedicated to the predetermined set of signals. While the base station may instruct changes in the transmission power dedicated to the predetermined set of signals, all the power control commands may not be received making it difficult for the base station to know the actual amount of transmission power dedicated by the WT to the transmission of the predetermined set of signals. The backoff power information provides the base station with an indication of the amount of power available at the WT sending the backoff power signal for transmitting signals other than the predetermined set of signals. From the backoff power signal, in cases where the base station knows the WTs total transmission power which can be used, either because it is fixed or reported to the base station, the base station can determine not only the amount of power available for transmission of signals other than the predetermined set of signals but also the amount of power allocated to the predetermined set of signals. The amount of power available for signals other than the predetermined set of signals is used by the base station in some embodiments in selecting the maximum transmission rate allowed to be used by a particular WT for uplink signaling at a particular point in time.

An indication of the amount of available power for transmitting signals other than the predetermined set of signals and/or available battery power can be, and in various embodiments are, considered by maximum uplink data rate selection module 234 in selecting the maximum allowable uplink data rate for the WT 1 uplink traffic channel segment. For example, the amount of available transmission power may limit the maximum data rate possible with the base station selecting a maximum data rate option which can be supported given the power believed to be available at the WT for the transmission of data signals. As the amount of power available for transmitting signals other than said predetermined set of signals declines, lower data rate options may be selected as the maximum permitted uplink data rate option while increases in available transmission power may result in a maximum permitted uplink data rate option corresponding to higher data rates being selected for the wireless terminal reporting the increased amount of available power.

Maximum uplink data rate indicator information 264 is an output of the maximum uplink data rate selection module 234 and indicates the base station selected maximum uplink data transmission rate which is the maximum uplink data transmission rate WT 1 is permitted to use when transmitting uplink signals on the assigned corresponding uplink traffic channel segment. In some embodiments, the maximum uplink data rate indicator includes, at most, a maximum number of bits that is less than the number of bits required to uniquely specify the full set of uplink data transmission rates which can be used by WT 1. Maximum uplink data rate indicator information 264 is included in a maximum uplink data rate message 296 transmitted via the control of downlink signaling module 238 by BS 200 to WT 1.

Uplink assigned segment information 266 includes information identifying uplink traffic channel segments assigned to WT 1, encoded data/information conveyed in such segments, and data/information recovered from such segments including frames of user data. Uplink data rate used information 268 includes the WT selected and utilized uplink data transmission rate in each of uplink traffic channel segments assigned to WT 1. Uplink data rate used information 268 may include coding rate information and/or modulation scheme information. Uplink data rate used info 268 is an output of WT UL data rate determination module 236 and is used by decoder 214 in the recovery of user data/information.

System data/information 270 includes uplink/downlink timing and frequency structure information 272, maximum selected uplink data rate information 274 and uplink data rate used information 276. Uplink/downlink timing and frequency structure information 272 includes, e.g., symbol timing information, tone spacing information, number of uplink tones, number of downlink tones, uplink carrier frequency, downlink carrier frequency, uplink bandwidth, downlink bandwidth, uplink set of tones, downlink set of tones, uplink tone hopping information, uplink dwell information, downlink tone hopping information, downlink traffic segment structure information, uplink traffic segment structure information, repetitive timing structures, e.g., symbol time intervals and grouping of symbol time intervals into, e.g., dwells, half-slots, slots, superslots, beacon slots, ultra slots, etc.

Maximum selected uplink data rate information 274 includes a plurality of sets of data rate information (rate 1 info 278, rate M information 280), selection criteria 282, and encoding information 284. Each set of rate info (278, 280) corresponding to one of the potential data rates that may be selected by BS 200 module 234 to be indicated as a maximum uplink data transmission rate. Each set of data rate info (278, 280) may include or correspond to a coding rate and/or a modulation scheme. Selection criteria 282 includes predetermined limits and values used by module 234 in determining the max selected uplink data rate, e.g., SNR reference levels, SIR reference levels and/or rate back-off amounts associated with received low battery level indication information.

Encoding information 284 includes information used to encode the BS selected maximum uplink data rate indicator into a message to be signaled to the WT assigned the corresponding uplink traffic channel segment. In some embodiments, the max uplink data rate indicator is included in the uplink traffic channel assignment message, while in other embodiments it is included in a different downlink message. In some embodiments, a wireless terminal is assigned a maximum uplink data transmission rate on a per uplink traffic channel segment basis or group of traffic channel segments, e.g., assigned at any one time. In other embodiments, a WT may be assigned a maximum uplink data transmission rate which remains in effect until the BS signals a new maximum uplink data transmission rate.

Uplink data rate used information 276 includes a plurality of sets of data rate information (rate 1 information 286, rate N information 288) and data rate determining information 290. Each set of data rate information (286, 288) corresponds to a possible uplink data rate which can be used by a WT 300 for transmission of uplink traffic channel segment signals. Each uplink data rate can correspond to a coding rate and/or a modulation scheme. Data rate determining information 290 includes information used by module 236 to decode the uplink rate selected and used during an uplink traffic channel segment by a WT 300. Data rate determining information 290 can include, e.g., sets of locations within a segment or patterns within the segment identifying where additional energy has been allocated to specific tones during specific symbol transmission times of the segment, each different set corresponding to a different uplink data rate that may have been selected by WT 300.

In some embodiments, different sets of information 274 and 276 may exist for different wireless terminals or different types or classes of wireless terminals. For a given wireless terminal, the number M of max selected uplink data rates (278,280) is less than or equal to the number N of uplink data rates used (286, 288). In some embodiments, for at least some wireless terminals, the number of max selected uplink data rates M (278,280) is less than the number N of uplink data rates used (286, 288).

Data/information 220 also includes received channel quality reports 292, e.g., feedback reports of measured channel conditions, received power indicator messages 293, e.g., transmission power back-off signals and/or battery power signals, received uplink resource request messages 294, e.g., requests for an uplink traffic channel segment or segments and received uplink traffic channel segments 297, said received messages 292, 293, 294, 297 being sourced from a plurality of WTs 300. The received uplink traffic channel segment messages 297 include user data 298 and data rate information 299, the user data 298 having been communicated using the coding rate and/or modulation scheme indicated by the rate information 299. Data/information 220 also includes, in the exemplary embodiment, uplink segment assignment messages 295, e.g., assignments of dedicated uplink traffic channel segments to specific WTs and maximum uplink data rate messages 296 conveying maximum data rate indicators to WTs. In some embodiments maximum uplink data rate message information is included as part of uplink segment assignment messages.

Figure 3:
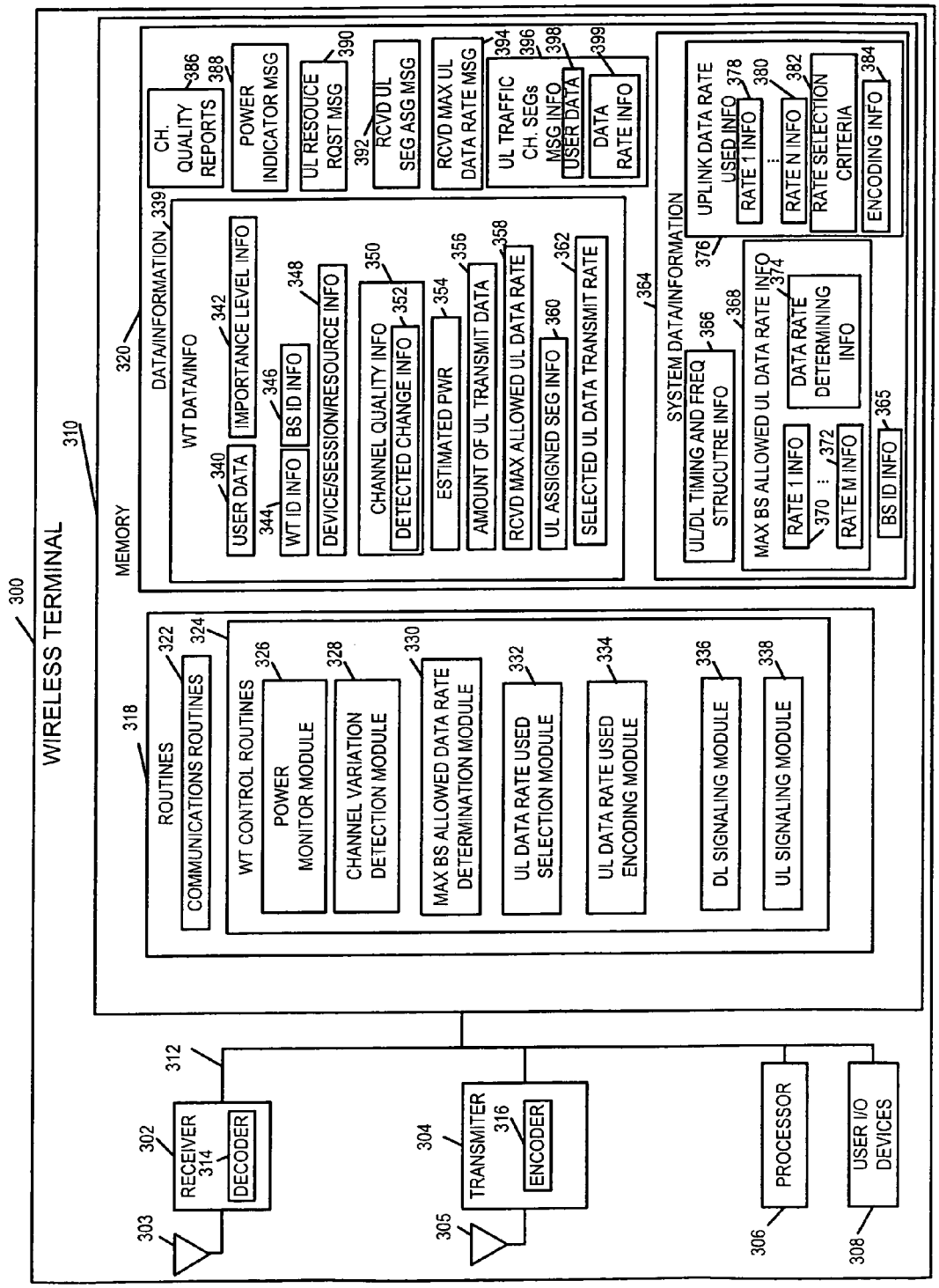
FIG. 3 is a drawing of an exemplary wireless terminal, implemented in accordance with the present invention and using methods of the present invention.

FIG. 3 is a drawing of an exemplary wireless terminal 300, implemented in accordance with the present invention and using methods of the present invention. WT 300 may be any of the WTs (110, 112, 114, 116) of system 100 of FIG. 1. Exemplary WT 300 includes a receiver 302, a transmitter 304, a processor 306, user I/O devices 308, and memory 310 coupled together via a bus 312 over which the various elements may interchange data and information.

Receiver 302 is coupled to receive antenna 303 through which WT 300 receives downlink signals from BS 200 including assignments for uplink traffic channels and maximum uplink data rate indicator signals. Receiver 302 includes a decoder 314 which is used by WT 300 to decode received downlink signals from BS 200.

Transmitter 304 is coupled to transmit antenna 305 through which WT 300 transmits uplink signals to BS 200 including channel quality reports, power indication signals, uplink resource request messages, and uplink traffic channel segment signals including user data and data rate information. In some embodiments, the same antenna is used as both the transmit antenna 305 and the receive antenna 303. Transmitter 204 includes an encoder 316 for encoding uplink data/information prior to transmission.

User I/O devices 308 includes, e.g., microphones, speakers, keypad, keyboard, mouse, touch-screen, camera, displays, alarms, vibration device, etc. Various user I/O devices 308 are used to input user data/information intended for peer nodes of WT 300 and to output received data/information from peer nodes of WT 300. In addition, user I/O devices 308 are used by an operator of WT 300 to initiate various functions, e.g., power on, power off, place a call, terminate a call, etc.

Memory 310 includes routines 318 and data/information 320. The processor 306, e.g., a CPU, executes the routines 318 and uses the data/information 320 in memory 310 to control the operation of WT 300 and implement the methods of the present invention.

Routines 318 include a communications routine 322 and wireless terminal control routines 324. The communications routine 334 implements the various communications protocols used by the WT 300. The wireless terminal control routines 324 control operations of WT 300 including the operation of receiver 302, transmitter 304, and user I/O devices 308. Wireless terminal control routines 324 includes a power monitor module 326, a channel variation detection module 328, a maximum base station allowed data rate determination module 330, an uplink data rate used selection module 332, an uplink data rate used encoding module 334, a downlink signaling module 336, and an uplink signaling module 338.

Power monitor module 326 monitors the amount of power available for transmitting signals after transmission power is allocated to a set of signals, e.g., a predetermined set of control channel signals. The module 326 may also monitor the status of the WT's battery, e.g., energy level and current rate of energy level decline or increase, and estimates remaining battery power. Estimated power information 354, an output of power monitor module 326 is used by the uplink data rate selection module 332 in determining the actual uplink data rate to be used for transmitting signals, e.g., user data signals. In some embodiments, estimated power info 354 also includes information indicative as to whether the wireless terminal 300 is currently operating on its own battery reserve or an external power source, e.g., a car's electrical system, in which case the power used for current uplink signaling will not further deplete the battery. In addition, the power monitor module 326, in some embodiments, generates power indicator messages 388, e.g., WT power back-off messages and or battery power information messages to BS 200.

Channel variation detection module 328 measures channel quality, e.g., based on received known signals, e.g., pilot signals, beacon signals, etc. communicated from BSs 200 over the downlink and generates channel quality reports 386, e.g., periodically, which are subsequently communicated to a BS 200. The channel quality information 350, an output of module 328, made available to uplink data rate used selection module 332, is generally updated more frequently than the channel quality reports 386, thus providing WT 300 with more current information at any given time to make a better decision as to the uplink data rate to use. In addition, the channel variation detection module 328 detects changes in channel quality and/or changes in operating conditions and/or environment which can be expected to change the channel quality. Channel quality information 350 including detected change information 352 is made available to the uplink data rate used selection module 332. Change variation detection module 328 can detect changes due to factors such as a change in wireless terminal 300 velocity, e.g., as a wireless terminal changes from a static device to a moving device, or a change in environments, e.g., a WT moves from a rural to a city environment, a WT enters a tunnel, etc. Such variations may be detectable by the WT and such information may be useful in making decisions as to which uplink data rate to use. In many embodiments, it may be inefficient to communicate such change information to the BS 200 for use in WT 300 uplink maximum data rate selection and/or time constraints associated with the validity of such information may make it impractical. However, such change information can be, and is used, in some embodiments, by the wireless terminal's uplink data rate used selection module 332.

Maximum base station allowed data rate determination module 330 processes received signals conveying a maximum uplink data rate indicator, e.g., a received maximum uplink data rate message 394. In some embodiments, the maximum uplink data rate indicator may be conveyed in a different message, e.g., a received uplink segment assignment message 392. Module 330 uses information 320 including data rate determining information 374, e.g., data rate level decoding information, to determine the received maximum allowable uplink data rate 358, corresponding to at least some uplink traffic channel segments assigned to WT 300, from a plurality of potential maximum uplink data rates corresponding to information (370, 372).

Uplink data rate selection module 332 determines the selected uplink data transmit rate 362 to use for assigned uplink traffic channel segments identified in uplink assigned segment information 360. Each data rate may correspond to a coding rate and/or modulation scheme. Uplink data rate selection module 332 uses data/information 320 including the amount of uplink user data to transmit 356, the importance level of the information to transmit 342, the estimated power information 354, channel quality information 350 including detected change information 352, and data rate selection criteria 382 to select a selected uplink data transmit rate 362 less than or equal to the received maximum allowed uplink data rate 358 from among the potential uplink data rates supported by WT 300 identified in info (378,380).

Uplink data rate used encoding module 334 uses the data/info 320 including encoding information 384 to encode the selected uplink data transmit rate 362 for a given uplink traffic channel segment along with the user data/info to be communicated in the uplink traffic channel segment. In some embodiments, the encoding information 384 specifies subsets of locations (within a set of locations of the time/frequency grid corresponding to an uplink traffic channel segment) to have additional energy placed thereon beyond the energy used to communicate the data, different subsets of locations for the same uplink traffic channel segment corresponding to different uplink data rates used to communicate the data. In some embodiments, the additional energy is at least 2 dB above the energy used to transmit the data. In some embodiments, using a dwell uplink structure and uplink segments, one of the symbol transmission time intervals of each dwell of the uplink segment, e.g., the first symbol time interval of the dwell, is used to convey a subset of signals with additional energy; a sequential pattern of tones selected to convey the additional energy on the subset of signals during the uplink segment being used to convey the data rate used, different patterns corresponding to different data rates.

Downlink signaling module 336 controls operation of the receiver 302 and decoder 304 to receive and process downlink signals from a BS 200, said downlink signals including uplink traffic channel segment assignment messages 392 and maximum uplink data rate indicator messages 394.

Uplink signaling module 338 controls the operation of transmitter 304 and encoder 316 to encode and transmit uplink signals to BS 200, said uplink signals including channel quality reports 386, power indicator messages 388, uplink resource request messages 390 and uplink traffic channel segment messages 396. The uplink traffic channel segment messages 396 include user data 398 and data rate information 399.

Data/information 320 includes WT data/info 339, system data/information 364, channel quality reports 386, e.g., feedback reports of measured channel conditions, power indicator messages 388, e.g., transmission power back-off signals, uplink resource request messages 390, e.g., requests for an uplink traffic channel segment or segments, received uplink segment assignment messages 392, e.g., assignments of dedicated uplink traffic channel segments to WT 300, received maximum uplink data rate messages 394 conveying maximum data rate indicators to WT 300 and uplink traffic channel segment message information 396. The uplink traffic channel message information 396 includes user data 398 and corresponding data rate information 399. The uplink traffic channel message information 396 is transmitted using assigned uplink traffic segments via transmitter 304 under the control of uplink signaling module 338 to BS 200.

WT data/information 339 includes user data 340, importance level information 342, WT identification (ID) information 344, base station ID information 346, device/session/resource information 348, channel quality information 350 including detected change information 352, power information 354, amount of uplink transmit data 356, received maximum allowable uplink data rate 358, uplink assigned segment information 360, and selected uplink data transmit rate 362. User data 340 includes data/information intended for a peer of WT 300 in a communications session with WT 300 and transmitted by WT 300 to BS 200 over uplink traffic channel segments. User data 340 also includes data/information sourced from a peer of WT 300 in a communications session with WT 300 and received from BS 200 via downlink traffic segments.

Importance level information 342 includes information associated with different portions of uplink user data to be transmitted identifying the importance of the portions of data, e.g., in terms of priority, application, urgency to transmit, etc. Different applications and/or peers may be prioritized, e.g., based on a charging model, user preferences, and/or predetermined agreements. Different applications, e.g., push-to-talk feature, voice phone call, video stream, still video image, text data, etc., may have different transmission latency requirements. Relative importance levels between competing portions of uplink data may change as new uplink user data/info is received, e.g., via user I/O devices 308. The importance level associated to a portion of uplink data may change as a function of time. For example, a portion of data may represent information for a voice over Internet Protocol (VoIP) call, which has certain latency constraints; therefore as time advance, without transmission of the buffered VoIP data and the acceptable window for transmission begins to shorten, the importance level may increase.

Wireless terminal identification information 344 includes, e.g., a WT IP address and a BS 200 assigned WT active user identifier. Base station identifier information 346 includes an identifier, e.g., a value distinguishing the specific BS 200 point of network attachment to which WT 300 is using as its current point of network attachment, from among a plurality of different BS point of network attachment in the wireless communications system. In some embodiments BS ID information 346 includes information identifying a specific sector and/or carrier frequency being used by the BS point of network attachment. Device/session/resource information 348 includes uplink and downlink segments, e.g., traffic channel segments, assigned to WT 300 and session information including address and routing information pertaining to peer nodes of WT 300 in communication sessions with WT 300. Channel quality information 350 includes information measured, derived and estimated pertaining to the wireless communications channel between WT 300 and BS 200. Channel quality information 350 includes detected change information 352 identifying changes in the channel quality and detected changes which can be expected to result in changes in channel quality.

Estimated power information 354 is an output of the power monitor module 326 and includes back-off power information and/or information pertaining to the battery condition and current state of battery drain. Amount of uplink transmit data 356 is a measure of the amount of user data waiting to be transmitted on uplink traffic channel segments to BS 200. Amount of uplink transmit data 356 includes, e.g., information identifying amounts of data which: have not yet been transmitted, have been transmitted or are in the process of transmission but the WT does not know success/failure status of the transmission and amounts of data which have been unsuccessfully transmitted and require retransmission. Amount of uplink transmit data 356 varies as new data to transmit is received via user I/O interfaces 308, as data is successfully transmitted, and as buffered data to be transmitted is dropped, e.g., due to a timing requirement associated with the data being exceeded. Received maximum allowed uplink data rate 358 includes information identifying the BS assigned maximum uplink data rate indicator indicating the maximum uplink data rate that the WT 300 is permitted to use for assigned uplink traffic channel segments to which the rate indicator corresponds. Different assigned uplink traffic channel segments may be assigned different maximum uplink data rates.

Uplink assigned segment information 360 includes information identifying the uplink traffic channel segments assigned by BS 200 to WT 300, e.g., in received uplink segment assignment messages 392. Uplink assigned segment info 360 also includes information to be communicated via those assigned segments, e.g., user data 398 and data rate information 399 in uplink traffic channel messages 396. Selected uplink transmission rate 362 includes the selection by module 332 for each assigned uplink traffic channel segment, the selected data rate being less than or equal to the received maximum allowed uplink data rate 358 for the uplink traffic channel segment.

System data/information 364 includes base station identification information 365, uplink/downlink timing and frequency structure information 366, maximum base station allowed uplink data rate information 368 and uplink data rate used information 376. Uplink/downlink timing and frequency structure information 366 includes, e.g., symbol timing information, tone spacing information, number of uplink tones, number of downlink tones, uplink carrier frequency, downlink carrier frequency, uplink bandwidth, downlink bandwidth, uplink set of tones, downlink set of tones, uplink tone hopping information, uplink dwell information, downlink tone hopping information, downlink traffic segment structure information, uplink traffic segment structure information, repetitive timing structures, e.g., symbol time intervals and grouping of symbol time intervals into, e.g., dwells, half-slots, slots, superslots, beacon slots, ultra slots, etc. Different sets of UL/DL timing and frequency structure information 366 may exist and be stored in WT 300 corresponding to different BSs 200 in the wireless communications system.

Maximum BS allowed uplink data rate information 368 includes a plurality of sets of data rate information (rate 1 info 370, rate M information 372) and data rate determining information 374. Each set of rate info (370, 372) corresponding to one of the potential data rates that may be determined by module 330 to be indicated as a maximum uplink data transmission rate, e.g., for an assigned uplink traffic channel segment. Data rate determining information 374 includes information used to decode a received signal including max uplink data rate indicator information and to extract the data rate level being communicated from the base station.

Uplink data rate used information 376 includes a plurality of sets of data rate information (rate 1 information 378, rate N information 380), data rate selection criteria 382, and encoding information 384. Each set of data rate information (378, 380) corresponds to a possible uplink data rate which can be used by WT 300 for transmission of uplink traffic channel segment signals. Each uplink data rate corresponds to coding rate and/or modulation type information. Data rate selection criteria 382 includes predetermined and/or dynamic values, limits, comparison references, etc., used by UL data rate selection module 332 when choosing a selected UL data transmit rate 362 from the set of data rates in information (378, 382) for a given uplink traffic channel segment, the selected data rate 362 being less than or equal to the maximum allowed uplink data rate for the given uplink traffic channel segment. Encoding information 384 includes information used to encode a selected uplink data transmit rate 362 with the user data for an uplink traffic channel segment. For example, for a given uplink traffic channel segment within the uplink timing structure used by the BS 200, the encoding information 384 may specify a set of locations, e.g., tone and symbol timing positions within a time frequency grid, for which uplink signals communicated using those locations have additional energy added in addition to the normal energy level used to communicate the user data/information. Different patterns of sets of locations for a given uplink traffic channel segment may correspond to different uplink data rates used.

In some embodiments, different sets of information 366, 368 and/or 376 may exist for different base stations within the wireless communications system. For a given base station for a given uplink traffic channel segment within the uplink structure, the number M of max BS allowed uplink data rates (370, 372) is less than or equal to the number N of uplink data rates used (378, 380). In some embodiments, the number of max BS allowed uplink data rates M (370, 372) is less than the number N of uplink data rates used (378, 380). In some such embodiments, the maximum uplink data rate indicator includes, at most, a number of bits which is less than the number of bits required to uniquely identify the plurality of possible uplink data transmission rates.

Figure 4:
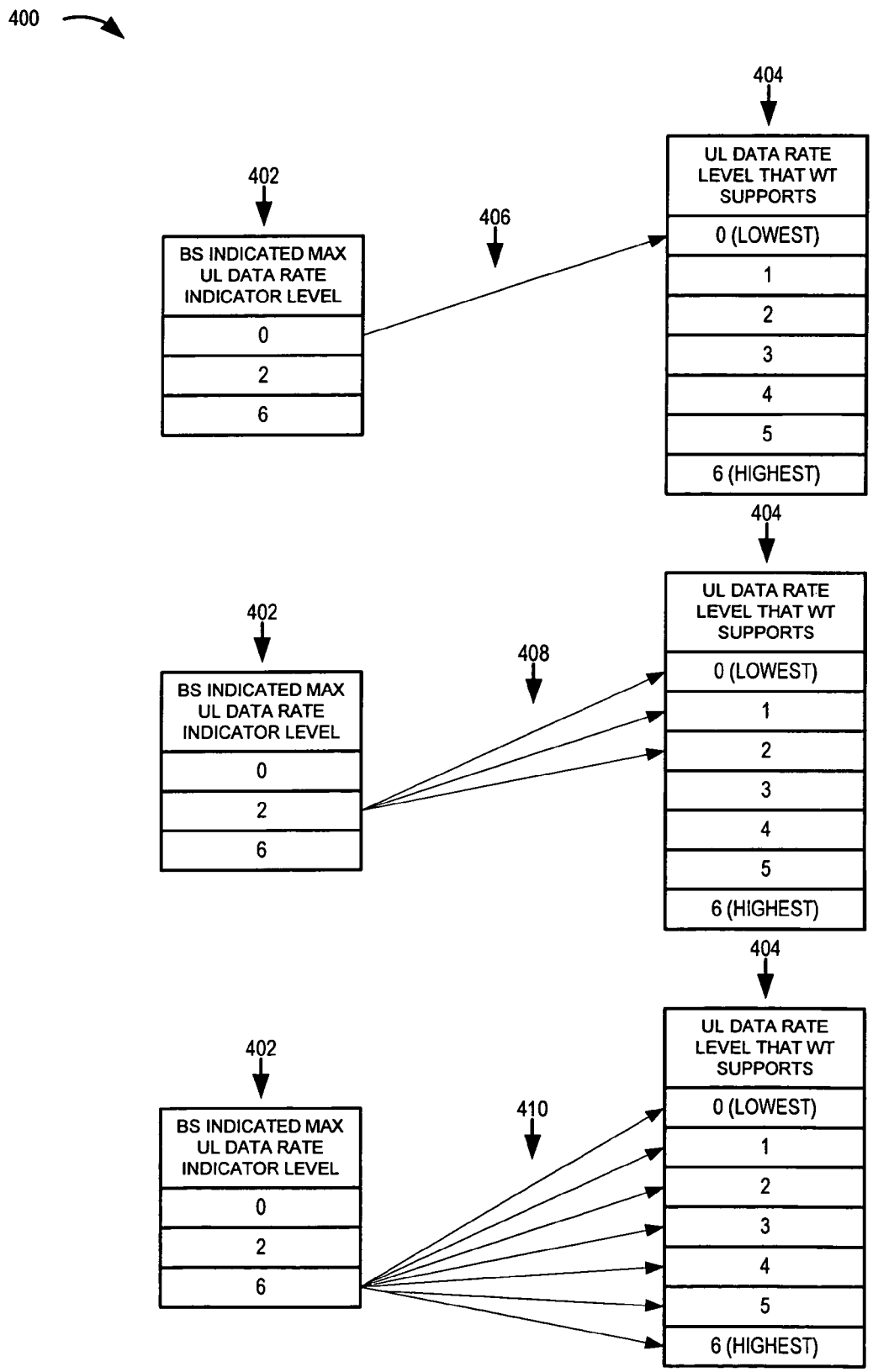
FIG. 4 is a drawing illustrating exemplary base station maximum uplink data rate indicator levels and exemplary corresponding uplink data rate levels that may be selected and used by a wireless terminal.

FIG. 4 is a drawing 400 illustrating exemplary base station maximum uplink data rate indicator levels 402 and exemplary corresponding uplink data rate levels 404 that may be selected and used by a wireless terminal, e.g., for a set of uplink signals. In the example of FIG. 4, there are three potential base station indicated maximum data rate indicator levels (level 0, level 2, and level 6), while there are 7 potential rate levels that are supported by the wireless terminal for uplink transmissions (level 0, level 1, level 2, level 3, level 4, level 5, and level 6). Rate level 0 identifies the lowest data rate while rate level 6 identifies the highest data rate.

Consider that the base station decides that the maximum data rate indicator should indicate rate level 0. The base station sends a data rate indicator included in a downlink message to the wireless terminal. The wireless terminal receives the data rate indicator and determines that it may only use rate 0 for uplink transmissions. This scenario is represented by arrow 406.

Now consider that the base station decides that the maximum data rate indicator should indicate rate level 2. The base station sends a data rate indicator included in a downlink message to the wireless terminal. The wireless terminal receives the data rate indicator and determines that it may use either rate 0, 1 or 2 for uplink transmissions. This scenario is represented by arrows 408.

Now consider that the base station decides that the maximum data rate indicator should indicate rate level 6. The base station sends a data rate indicator included in a downlink message to the wireless terminal. The wireless terminal receives the data rate indicator and determines that it may use either rate 0, 1, 2, 3, 4, 5, 6 for uplink transmissions. This scenario is represented by arrows 410.

In this exemplary embodiment, the number of possible BS indicated maximum data rate indicator levels, 3, can be represented using two bits while the number of possible data rate levels supported by the wireless terminal, 7, can be represented using 3 bits.

In some embodiments, the number of BS maximum data rate indicated levels is chosen to be a value=$2^A$, where A is a positive integer and where the number of data rate levels supported by the WT is chosen to be a value=$2^B$, where B is also an integer, and where $2^A \leq 2^B$. In other embodiments, the number of BS max data rate indicated levels $2^A$ is less than the number of data rate levels supported by the WT $2^B$, in such a case A<B.

Figure 5:
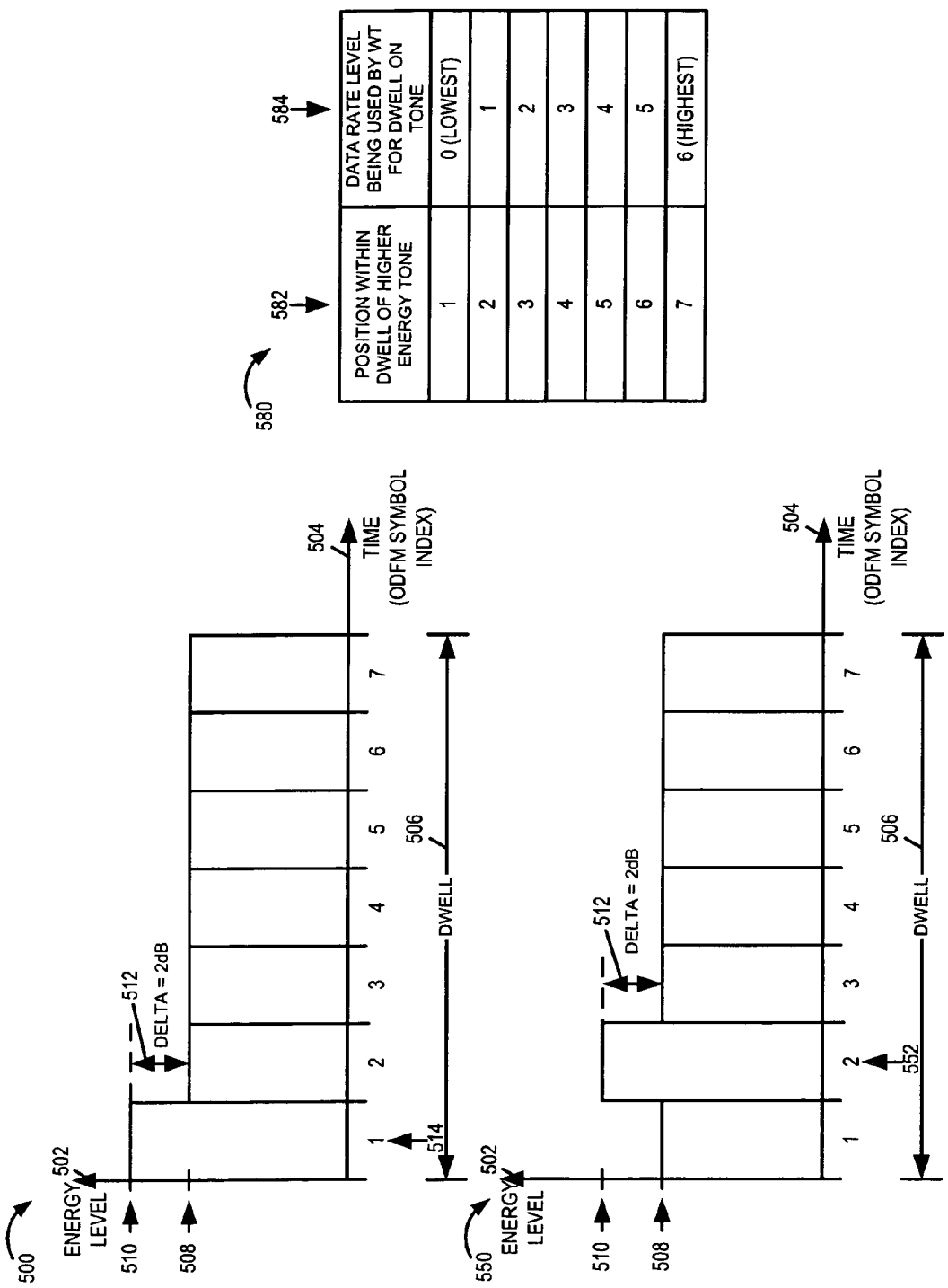
FIG. 5 is a drawing illustrating that an uplink data rate used by a wireless terminal can be conveyed in parallel with uplink user data by concentrating additional energy on one tone of the dwell, in accordance with the present invention.

FIG. 5 illustrates features of the present invention used to convey a wireless terminal's selection of uplink data rate used concurrently with the data/information to be communicated in the uplink signaling. In other embodiments the uplink data rate being used is communicated separately from the transmitted data or the uplink data rate being used is determined by the base station without the rate being explicitly communicated to the base station. In accordance with one feature of the present invention, in at least one exemplary embodiment additional energy is placed on some of the uplink signals, the location of the additional energy is used to determine the data rate used from among a plurality of possible data rates. Drawings 500 and 550 of FIG. 5 are plots for an exemplary uplink tone of energy level on vertical axis 502 vs time, expressed in OFDM symbol index within a dwell, on horizontal axis 504. In this example, a dwell 506 includes seven successive OFDM symbol time intervals, and uplink tones are assigned to a wireless terminal on a per dwell basis and not frequency hopped during the dwell. The nominal energy level for a signal is represented as level 508, while the higher than normal energy level is represented by energy level 510. The difference between energy levels 512 is shown to be a delta of 2 dB. In some embodiments, the power difference is higher. In some embodiments, the power difference is the same in terms of dB for each data rate level, but has been determined based on satisfying requirements of the lowest data rate level. In still other embodiments, the power difference is a function of the data rate level.

Table 580 identifies position within the dwell of the higher energy tone signal, first column 582, while second column 584 identifies the corresponding data rate level being used by the WT for the dwell for the exemplary tone. Drawing 500, in which the higher energy has been placed on the signal for position 1 514 within the dwell 506 signifies that data rate 0, the lowest data rate, is being used for the uplink signal conveyed. Drawing 550, in which the higher energy has been placed on the signal for position 2 552 within the dwell 506 signifies that data rate 1 is being used for the uplink signal conveyed.

Figure 6:
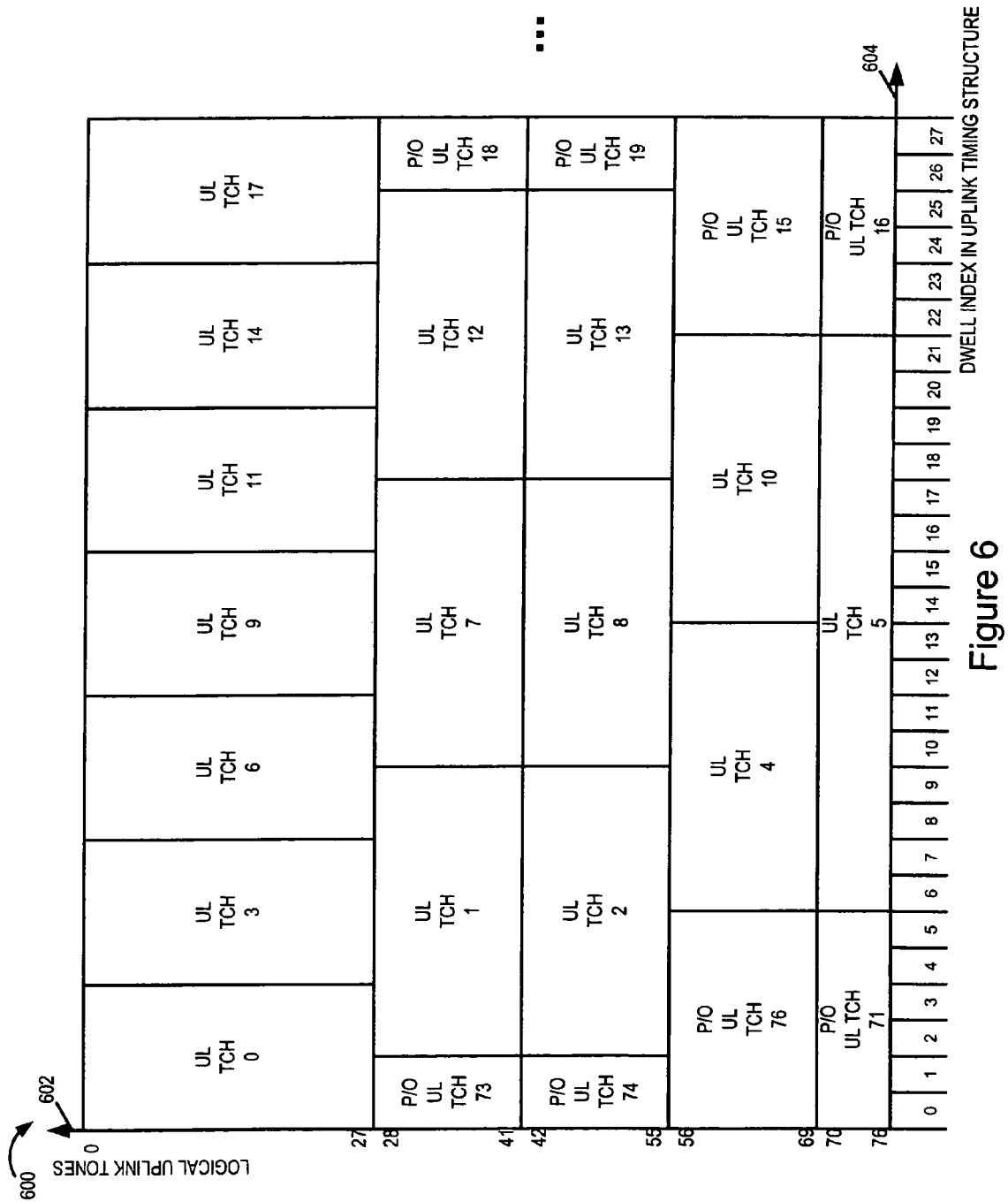
FIG. 6 is a drawing illustrating exemplary uplink traffic channel segments in a wireless communications system.

FIG. 6 is a drawing 600 illustrating exemplary uplink traffic channel segments in a wireless communications system. In the example of FIG. 6, the uplink timing structure divides the uplink air link resource used for uplink traffic channels segments into 76 distinct segments a subset of which is shown in FIG. 6, with the 76 segments repeating over time. Exemplary uplink traffic channel segments 0-14 and 17 are shown as well as portions of segments 15-16, 18-19, 71, 73-74, and 76. Each of the 76 segments includes one or more tones, of 77 possible tones, for one or more symbol transmission time periods. Logical uplink tones (0 . . . 76) are indicated on vertical axis 602 while dwell index (0 . . . 27) in uplink timing structure is indicated on horizontal axis 604. Each logical tone corresponds to an actual physical tone. The relationship between the logical and physical tones can be fixed, e.g., with each logical tone corresponding to the same physical tone over time, or can vary, e.g., according to a predetermined tone hopping sequence used to assign physical tones to logical tones. Different segments within the uplink timing structure have different shapes, e.g., more tones for a shorter duration, such as uplink traffic channel segment 0, or fewer tones for a longer duration, such as uplink traffic channel segment 5.

A base station's scheduler assigns uplink traffic channel segments to WTs. The base station decides which segments and how many are assigned to a wireless terminal. The logical tones within the segment for the duration of the segment are assigned to a wireless terminal; however, in some embodiments, due to tone hopping on dwell boundaries, the physical tones used by the wireless terminal may change from dwell to dwell within the segment. A dwell may include a fixed number of symbol transmission time periods during which the mapping between physical and logical tones remains fixed. In many wireless communications systems, the data/information for each uplink traffic channel segment is typically coded at a coding rate which is used throughout the segment, and the modulation scheme used for the segment is the same. Therefore, uplink data rate information can be communicated on a per uplink traffic channel segment basis.

In accordance with the present invention, the base station selects and communicates maximum uplink data rate indicators, each maximum uplink data rate indicator indicating the maximum uplink data rate that may be used by the wireless terminal for an assigned uplink segment or segments. The wireless terminal receives the maximum uplink data rate indicator and selects, using its own criteria and current information, which uplink data rate to utilize for the uplink traffic channel segment, the WT selected uplink utilized data rate, said WT selected uplink data rate being less or equal to the maximum uplink data rate indicated by the BS maximum uplink data rate indicator. The WT selected uplink data rate corresponds to a coding rate and/or modulation scheme.

FIG. 7 is a table 700 illustrating exemplary data rate options available to a wireless terminal for an uplink traffic segment. First row 702 describes the information included in each column of the table. First column 712 lists the available data rate options (0, 1, 2, 3). Second row 704 includes data rate 0 option information; third row 706 includes data rate 1 option information; fourth row 708 includes data rate 2 option information; fifth row 710 includes data rate 3 option information. Second column 714 lists the number of frames (1, 2, 3, 5). Third column 716 lists the number of information bits (224, 432, 640, 1056). Fourth column 718 lists the codeword length 1344. Sixth column 720 lists the approximate coding rate (1/6, 1/3, 1/2, 5/6). Seventh column 722 lists the modulation constellation used (QPSK, QPSK, QPSK, QPSK). Eighth column 724 lists the per tone relative transmission power offset value (0 dB, 73/32 dB, 129/32 dB, 247/32 dB).

It may be observed, that in the example of FIG. 7, as the data rate used increases, the power utilized by the wireless terminal increases and thus the level of interference created by the WT with respect to other WTs, e.g., in adjacent cells and/or sectors using the same set of tones, in the system also increases. The base station may control overall system interference levels by indicating a maximum indicated data rate level to the wireless terminal, thus restricting the WTs choice of uplink rate options. The wireless terminal may decide to conserve its battery resources by selecting a data rate lower than the allowed maximum value permitted by the base station.

Figure 8:
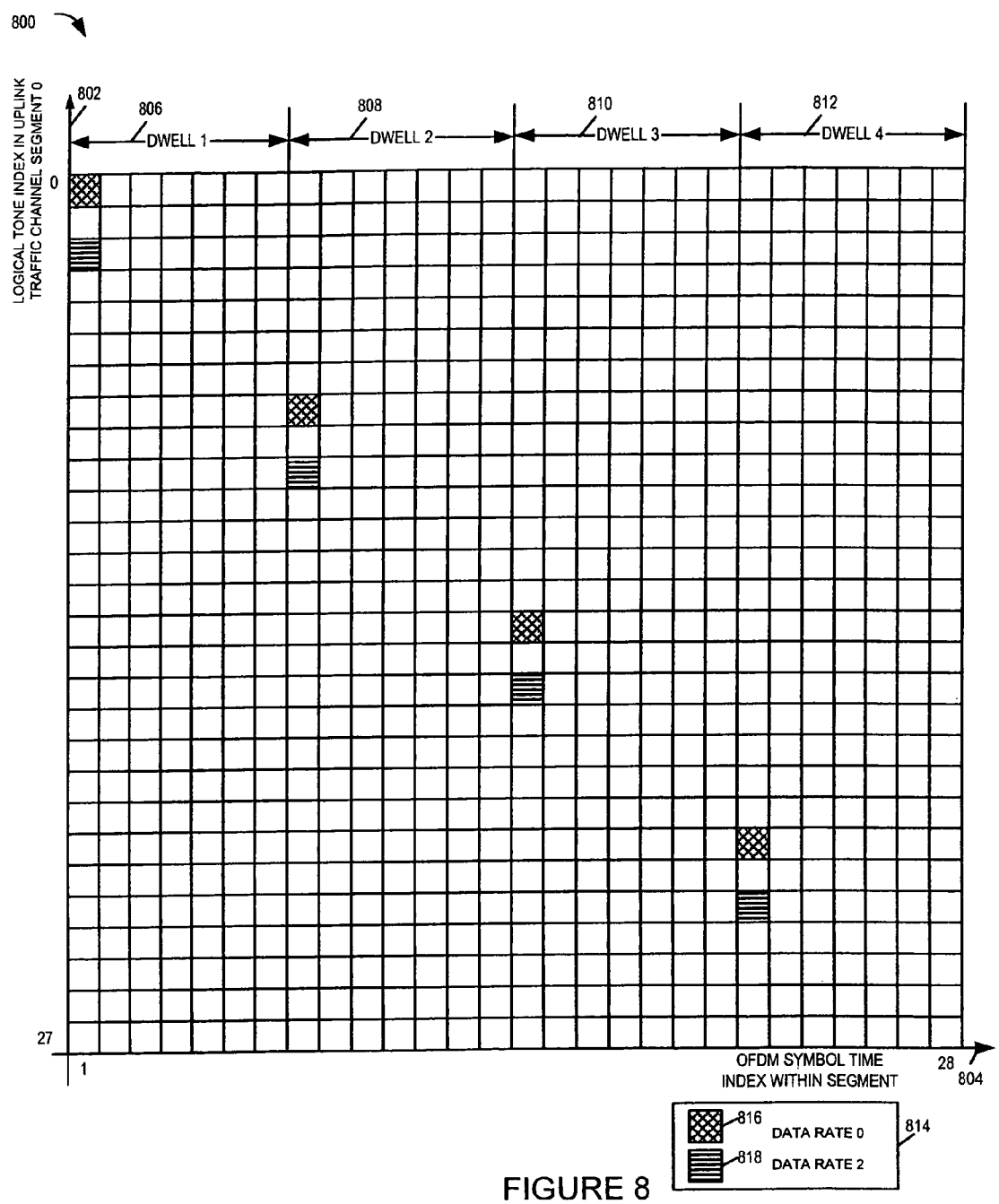
FIG. 8 is a drawing illustrating an exemplary uplink traffic segment, and the concentration of additional energy on a subset on tone-symbols within the dwell to convey the uplink data rate used for the segment, in accordance with the present invention.

FIG. 8 is a drawing 800 illustrating an exemplary uplink traffic segment, and the concentration of additional energy on a subset on tone-symbols within the dwell to convey the uplink data rate used for the segment, in accordance with the present invention. FIG. 8 plots logical tone index in exemplary uplink traffic channel segment 0 on the vertical axis 802 vs time (OFDM symbol index within the segment) on horizontal axis 804. The exemplary segment is further divided into four dwells (dwell 1 806, dwell 2 808, dwell 3 810, dwell 4 812), each dwell including 7 successive OFDM symbol time intervals. The exemplary uplink traffic segment illustrated by grid 800 may represent traffic segment 0 of FIG. 6. In some embodiments, uplink traffic channel segments include a different number of dwells, e.g., 8 or 16 dwells instead of four dwells per segment. In such embodiments, methods described with respect to the four dwell segment embodiment can be extended to those other embodiments. The basic unit of the segment is a tone-symbol represented by a small square, each tone-symbol occupying one tone for a duration of one OFDM symbol time interval. A modulation symbol may be conveyed on each tone-symbol of the segment.

In accordance with the present invention, a pattern of locations where additional energy is concentrated on a subset of signals within the segment identifies the uplink data rate used by the WT for transmission of the uplink traffic channel segment. Different data rates, e.g., as shown in FIG. 7 may be used by the WT. In the exemplary embodiment of FIG. 8, the first OFDM symbol time interval of each dwell is used to convey one tone which has an additional energy concentration, e.g., representing a power difference over the signals communicated on the other tones.

Legend 814 indicates that tone-symbols of type 816 represented with crosshatch shading are part of a pattern corresponding to WT selected data rate 0, while tone-symbols of type 818 represented with horizontal line shading correspond to WT selected data rate 2.

FIG. 8 illustrates two exemplary cases of different WT uplink selected data rates on the same grid 800. Consider that the WT has selected to use data rate 0, then additional energy is placed on the signals corresponding to tone symbols: (tone0, OFDM symbol index 1), (tone 7, OFDM symbol index 8), (tone 14, OFDM symbol index 15), (tone 21, OFDM symbol index 22), while the other tone-symbols of the segment convey signals with nominal energy levels. Now consider that the WT has selected to use data rate 2, then additional energy is placed on the signals corresponding to tone symbols: (tone 2, OFDM symbol index 1), (tone 9, OFDM symbol index 8), (tone 16, OFDM symbol index 15), (tone 23, OFDM symbol index 22), while the other tone-symbols of the segment convey signals with nominal energy levels. Other exemplary data rates, e.g., data rate 1 and data rate 3 may be indicated by different patterns. In some embodiments, each of the patterns represents the same slope within the grid, but with a different offset. In some embodiments, the different patterns may be represented by different slopes and/or including different offsets within the grid.

By selecting a tone-symbol with the same symbol timing position within each dwell, e.g., the first position within each dwell, for the placement of additional energy, the energy used for each OFDM symbol time interval within the each dwell of the uplink segment does not change as a function of the data rate used, as would be the case if the approach of FIG. 5 was used, where position within the dwell determines rate used.

In the example of FIG. 8, the wireless terminal can expect to concentrate a small amount of additional energy on one tone during each first OFDM symbol time interval of each dwell for each uplink traffic channel segment. During the remaining OFDM symbol time intervals of the dwell, the energy levels are nominal.

In addition, the base station knows that the additional energy will be concentrated on one of the tones of each first OFDM symbol index of each dwell of the uplink traffic channel segment. This simplifies the base station's recovery of the uplink transmitted data rate utilized by the wireless terminal and encoded in the uplink traffic segment signals.

It may be observed that the codeword length of the example of FIG. 7 is 1344 bits which using QPSK, conveys 2 coded bits per modulation symbol, corresponding to 672 modulation symbols. The exemplary segment of FIG. 8 includes 784 tone-symbols which can convey 784 modulation symbols. In some embodiments, some tone-symbols of the segment are reserved for reference modulation symbols to support reference based modulation. For example, one tone-symbol, e.g., the fourth OFDM tone-symbol for each tone of the segment for each dwell can be reserved for a reference modulation symbol, e.g., conveying the complex value (1,1). The other six tone-symbols for each tone for each dwell of the segment can be used to convey block encoded information bits according to the rate selected conveyed by the pattern of additional energy within the segment, the rate corresponding to a coding rate and/or a modulation scheme.

Figure 16:
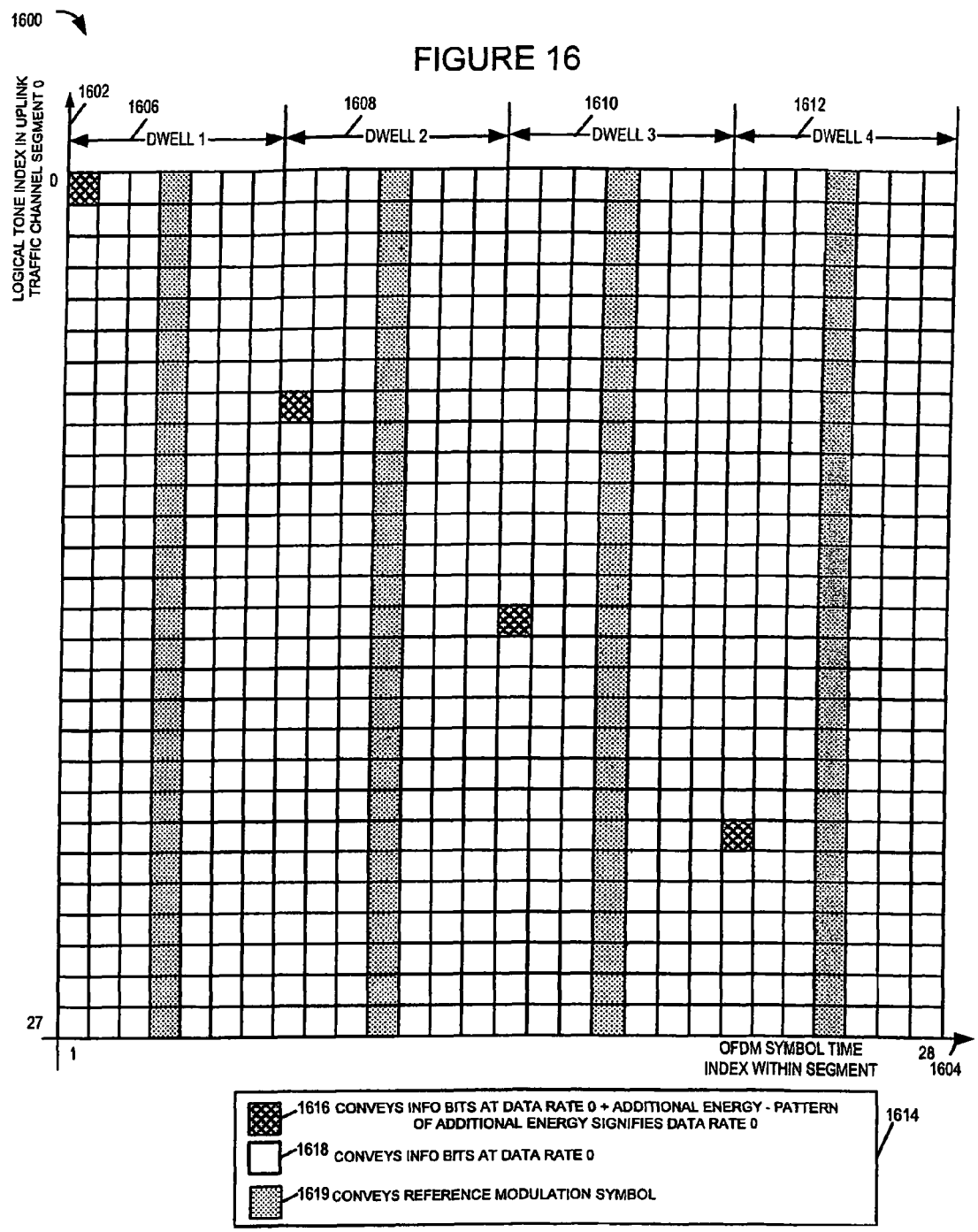
FIG. 16 is a drawing illustrating an exemplary uplink traffic segment including tone-symbols used to convey modulation symbols conveying information bits and tone-symbols used to convey reference modulation symbols, and the concentration of additional energy on a subset on tone-symbols within the dwell to convey the uplink data rate used for the segment, in accordance with the present invention.

FIG. 16 is a drawing 1600 illustrating an exemplary uplink traffic segment including tone-symbols used to convey modulation symbols conveying information bits and tone-symbols used to convey reference modulation symbols, and the concentration of additional energy on a subset on tone-symbols within the dwell to convey the uplink data rate used for the segment, in accordance with the present invention. FIG. 16 plots logical tone index in exemplary uplink traffic channel segment 0 on the vertical axis 1602 vs time (OFDM symbol index within the segment) on horizontal axis 1604. The exemplary segment is further divided into four dwells (dwell 1 1606, dwell 2 1608, dwell 3 1610, dwell 4 1612), each dwell including 7 successive OFDM symbol time intervals. The exemplary uplink traffic segment illustrated by grid 1600 may represent traffic segment 0 of FIG. 6. In some embodiments, uplink traffic channel segments include a different number of dwells, e.g., eight dwells instead of four dwell per segment. In such embodiments, methods described with respect to the four dwell segment embodiment can be extended to those other embodiments. The basic unit of the segment is a tone-symbol represented by a small square, each tone-symbol occupying one tone for a duration of one OFDM symbol time interval. A modulation symbol may be conveyed on each tone-symbol of the segment.

In accordance with the present invention, a pattern of locations where additional energy is concentrated on a subset of signals within the segment identifies the uplink data rate used by the WT for transmission of the uplink traffic channel segment. Different data rates, e.g., as shown in FIG. 7 may be used by the WT. In the exemplary embodiment of FIG. 16, the first OFDM symbol time interval of each dwell is used to convey one tone which has an additional energy concentration, e.g., representing a power difference over the signals communicated on the other tones.

Legend 1614 indicates that tone-symbols of type 1616 represented with crosshatch shading are part of a pattern of modulation symbols with additional energy corresponding to WT selected data rate 0; information bits are conveyed in tone-symbols of type 1616 using data rate 0, data rate 0 signifying a coding rate and/or a modulation scheme. Legend 1614 also indicates modulation symbols at normal energy level conveying information bits at data rate 0 are conveyed in tone-symbols of type 1618 as indicated by no shading. In addition legend 1614 indicates that tone-symbols of type 1619 are used to convey reference modulation symbols.

In the example of FIG. 16, consider that data rate 0 corresponds to data rate 0 of FIG. 7 signifying QPSK modulation scheme and a coding rate of approximately 1/6. Data rate 0 can be expressed as one frame per segment or 224 information bits per segment or 224 information bits per 672 modulation symbols used to convey block encoded information or 224 information bits per 784 modulation symbols. In this example, 672 tone-symbols comprising the combination of tone-symbols of type 1616 and 1618 are used to convey the 1344 encoded bits of the codeword conveying the 224 information bits, with 2 encoded bits per QPSK modulation symbol and one QPSK modulation symbol per tone-symbol. The remaining 112 tone-symbols of the segment are of type 1619 and each conveys a reference QPSK modulation symbol, e.g., conveying the complex value (1,1).

Figure 9:
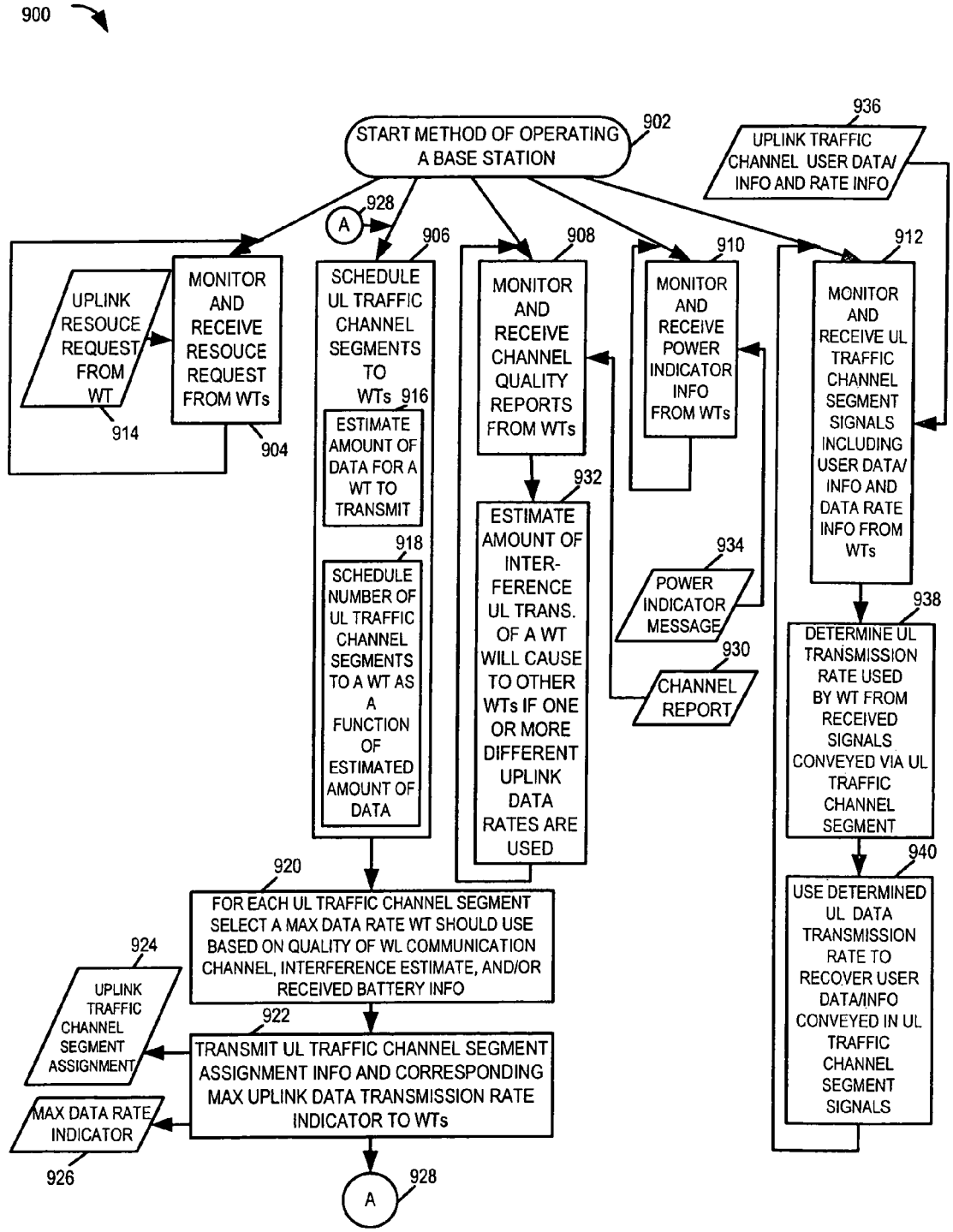
FIG. 9 is a flowchart of an exemplary method of operating a base station in accordance with the present invention.

FIG. 9 is a flowchart 900 of an exemplary method of operating a base station in accordance with the present invention. Operations start in step 902, where the base station is powered on and initialized. The base station may operate using a predetermined frequency and timing structure. The BS may register WTs, which may use the base station as their point of network attachment. Operation proceeds from step 902 to steps 904, 906, 908, 910 and 912.

In step 904, the base station monitors and receives uplink resource requests from WTs 914. The monitoring and reception process may be performed on an ongoing repetitive basis. In some embodiments, WTs are permitted specific times within the repetitive timing structure to send requests for uplink resources, e.g., requests for uplink traffic channel segments.

In step 906, the base station schedules uplink traffic channel segments to WTs, e.g., WTs with outstanding requests. Step 906 includes the base station being operated to assign at least some uplink traffic channel segments to a wireless terminal to be used in communicating data to the base station, said uplink traffic channel segments being wireless communications channel segments dedicated to communicating uplink signals to the base station. Step 906 includes sub-step 916 and 918. In sub-step 916, the base station performs estimates of the amount of data for a wireless terminal to transmit, for each WT that has data to transmit in sub-step 916. Then in sub-step 918, the base station schedules a number of uplink traffic channel segments to a WT, the number of segments being assigned being a function of the estimated amount of estimated data from sub-step 916. Operation proceeds from step 906 to step 920.

In step 920, the base station is operated to select, for each uplink traffic channel segment, a maximum uplink data transmission rate that the wireless terminal should use, the maximum uplink data transmission rate being one of a plurality of possible transmission data rates. The selection by the base station can use information including the quality of the wireless communication channel, interference estimates that the WT will generate to other WTs which will be caused by transmissions from the WT when the selected maximum uplink data transmission rate is used by the WT, and/or received power information in selecting a maximum data uplink rate for a WT for one or more uplink traffic channel segments which are being assigned by the scheduler to the WT. In step 920 a maximum uplink data rate indicator is selected to convey the maximum uplink data rate that the WT is permitted to use for said at least some uplink traffic channel segments. In some embodiments, the selected maximum uplink data transmission rate is one of a plurality of possible uplink data transmission rates which can be selected by the base station and indicated. In some but not all embodiments the number which can be indicated is fewer than the number of uplink data rates which can be selected and used by the wireless terminal for the transmission of uplink signals. In various embodiments, the maximum uplink data rate indicator includes, at most, a maximum number of bits that is less than the number of bits required to uniquely specify the full set of uplink data transmission rates which can be selected and used by the wireless terminal. For example, the possible number of maximum uplink data transmission rates may be four which can be represented by two bits, while the number of uplink data rates that the wireless terminal supports may be eight which would require three bits to uniquely identify each of the rates. Operation proceeds from step 920 to step 922. In step 922, the base station is operated to transmit uplink traffic channel assignment information and a maximum data rate indicator 926 to each WT being assigned uplink traffic channel segments at this time. Operation proceeds from step 922 via connecting node A 928 to step 906 for additional scheduling. Scheduling may be performed in accordance with a predetermined repetitive timing structure being used by the base station.

In step 908, the base station is operated to monitor and receive channel quality reports 930 from WTs. Then, in step 932, the base station estimates the amount of interference uplink transmissions of a WT will cause to other WTs if one or more different uplink data rates, e.g., transmission data rates that can be considered for selection as the maximum uplink data transmission rate, are used by the wireless terminal. This is done by taking into consideration the transmission power that the WT is likely to use to support the considered uplink transmission rate. The transmission power can be predicted from knowledge available at the BS regarding that power level that will be used by the WT given a particular coding rate, modulation scheme, and a set of channel conditions. The channel quality information of step 908, and interference estimate information of step 932 are used in step 920. Operations proceed from step 932 back to step 908 where additional channel quality reports are received. In some embodiments, channel quality reports from connected WTs are transmitted in predetermined times within the base station's uplink timing structure.

In step 910, the base station is operated to monitor and receive powerindicator message 934, e.g., a WT power back-off message and/or battery power message. Monitoring operation of step 910 continue on an ongoing basis. In some embodiments, specific uplink control channel segments, within the uplink timing structure are reserved for the battery indication messages. In some embodiments, battery indicator messages are transmitted if battery power is low and the WT desires the BS to recognize that fact and reduce commanded and/or allowed WT transmission power levels. Power information obtained in step 910 is utilized in step 920.

In step 912, the base station is operated to monitor and receive uplink traffic channel segment data/information 936 including user data/information and data rate information from WTs. Operation proceeds from step 912 to step 938. In step 938, the base station is operated to determine uplink data transmission rate used by a WT. This may be done in a plurality of ways. In some but not all embodiments, this determination is made from received signals included in the same uplink traffic channel segment conveying the user data/information. In some embodiments, such as the one illustrated in FIG. 8, the uplink data rate information is indicated by the location of additional energy beyond the energy used to communicate said data on a predetermined subset of one or more signals, e.g., tones, used to communicate the data. The subset of tones used to communicate the uplink rate is, in some cases, the same as that used to communicate the data. The one or more signals used to communicate rate information may be tones of an orthogonal frequency division multiplexed signal. In some embodiments, the amount of additional energy used to indicate the uplink rate being used is a function of the data rate selected by the WT. The additional energy placed on a tone may be a function of the lowest data rate that may be selected by the WT whether or not it is a function of the actual selected data rate. In one particular exemplary embodiment, where said additional energy is a function of the lowest data rate used, said additional energy is at least 2 dB above the energy used to transmit the data at the lowest data rate. Each data rate, identifying a number of data/information bits conveyed per transmission unit, e.g., symbol or segment. Thus the data rate may be expressed as data/information bits per symbol or the number of data/information bits conveyed per segment. The data/information bits conveyed per segment can alternatively be expressed as the number of data/information frames conveyed per segment, where there is a fixed number of data/information bits in a data/information frame. The data rate will correspond to a coding rate used and/or a modulation scheme used for the signaling since coding and/or modulation affect the number of actual information/data bits that can be conveyed using a given uplink unit. Operation proceeds from step 938 to step 940. In step 940, the base station is operated to use the determined uplink data transmission rate to recover user data/information conveyed in uplink traffic channel signals. Operation proceeds from step 940 to step 912. The base station may perform multiple operations of steps (912, 938, 940) in parallel, e.g., corresponding to the different uplink traffic channel segments within the uplink timing structure.

Figure 10:
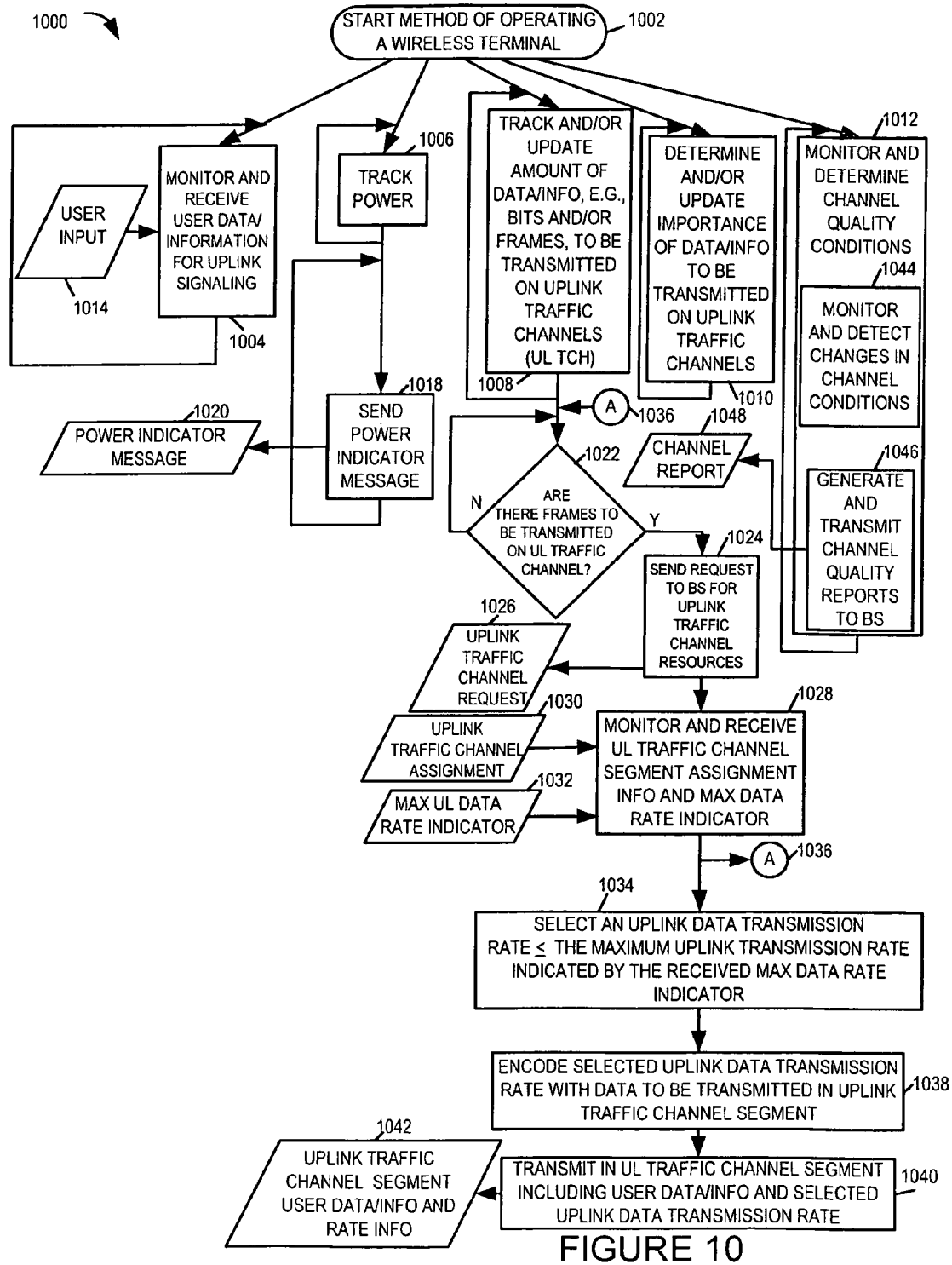
FIG. 10 is a flowchart of an exemplary method of operating a wireless terminal in accordance with the present invention.

FIG. 10 is a flowchart 1000 of an exemplary method of operating a wireless terminal, e.g., a mobile node, in accordance with the present invention. The wireless terminal may be in a wireless communications system including at least one base station which interacts with said wireless terminal via a wireless communications channel. Operations start in step 1002, where the wireless terminal is powered on and initialized. The wireless terminal may register with a base station, e.g., a base station corresponding to the wireless coverage area in which the WT is currently located, and use the base station as its point of network attachment. Operation proceeds from step 1002 to steps 1004, 1006, 1008, 1010 and 1012.

In step 1004, the wireless terminal is operated to monitor for and receive user data/information 1014 for uplink signaling. The user data/input 1014 is data/information corresponding to user input, e.g., voice, text, video, etc., entered via user I/O devices, e.g., microphone, keyboard, keypad, camera, etc. The monitoring of the user I/O devices for input, the reception and storage of received data/info 1014 of step 1004 is performed on an ongoing basis.

In step 1006, the wireless terminal is operated to track available transmission power which can be used for transmission of data signals in the wireless terminal. The tracking of available power may include, e.g., the determination of the amount of power remaining after power is dedicated for the transmission of a set of signals, e.g., control signals, under direction of one or more power control signals received from the base station. The power tracking can also include, in some embodiments, the measurement of the current battery energy level, battery status with respect to predetermined benchmark levels, estimation of remaining energy level and estimation of operational time under various conditions. The tracking of battery power may also include measurements and/or estimates of amounts and/or rates of energy level changes, e.g., decline during usage and/or increase during battery charging. In step 1006, the wireless terminal may also determine whether the wireless terminal is currently operating on its own battery reserves or is operating from an external power source, e.g., a car's electrical system. The power tracking of step 1006 is performed on an ongoing basis.

Operation proceeds from step 1006 to step 1018. In step 1018, the wireless terminal sends a power indicator message 1020, e.g., a back-off message and/or battery power message to the base station. This message indicates the amount of power available for transmitting signals other than the set of signals, e.g., predetermined set of control signals, to which power is allocated in response to the power control commands received from the base station. The message can also indicate the amount of battery power remaining in the wireless terminal. In some embodiments, the power indicator message 1020 may be sent periodically by the WT in accordance with a repeating uplink timing structure used to control the transmission of uplink signals. However, in some cases the transmission of the signals may be discretionary and not use an uplink slot dedicated to power reports. In some embodiments, the current base station commanded WT transmission power level and/or maximum transmission data rate indicator level are considered by the WT in deciding whether or not to send a battery power information in indicator message 1020.

In step 1008, the wireless terminal is operated to track and/or update the amount of data/info, e.g., bits and/or frames to be transmitted on uplink traffic channels. The current value of the amount of uplink data/info to be transmitted will change as new data/info is received via I/O devices, as data/info is in the process of transmission, as data/info is successfully transmitted, as it is determined that data/info has been unsuccessfully transmitted requiring retransmission, and as buffered data/information to be transmitted is dropped, e.g., due to a time validity window expiring. The tracking operation of step 1008 is performed on an ongoing basis. Operation proceeds from step 1008 to step 1022.

In step 1022, the wireless terminal checks as to whether there are currently frames to be transmitted on the uplink traffic channel. If it is determined that there are no frames to be transmitted, then the check of step 1022 is again performed, e.g., at the next designated time in the timing structure such as to allow sufficient time to generate a uplink resource request message prior to the next opportunity for such requests in the timing structure. If it is determined that there are frames to be transmitted, then operation proceeds from step 1022 to step 1024, where the WT sends a request 1026 to the BS for uplink traffic channel resources. Then, in step 1028, the wireless terminal is operated to monitor and receive uplink traffic channel segment assignment information 1030 and a maximum uplink data rate indicator 1032, said uplink traffic channel assignment segment information 1030 and said maximum uplink data rate indicator 1032 having been transmitted from the base station. The maximum uplink data rate indicator indicates a maximum uplink data transmission rate that the wireless terminal is permitted to use for at least one uplink segment. The received uplink traffic channel assignment information 1030 indicates at least one uplink segment assigned to said WT by said BS for using in communicating uplink signals, said maximum uplink data rate indicator indicating the maximum uplink data transmission rate which can be used in said at least one uplink segment assigned to said WT. In some embodiment, the maximum uplink data rate indicator includes, at most, a number of bits which is less than the number of bits required to uniquely identify the plurality of possible uplink data transmission rates which can be selected by the wireless terminal for transmitting uplink signals. As there are generally a plurality of WTs competing for a limited number of uplink traffic channel segments, the WT may not receive the requested assignment on the next set of uplink traffic channel segment assignments. In some embodiments, the wireless terminal, if not granted the request immediately waits, e.g., for a number of assignment opportunities before resubmitting the request. In some embodiments, the wireless terminal, if not granted the request immediately, should resubmit the request. In some embodiments, separate messages are used by the base station for conveying assignment information and maximum uplink rate indicator information. In some embodiments, both uplink traffic channel assignment information and maximum data rate indicator information are in the same message. In some embodiments, the operations of steps 1022, 1024, and/or 1028 may be performed at specific times with respect to the timing structure used by the base station. Operation proceeds from step 1028 to step 1034 and to step 1022 via connecting node A 1036.

In step 1034, the wireless terminal having been assigned an uplink traffic channel segment or segments by the base station along with a maximum uplink rate indicator, selects an uplink transmission rate to use for the uplink traffic channel segment or segments. In various embodiments, the wireless terminal performs the selection as a function of the maximum data rate indicator, the amount of data to be transmitted to the base station, the importance of the data to be transmitted, the power information, channel quality conditions, and/or detected changes in channel conditions. The uplink data transmission rate to use, selected by the WT in step 1034 is a value less than or equal to the data rate indicated by the received maximum uplink data rate indicator. Operation proceeds from step 1034 to step 1038.

In step 1038, which is performed in embodiments where the WT expressly signals the selected uplink data rate to the base station, the wireless terminal is operated to encode the selected uplink data transmission rate, for example, with the data/info to be transmitted in the uplink traffic channel segment. In some embodiments, the WT selected and utilized uplink data rate is indicated by placing additional energy beyond the energy used to communicate the data on a predetermined subset of signals used to communicate the data, the subset corresponding to the uplink data rate used to communicate the data. In some embodiments, said additional energy is a function of the uplink data rate selected by the wireless terminal. In some embodiments, said additional energy is a function of the lowest data rate. In some embodiments, the additional energy is at least 2 dB above the energy used to transmit the data. Operation proceeds from step 1038 to step 1040. The data rate may be communicated in some embodiments using a signal which is sent separately from the data/information to be communicated using the selected uplink data rate.

In step 1040, the wireless terminal is operated to transmit the uplink traffic channel segment signals 1042 including user data/info and the selected uplink data transmission rate, e.g., at the designated time with respect the uplink traffic segment position within the repetitive timing structure. An Ack/Nak corresponding to the transmitted signals of step 1042 is used by the tracking operations of step 1008 to update the amount of data to be transmitted.

In step 1010, the wireless terminal is operated to determine and/or update the importance of data/info to be transmitted on uplink traffic channel segments. For example, different portions of uplink user data to be transmitted may have different levels of importance, e.g., in terms of priority, application, urgency to transmit, etc. Different applications and/or peers may be prioritized, e.g., based on a charging model, user preferences, and/or predetermined agreements. Different applications, e.g., push-to-talk feature, voice phone call, video stream, still video image, text data, etc., may have different transmission latency requirements. Relative importance levels between competing portions of uplink data may change as new uplink user data/info is received. The importance level associated to a portion of uplink data may change as a function of time. For example, a portion of data may represent information for a voice over Internet Protocol (VoIP) call, which has certain latency constraints; therefore as time advances, without transmission of the buffered VoIP data and the acceptable window for transmission begins to shorten, the importance level for that portion of data may increase. The operations of step 1010 are performed on an ongoing basis. The determinations of step 1010 are used by the WT in deciding which portions of the data to transmit first and selecting the uplink data transmission rate used in step 1034.

In step 1012, the wireless terminal is operated to monitor and determine channel quality conditions of the communications channel between the base station and wireless terminal. Step 1012 includes sub-step 1044 and 1046. In sub-step 1044, the wireless terminal is operated to monitor and detect changes in channel conditions. In step 1046, the wireless terminal is operated to generate and transmit channel quality reports 1048 to the base station. In general, the channel condition change information is updated on a more frequent basis and includes more information than the channel quality feedback reports to the base station, providing the wireless terminal with current and pertinent information to use in the uplink data rate selection step 1034.

Figure 11:
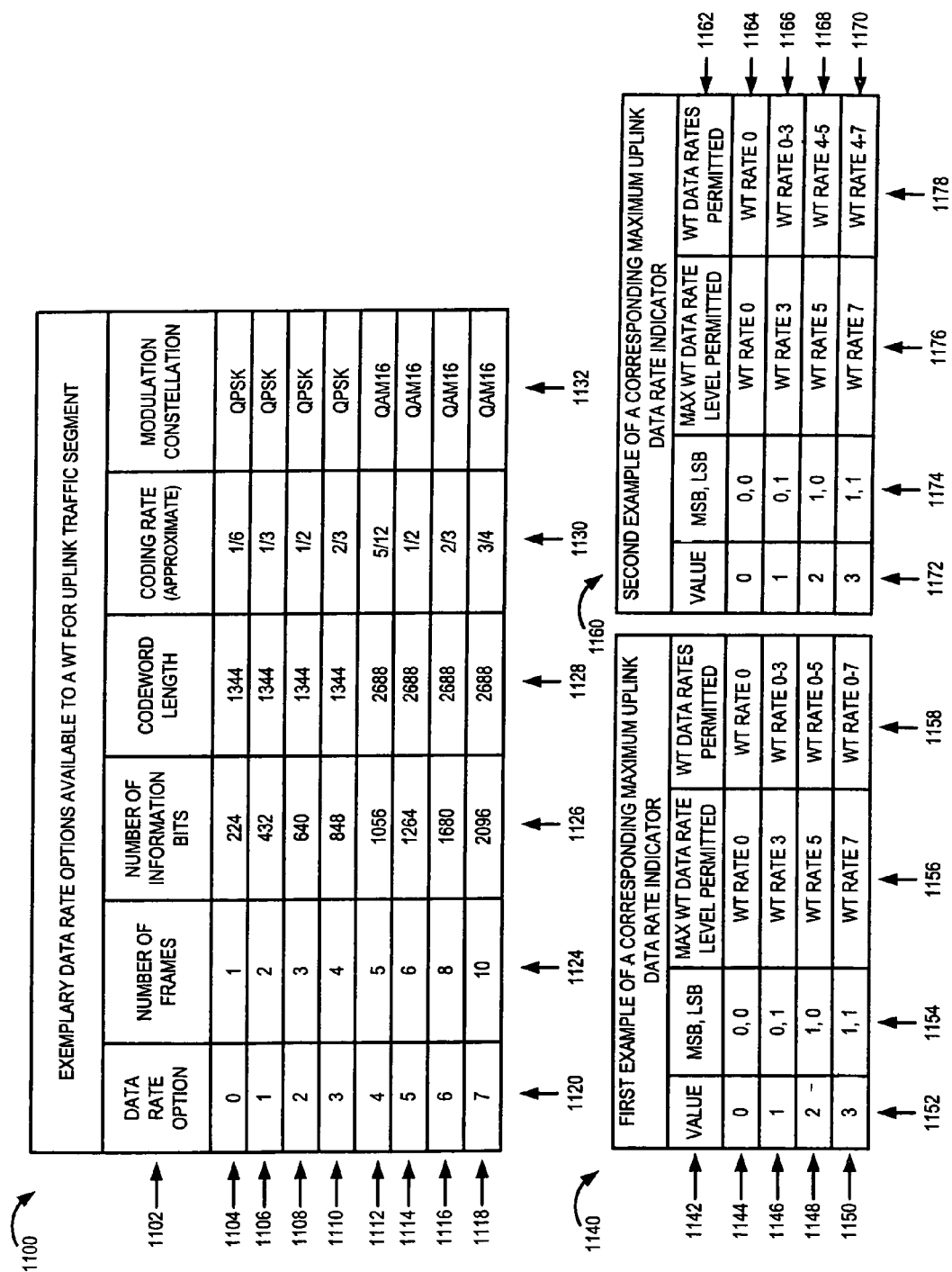
FIG. 11 is another example of exemplary data rate options available to an exemplary wireless terminal for an uplink traffic segment, and examples of corresponding maximum uplink data rate indicators, in accordance with the present invention.

FIG. 11 is another example of exemplary data rate options available to an exemplary wireless terminal for an uplink traffic segment, and examples of corresponding maximum uplink data rate indicators, in accordance with the present invention. FIG. 11 includes a table 1100 illustrating exemplary data rate options available to a wireless terminal for an uplink traffic segment. Table 1100 illustrates the WT uplink data rate is, in some embodiments, a function of both the coding rate used and the modulation scheme used. First row 1102 describes the information included in each column of the table. First column 1120 lists the available data rate options (0, 1, 2, 3, 4, 5, 6, 7). Second row 1104 includes data rate 0 option information; third row 1106 includes data rate 1 option information; fourth row 1108 includes data rate 2 option information; fifth row 1110 includes data rate 3 option information; sixth row 1112 includes data rate 4 option information, seventh row 1114 includes data rate 5 option information; eighth row 1116 includes data rate 6 option information; ninth row 1118 includes data rate 7 option information. Second column 1124 lists the number of frames (1, 2, 3, 4, 5, 6, 8, 10). Third column 1126 lists the number of information bits (224, 432, 640, 848, 1056, 1264, 1680, 2096). Fourth column 1128 lists the codeword length (1344, 1344, 1344, 1344, 2688, 2688, 2688, 2688). Sixth column 1130 lists the approximate coding rate (1/6, 1/3, 1/2, 2/3, 5/12, 1/2, 2/3, 3/4). Seventh column 1132 lists the modulation constellation used (QPSK, QPSK, QPSK, QPSK, QAM16, QAM16, QAM16, QAM16).

FIG. 11 also includes a table 1140 of a first example of a corresponding maximum uplink data rate indicator that may be selected by a base station and transmitted to a wireless terminal supporting the exemplary uplink data rate options for uplink traffic segments of table 1100. First row 1142 describes the information listed in each column of the table. Second row 1144, lists information corresponding to a maximum uplink data rate indicator value of 0; third row 1146 lists information corresponding to a maximum uplink data rate indicator value of 1; fourth row 1148 lists information corresponding to a maximum uplink data rate indicator value of 2; fifth row 1150 lists information corresponding to a maximum uplink data rate indicator value of 3. Second column 1154 lists the (MSB, LSB) used to represent each of the four possible data rate indicator values (0, 1, 2, 3) as ((0,0), (0,1), (1,0), (1,1)), respectively. Third column 1156 lists the maximum wireless terminal data rate level permitted corresponding to each of the four possible data rate indicator values (0, 1, 2, 3) as (WT data rate option 0, WT data rate option 3, WT data rate option 5, WT data rate option 7), respectively. Fourth column 1156 lists the WT data rates permitted for each of the four possible data rate indicator values (0, 1, 2, 3) as (WT data rate 0, WT data rate 0-3, WT data rate 0-5, WT data rate 0-7), respectively. It should be noted that in this exemplary embodiment, the WT supports 8 different uplink data rates which could be represented by 3 bits, while the maximum uplink data rate indicator includes only four values which can be represented by 2 bits.

FIG. 11 also includes a table 1160 of a second example of a corresponding maximum uplink data rate indicator that may be selected by a base station and transmitted to a wireless terminal supporting the exemplary uplink data rate options for uplink traffic segments of table 1100. First row 1162 describes the information listed in each column of the table. Second row 1164, lists information corresponding to a maximum uplink data rate indicator value of 0; third row 1166 lists information corresponding to a maximum uplink data rate indicator value of 1; fourth row 1168 lists information corresponding to a maximum uplink data rate indicator value of 2; fifth row 1170 lists information corresponding to a maximum uplink data rate indicator value of 3. Second column 1174 lists the (MSB, LSB) used to represent each of the four possible data rate indicator values (0, 1, 2, 3) as ((0,0), (0,1), (1,0), (1,1)), respectively. Third column 1176 lists the maximum wireless terminal data rate permitted corresponding to each of the four possible data rate indicator values (0, 1, 2, 3) as (WT data rate option 0, WT data rate option 3, WT data rate option 5, WT data rate option 7), respectively. Fourth column 1178 lists the WT data rates permitted for each of the four possible data rate indicator values (0, 1, 2, 3) as (WT data rate 0, WT data rate 0-3, WT data rate 4-5, WT data rate 4-7), respectively. In this embodiment, for each maximum uplink data rate indicator value, the wireless terminal can select from a predefined subset of WT data rates corresponding to that data rate indicator values, the WT data rates within the subset being data rates that are less than or equal to the maximum uplink data rate indicator value. Although in this example each subset of data rates is shown as a continuous block of data rates, in general, the WT uplink data rates included in each subset of predefined data rates need not be continuous.

Figure 12:
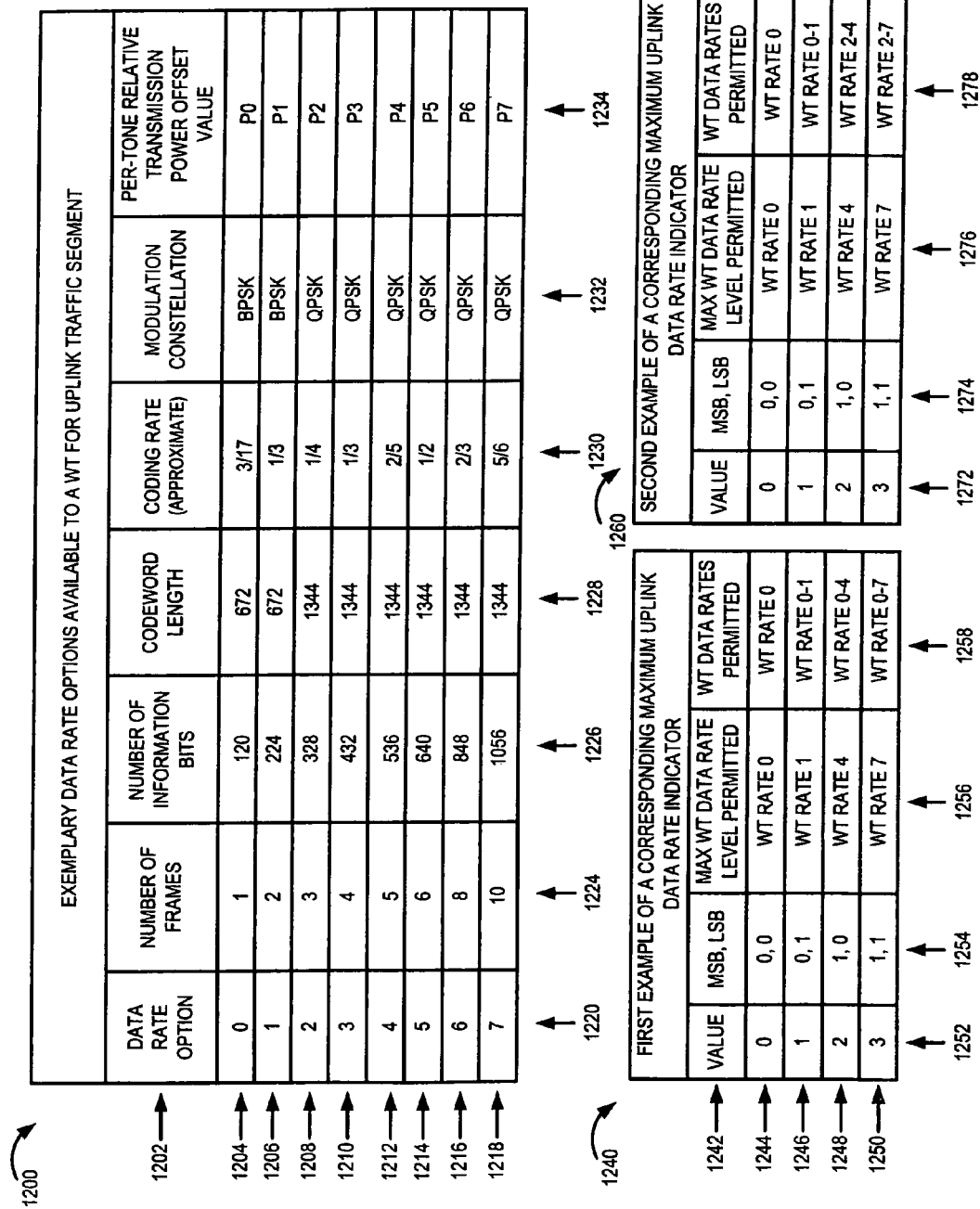
FIG. 12 is another example of exemplary data rate options available to an exemplary wireless terminal for an uplink traffic segment, and examples of corresponding maximum uplink data rate indicators, in accordance with the present invention.

FIG. 12 is another example of exemplary data rate options available to an exemplary wireless terminal for an uplink traffic segment, and examples of corresponding maximum uplink data rate indicators, in accordance with the present invention. FIG. 12 includes a table 1200 illustrating exemplary data rate options available to a wireless terminal for an uplink traffic segment. First row 1202 describes the information included in each column of the table. First column 1220 lists the available data rate options (0, 1, 2, 3, 4, 5, 6, 7). Second row 1204 includes data rate 0 option information; third row 1206 includes data rate 1 option information; fourth row 1208 includes data rate 2 option information; fifth row 1210 includes data rate 3 option information; sixth row 1212 includes data rate 4 option information, seventh row 1214 includes data rate option 5 information; eighth row 1216 includes data rate 6 option information; ninth row 1218 includes data rate 7 option information. Second column 1224 lists the number of frames (1, 2, 3, 4, 5, 6, 8, 10). Third column 1226 lists the number of information bits (120, 224, 328, 432, 536, 640, 848, 1056). Fourth column 1228 lists the codeword length (672, 672, 1344, 1344, 1344, 1344, 1344, 1344). Sixth column 1230 lists the approximate coding rate (3/17, 1/3, 1/4, 1/3, 2/5, 1/2, 2/3, 5/6). Seventh column 1232 lists the modulation constellation used (BPSK, BPSK, QPSK, QPSK, QPSK, QPSK, QPSK, QPSK). Eighth column 1234 lists the per tone relative transmission power offset value (P0, P1, P2, P3, P4, P5, P6, P7). In some embodiments, the power levels are such that P0<P1<P2<P3<P4<P5<P6<P7.

FIG. 12 also includes a table 1240 of a first example of a corresponding maximum uplink data rate indicator that may be selected by a base station and transmitted to a wireless terminal supporting the exemplary uplink data rate options for uplink traffic segments of table 1200. First row 1242 describes the information listed in each column of the table. Second row 1244, lists information corresponding to a maximum Uplink data rate indicator value of 0; third row 1246 lists information corresponding to a maximum uplink data rate indicator value of 1; fourth row 1248 lists information corresponding to a maximum uplink data rate indicator value of 2; fifth row 1250 lists information corresponding to a maximum uplink data rate indicator value of 3. Second column 1254 lists the (MSB, LSB) used to represent each of the four possible data rate indicator values (0, 1, 2, 3) as ((0,0), (0,1), (1,0), (1,1)), respectively. Third column 1256 lists the maximum wireless terminal data rates permitted corresponding to each of the four possible data rate indicator values (0, 1, 2, 3) as (WT data rate option 0, WT data rate option 1, WT data rate option 4, WT data rate option 7), respectively. Fourth column 1258 lists the WT data rates permitted for each of the four possible data rate indicator values (0, 1, 2, 3) as (WT data rate 0, WT data rate 0-1, WT data rate 0-4, WT data rate 0-7), respectively. It should be noted that in this exemplary embodiment, the WT supports 8 different uplink data rates which could be represented by 3 bits, while the maximum uplink data rate indicator supports a maximum of four possible values which can be represented by 2 bits.

FIG. 12 also includes a table 1260 of a second example of a corresponding maximum uplink data rate indicator that may be selected by a base station and transmitted to a wireless terminal supporting the exemplary uplink data rate options for uplink traffic segments of table 1200. First row 1262 describes the information listed in each column of the table. Second row 1264, lists information corresponding to a maximum uplink data rate indicator value of 0; third row 1266 lists information corresponding to a maximum uplink data rate indicator value of 1; fourth row 1268 lists information corresponding to a maximum uplink data rate indicator value of 2; fifth row 1270 lists information corresponding to a maximum uplink data rate indicator value of 3. Second column 1274 lists the (MSB, LSB) used to represent each of the four possible data rate indicator values (0, 1, 2, 3) as ((0,0), (0,1), (1,0), (1,1)), respectively. Third column 1276 lists the maximum wireless terminal data rate permitted corresponding to each of the four possible data rate indicator values (0, 1, 2, 3) as (WT data rate option 0, WT data rate option 1, WT data rate option 4, WT data rate option 7), respectively. Fourth column 1278 lists the WT data rates permitted for each of the four possible data rate indicator values (0, 1, 2, 3) as (WT data rate 0, WT data rate 0-1, WT data rate 2-4, WT data rate 2-7), respectively. In this embodiment, for each maximum uplink data rate indicator value, the wireless terminal can select from a predefined subset of WT data rates corresponding to that rate indicator values, the WT rates within the subset being rates that are less than or equal to the maximum uplink data rate indicator value. Although in this example each subset of data rates is shown as a continuous block of data rates, in general, the WT uplink data rates included in each subset of predefined data rates need not be continuous.

FIG. 13 is a table 1300 illustrating another set of exemplary data rate options available to a wireless terminal for an uplink traffic segment. First row 1302 describes the information included in each column of the table. First column 1312 lists the available data rate options (0, 1, 2, 3). Second row 1304 includes data rate 0 option information; third row 1306 includes data rate 1 option information; fourth row 1308 includes data rate 2 option information; fifth row 1310 includes data rate 3 option information. Second column 1314 lists the number of frames (1, 2, 3, 5). Third column 1316 lists the number of information bits (224, 432, 640, 1056). Fourth column 1318 lists the codeword length 1344. Sixth column 1320 lists the approximate coding rate (1/6, 1/3, 1/2, 5/6). Seventh column 1322 lists the modulation constellation used (QPSK, QPSK, QPSK, QPSK). Eighth column 1324 lists the per tone relative transmission power offset value (0 dB, 0 dB, 0 dB, 0 dB).

It may be observed, that in the example of FIG. 13, that the WT power used remains constant event though the data rate changes. Thus the wireless terminal by selecting a lower data rate to use than the maximum permitted uplink data rate as communicated by the received uplink maximum data rate indicator value, can improve the probability that the transmitted uplink signals for the uplink traffic channel segment will be successfully received by the base station and thus improves uplink signaling reliability. The base station may control overall system interference levels by indicating a maximum indicated data rate level to the wireless terminal, thus restricting the WTs choice of user selection options. The wireless terminal may decide, e.g., based on information available to the WT at a given time such as importance, e.g., urgency, of a portion of data to be communicated, that a higher probability of transmission success is more advantageous to the WT than a higher data rate and thus the WT may select a lower data rate.

In various embodiments, for the same WT, some WT uplink data rate options may have the same associated power levels and some WT uplink data rate options may have different associated power levels.

Figure 14:
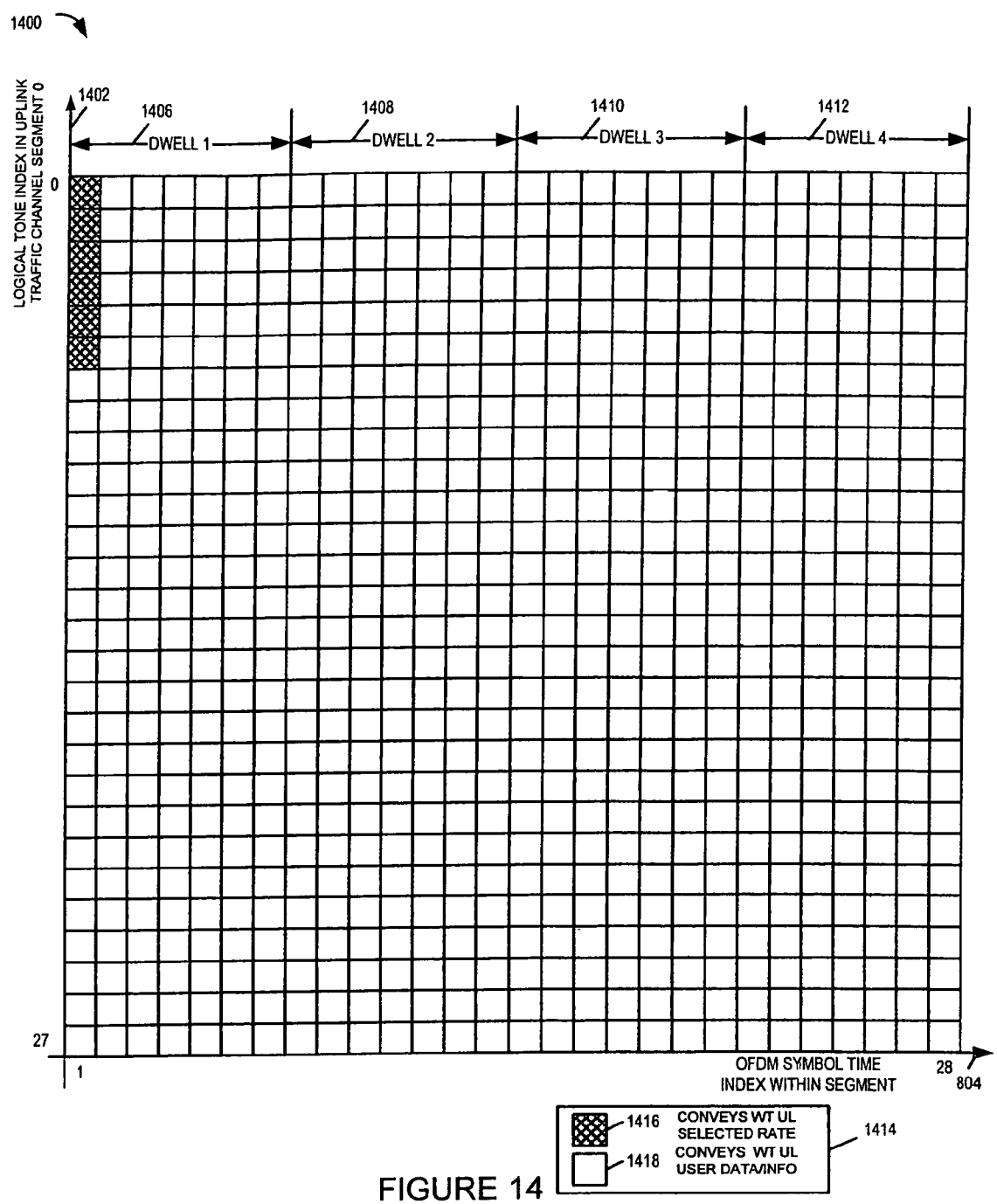
FIG. 14 is a drawing illustrating an exemplary uplink traffic segment, and the partitioning of the segment into a subset of tone-symbols to convey the uplink data rate used for the user data/info signals of the segment and a subset of tone-symbols used to convey user data/information, in accordance with some embodiments the present invention.

FIG. 14 illustrates an alternative approach, with respect to the previously presented approach of placing additional energy on a subset of signals, to conveying WT selected uplink data rate in an uplink traffic segment. FIG. 14 is a drawing 1400 illustrating an exemplary uplink traffic segment, and the partitioning of the segment into a subset of tone-symbols to convey the uplink data rate used for the user data/info signals of the segment and a subset of tone-symbols used to convey user data/information, in accordance with some embodiments the present invention. FIG. 14 plots logical tone index in exemplary uplink traffic channel segment 0 on the vertical axis 1402 vs time (OFDM symbol index within the segment) on horizontal axis 1404. The exemplary segment is further divided into four dwells (dwell 1 1406, dwell 2 1408, dwell 3 1410, dwell 4 1412), each dwell including 7 successive OFDM symbol time intervals. The exemplary uplink traffic segment illustrated by grid 1400 may represent traffic segment 0 of FIG. 6. The basic unit of the segment is a tone-symbol represented by a small square, each tone-symbol occupying one tone for a duration of one OFDM symbol time interval. A modulation symbol may be conveyed on each tone-symbols of the segment.

In accordance with some embodiments of present invention, a predetermined subset of locations within the segment is dedicated to conveying the uplink data rate used within the segment for user data/information of the segment. Different data rates, e.g., 8 different uplink data rates which may be represented by 3 information bits, may be used by the WT. Each uplink data rate may signify a coding rate and modulation scheme, e.g., BPSK, QPSK, and/or QAM16, used for user data/information modulation symbols of the uplink traffic channel segment. In the exemplary embodiment of FIG. 14, six tone-symbols of the segment have been reserved to convey the three data rate used information bits. A non-coherent modulation scheme may be used to convey those three information bits over six modulations symbols corresponding to the six reserved tone-symbol locations of the uplink traffic channel segment.

Legend 1414 indicates that the 6 tone-symbol of type 1416 in grid 1400 represented with crosshatch shading are part of a subset of tone-symbols used to convey the WT selected uplink data rate, while the 778 tone-symbols of type 1418 represented with no shading in grid 1400 are used to convey WT uplink user data/information. In some embodiments, the modulation scheme used for the tone-symbols of type 1416 is the same irrespective of the modulation scheme used for the user data/information tone-symbols of type 1418. In such an embodiment, the WT would select an uplink data rate as a function of the received maximum uplink data rate indicator and other WT selection criteria, e.g., amount of data, importance of data, changes in quality, channel conditions, power available for transmitting user data, battery power status, etc. The selection of uplink data rate would identify a data rate level, the data rate level having a corresponding coding rate and modulation scheme. The data rate level would be encoded into a set of modulation symbols for the six tone-symbol locations of type 1416 using a predetermined non-coherent modulation scheme which does not change. The user data/information would be encoded and modulated using the selected corresponding coding rate and modulation scheme onto a set of modulation symbols for the 778 tone-symbols of type 1418. The base station would receive the modulation symbols conveyed by the tone-symbols of the uplink traffic channel segment, demodulate and decode the rate signals conveyed in the six tone-symbols of type 1416, thus obtaining the data rate option used for the user data/information. Having determined the data rate option used, the base station determines, e.g., via a look-up table, the modulation scheme and coding rate used for the user data/information modulation symbols conveyed on tone-symbols of type 1418, demodulates and decodes the user data/information received signals of the segment recovering the user data/information bits.

Figure 15:
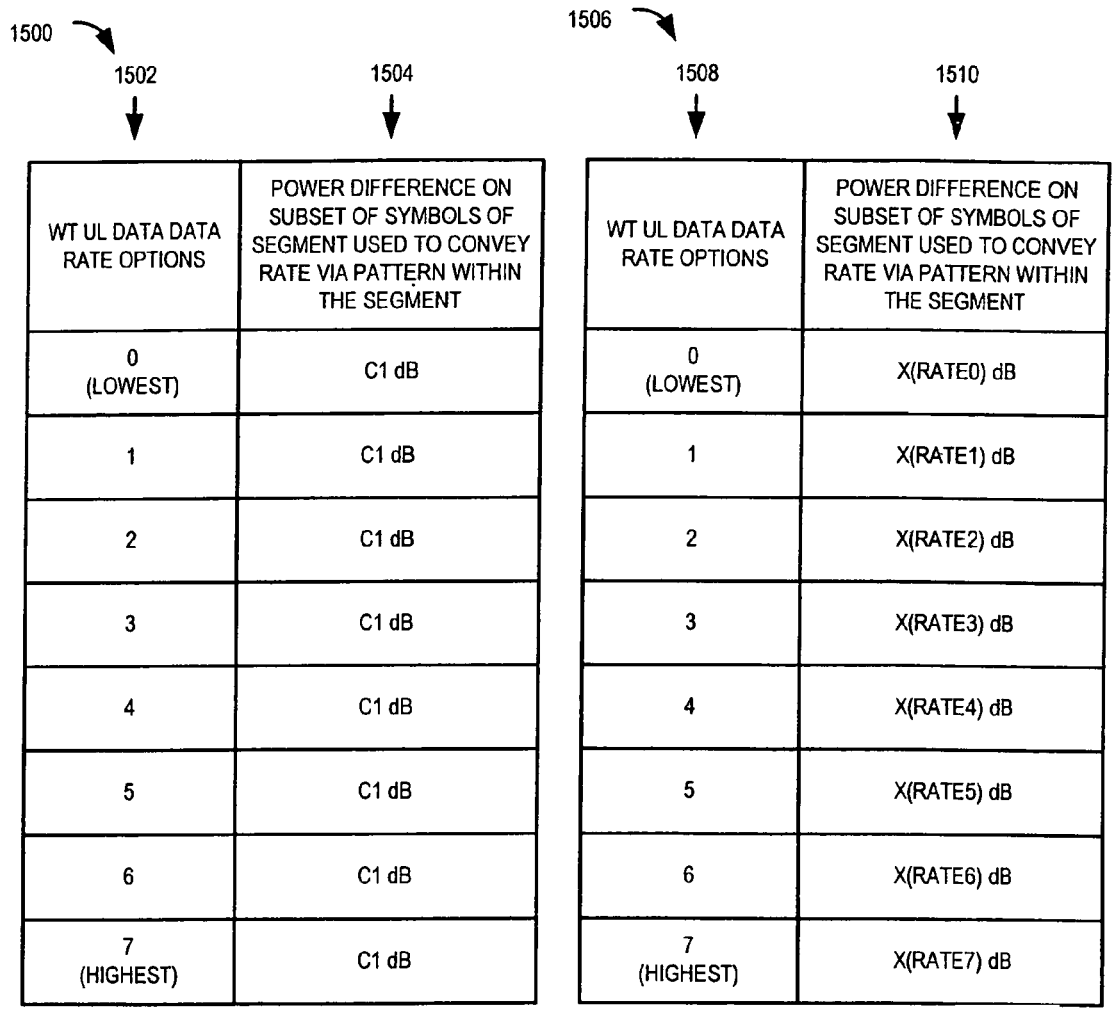
FIG. 15 includes tables illustrating exemplary embodiments in which the wireless terminal selected uplink data transmission rate may be communicated by a power difference placed on a subset of symbols of the uplink segment, and the power difference may be a fixed value or may be a value which is a function of the selected data rate in terms of dB above the power level used to communicate the user data/information modulation symbol.

FIG. 15 includes table 1500 illustrating that in some embodiments, the wireless terminal selected uplink data transmission rate may be communicated by a power difference placed on a subset of symbols of the uplink segment and the power difference may be a fixed value in terms of dB above the power level used to communicate the user data/information modulation symbol regardless of the uplink data rate selected. The subset of symbols being located within the segment to define a pattern, different patterns defining different data rates. Table 1500 includes a first column 1502 listing eight exemplary uplink data rate options (rate 0, rate 1, rate 2, rate 3, rate 4, rate 5, rate 6, rate 7), where rate 0 corresponds to the lowest rate and rate 7 corresponds to the highest rate. Second column 1504, lists the power difference on the subset of modulation symbols used to convey the selected uplink data rate via a pattern within the segment. Each value of column 1504 is the same C1 dB, where C1 is a constant, e.g., 2 dB. C1 may be selected to allow the selected data rate to be recovered under a specified worst case condition, which in some embodiments, is the lowest rate, e.g., data rate option 0, using the lowest transmission power level.

FIG. 15 also includes table 1506 illustrating that in some embodiments, the wireless terminal selected uplink data transmission rate may be communicated by a power difference placed on a subset of symbols of the uplink segment and the power difference may be an amount X dB above the power level used to communicate the user data/information modulation symbol where X is a function of the uplink data rate selected. The wireless terminal and base station would both know the power difference relationship being employed in the system. The subset of symbols being located within the segment to define a pattern, different patterns defining different data rates. Table 1506 includes a first column 1508 listing eight exemplary uplink data rate options (rate 0, rate 1, rate 2, rate 3, rate 4, rate 5, rate 6, rate 7), where rate 0 corresponds to the lowest rate and rate 7 corresponds to the highest rate. Second column 1510, lists the power difference on the subset of modulation symbols used to convey the selected uplink rate via a pattern within the segment. For each data rate (0, 1, 2, 3, 4, 5, 6, 7), the power difference X dB is a function of the rate (X(rate0), X(rate1), X(rate2), X(rate 3), X(rate4), X(rate5), X(rate 6), X(rate7)) and may be different from one rate to the next, e.g., X(rate0) dB>X(rate1) dB. In some embodiments, as rate increases, the transmission power level for user/data modulation symbols also increases, and the power difference X(rate) may decrease. The power difference X(rate) dB may be selected to be sufficient to distinguish the signals conveying the additional energy from those without the additional energy. In some embodiments, e.g., embodiments, where at least one of the rates is a QAM rate, different additional power level differences may exist for different amplitude levels within the QAM rate. By varying the additional power level as a function of rate (as shown in Table 1506), WT power can be conserved over methods where a fixed power difference is used (as shown in Table 1500) which has been set to a specified worst case condition based on one level.

The method described with respect to exemplary tables 1500 and 1506 may be applicable in embodiments such as those illustrated with the exemplary uplink traffic segment of FIG. 8.

FIG. 17 is a table 1700 illustrating an exemplary relationship between base station selected maximum rate indicators and data rates that a wireless terminal can select in another exemplary embodiment of the present invention. First row 1702 identifies that columns (1714, 1716, 1718) include base station selected maximum rate indicator value information, while columns (1720, 1722, 1724, 1726, 1728, 1730, 1732, 1734, 1736, 1738, 1740, 1742, 1744, 1746, 1748, 1750) include information identifying data rates that a WT can select, given a BS selected maximum rate indicator value. Second row 1704 identifies that: 1$^{st}$ column 1714 includes BS selected maximum rate indicator values, 2$^{nd}$ column 1716 includes the corresponding most significant bit (MSB) value, and third column 1718 includes the corresponding least significant bit (LSB) value. Fourth through nineteenth columns (1720, 1722, 1724, 1726, 1728, 1730, 1732, 1734, 1736, 1738, 1740, 1742, 1744, 1746, 1748, 1750) correspond to data rates (15, 14, 13, 12, 11, 10, 9, 8, 7, 6, 5, 4, 3, 2, 1, 0) supported by WTs in the system, where data rate 15 corresponds to the highest data rate and data rate 0 corresponding to the lowest data rate.

In this exemplary embodiment a BS can select one of four maximum rate indicator values, which can be represented using two bits. Sixteen different rates are possible for WTs in the system which would require 4 bits to represent each potential rate. However, each of the four maximum rate indicator values is associated with a maximum rate and a different subset of potential rates that the wireless is allowed to select from, each subset corresponding to a specific one of the four maximum rate indicators. In this example, each subset of data rates includes 8 different data rates which may be represented by three bits. When the wireless terminal selects a data rate from the designated subset of 8 rates as indicated by the received maximum rate indicator value, the selected rate can be encoded using 3 bits, with the coded bits having different representations depending upon the rate indicator value.

In this exemplary embodiment, different BS selected maximum rate indicator values may correspond to the same maximum data rate but different subsets of data rates which may be selected by the wireless terminal. Members of a subset are indicated by Xs in the column corresponding to the data rate. Thus two maximum rate indicators may correspond to the same maximum data rate but can be used to restrict a wireless terminal to select from different subsets of rates, where the WT is allowed to select a rate within the subset of rates corresponding to a received maximum rate indicator where the selected rate is less than or equal to the maximum allowed data rate.

Row 1706 indicates that BS selected maximum data rate indicator value 0 corresponds to a maximum data rate of 15 and the subset of data rates (15, 13, 11, 9, 7, 5, 3, 0). Row 1708 indicates that BS selected maximum data rate indicator value 1 corresponds to a maximum data rate of 15 and the subset of data rates (15, 14, 13, 12, 11, 10, 9, 8). Row 1710 indicates that BS selected maximum data rate indicator value 2 corresponds to a maximum data rate of 11 and the subset of data rates (11, 10, 9, 8, 7, 6, 5, 4). Row 1712 indicates that BS selected maximum data rate indicator value 3 corresponds to a maximum data rate of 7 and the subset of data rates (7, 6, 5, 4, 3, 2, 1, 0).

Figure 18:
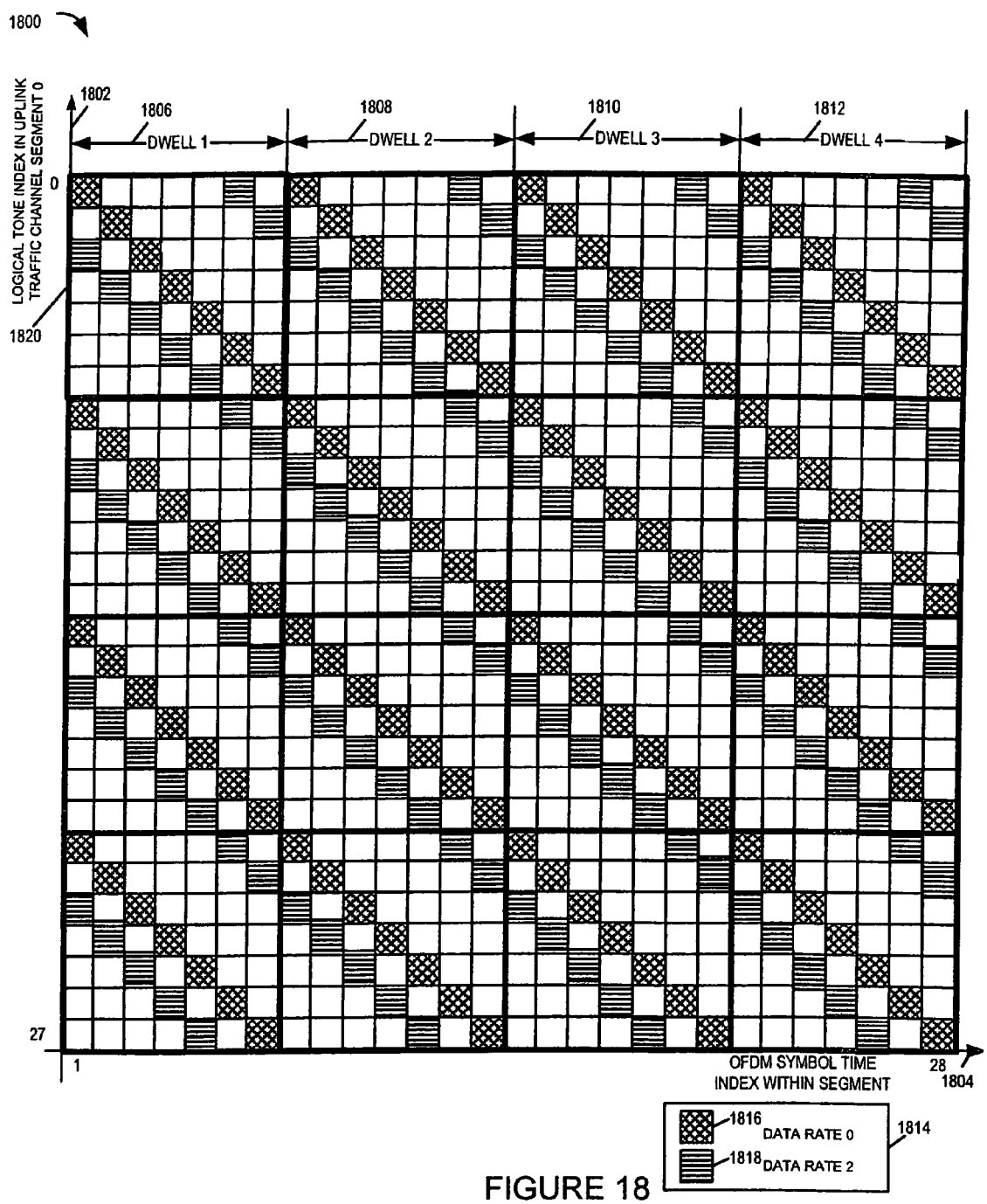
FIG. 18 is a drawing illustrating a portion of an exemplary uplink traffic segment, and the concentration of additional energy on a subset of tone-symbols within the dwell to convey the uplink data rate used for the segment, in accordance with an exemplary embodiment of the present invention.

FIG. 18 is a drawing 1800 illustrating a portion of an exemplary uplink traffic segment, and the concentration of additional energy on a subset of tone-symbols within the dwell to convey the uplink data rate used for the segment, in accordance with an exemplary embodiment of the present invention. In the FIG. 18 example and the FIG. 19 example which follows, there is at least a 2 db energy difference between the symbol on which additional energy is placed and the symbols which the additional energy is not placed. This facilitates detection through a relatively simple to implement energy detection mechanism which is based on identifying symbols with additional energy.

FIG. 18 plots logical tone index in exemplary uplink traffic channel segment 0 on the vertical axis 1802 vs time (OFDM symbol index within the segment) on horizontal axis 1804. The exemplary segment is divided into four dwells are shown in FIG. 18 (dwell 1 1806, dwell 2 1808, dwell 3 1810, dwell 4 1812), each dwell in the FIG. 18 example includes 7 successive OFDM symbol time intervals. In accordance with one feature of the particular exemplary embodiment of the invention, for each individual tone used in a dwell in the segment, additional energy is placed on the individual tone for one of the 7 symbol time periods during the dwell. The symbol time period in which the energy is placed to indicate the rate depends on the rate to be indicated and the position of the tone in the set of tones which correspond to the dwell. Thus, by knowing the tone position within the set of tones assigned to a wireless terminal and the symbol time within the dwell of the tone having the additional energy, it is possible to determine the rate which is being communicated. While the rate can be determined by monitoring a single tone of a dwell to determine the symbol time within the dwell a tone with additional energy used to indicate rate information is received, greater reliability can be achieved by monitoring multiple tones used by a wireless terminal in a dwell. Significantly, because the physical tones used are changed at dwell boundaries, within the dwell, the channel conditions will normally remain relatively constant allowing comparisons of the energy of received symbols to be compared in a reliable manner for the duration of the dwell in most cases. While each dwell is shown as including 7 symbol times and a segment including 7 tones, the number of symbol times and segments per dwell could be different depending on the particular implementation.

The exemplary segment may be divided into sub-blocks. Exemplary sub-block 1820 is shown in FIG. 18. In the segment, there are 28 sub-blocks of which 16 are shown in FIG. 18. The exemplary uplink traffic segment illustrated by grid 1800 may represent exemplary traffic segment 0 in an exemplary timing and frequency structure being used in the wireless communications system. The basic unit of the segment is a tone-symbol represented by a small square, each tone-symbol occupying one tone for a duration of one OFDM symbol time interval. A modulation symbol may be conveyed on each tone-symbols of the segment.

In accordance with the present invention, a pattern of locations where additional energy is concentrated on a subset of signals within the segment identifies the uplink data rate used by the WT for transmission of the uplink traffic channel segment. Different data rates may be used by the WT. In the exemplary embodiment of FIG. 18, the pattern of each sub-block within the segment should be identical for a given data rate.

Legend 1814 indicates that tone-symbols of type 1816 represented with crosshatch shading are part of a pattern corresponding to WT selected data rate 0, while tone-symbols of type 1818 represented with horizontal line shading correspond to WT selected data rate 2. For rate 0, the main diagonals of each sub-block will have additional energy. For rate 2, the entries at positions offset −2 from the main diagonal of each sub-block will have additional energy. In general, consider a sub-block indexed as 7×7 entries (0,0), . . . (6,6). Then for rate i, each of the entries at position (k+i, k mod 7) for k=0, 1, 2, . . . , 6 has additional energy. For example, for rate 2, entries (2,0), (3,1), (4,2), . . . , (1, 6) have additional energy, as shown in FIG. 18.

FIG. 18 illustrates two exemplary cases of different WT uplink selected data rates on the same grid 1800. Consider that the WT has selected to use data rate 0, then for sub-block 1820, additional energy is placed on the signals corresponding to tone symbols: (tone0, OFDM symbol index 1), (tone 1, OFDM symbol index 2), (tone 2, OFDM symbol index 3), (tone 3, OFDM symbol index 4), (tone4, OFDM symbol index 5), (tone 5, OFDM symbol index 6), (tone 6, OFDM symbol index 7), while the other tone-symbols of the sub-block convey signals with nominal energy levels. Now consider that the WT has selected to use data rate 2, then additional energy is placed on the signals corresponding to tone symbols: (tone2, OFDM symbol index 1), (tone 3, OFDM symbol index 2), (tone 4, OFDM symbol index 3), (tone 5, OFDM symbol index 4), (tone6, OFDM symbol index 5), (tone 0, OFDM symbol index 6), (tone 1, OFDM symbol index 7), while the other tone-symbols of the sub-block convey signals with nominal energy levels. The pattern corresponding to the rate is repeated for each sub-block of the segment. Other exemplary data rates, e.g., data rate 1 and data rate 3 may be indicated by different patterns. In some embodiments, each of the patterns represents the same slope within the grid, but with a different offset. In some embodiments, the different patterns may be represented by different slopes and/or including different offsets within the grid.

Figure 19:
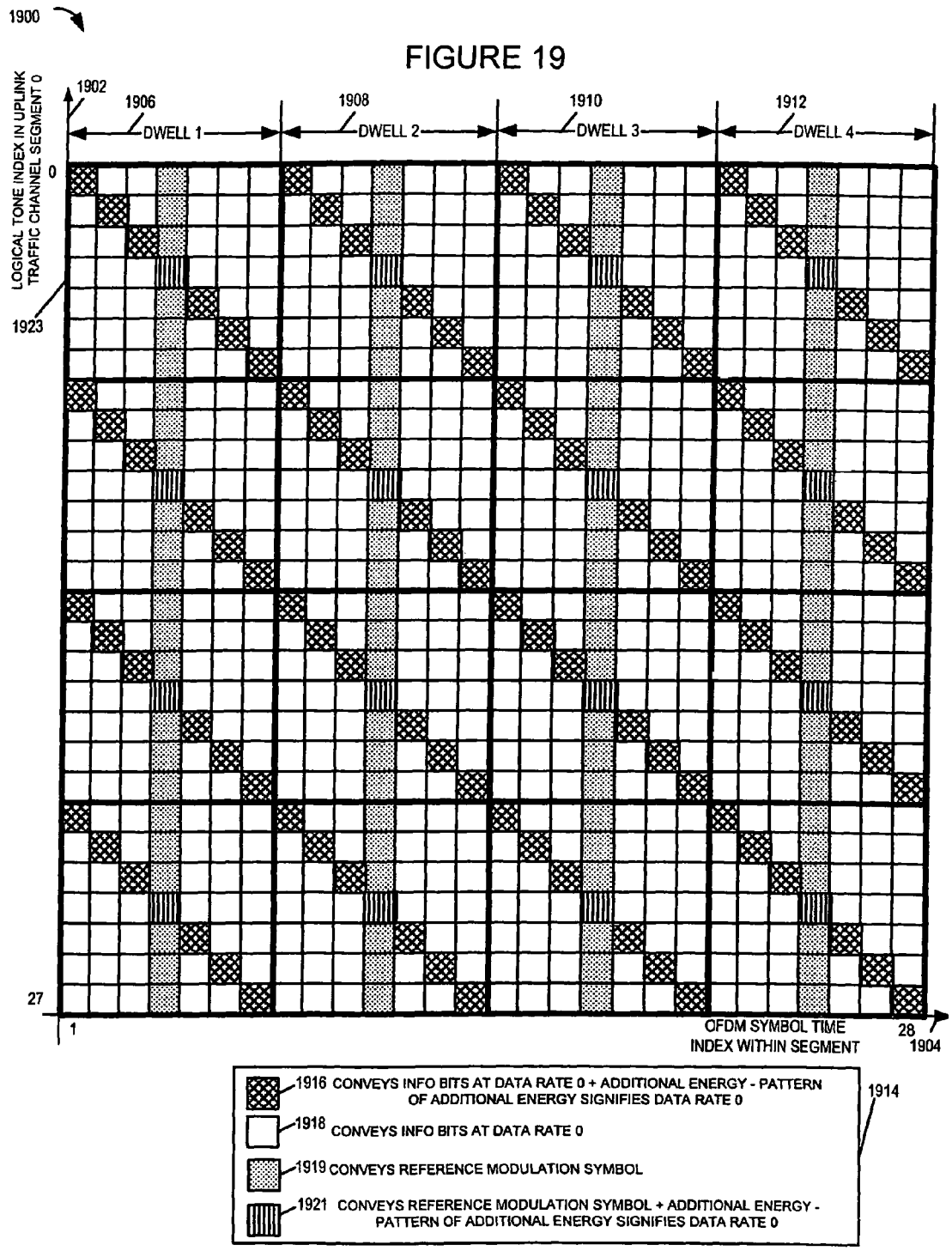
FIG. 19 is a drawing illustrating a portion of an exemplary uplink traffic segment including tone-symbols used to convey modulation symbols conveying information bits and tone-symbols used to convey reference modulation symbols, and the concentration of additional energy on a subset on tone-symbols within the dwell to convey the uplink data rate used for the segment, in accordance with the present invention.

FIG. 19 is a drawing 1900 illustrating a portion of an exemplary uplink traffic segment including tone-symbols used to convey modulation symbols conveying information bits and tone-symbols used to convey reference modulation symbols, and the concentration of additional energy on a subset on tone-symbols within the dwell to convey the uplink data rate used for the segment, in accordance with the present invention. FIG. 1 plots logical tone index in exemplary uplink traffic channel segment 0 on the vertical axis 1902 vs time (OFDM symbol index within the segment) on horizontal axis 1904. The exemplary segment is further divided four dwells which are shown (dwell 1 1906, dwell 2 1908, dwell 3 1910, dwell 4 1912), each dwell including 7 successive OFDM symbol time intervals. The exemplary uplink traffic segment illustrated by grid 1900 may represent an exemplary traffic segment 0 of a timing and frequency structure used in a wireless communications system. The basic unit of the segment is a tone-symbol represented by a small square, each tone-symbol occupying one tone for a duration of one OFDM symbol time interval. A modulation symbol may be conveyed on each tone-symbol of the segment.

In accordance with the present invention, a pattern of locations where additional energy is concentrated on a subset of signals within the segment identifies the uplink data rate used by the WT for transmission of the uplink traffic channel segment. The segment is subdivided in sub-blocks, e.g., exemplary sub-block 1923. The additional energy pattern repeats from sub-block to sub-block within the segment. Different data rates may be used by the WT and may correspond to different additional energy patterns.

Legend 1914 indicates that tone-symbols of type 1916 represented with crosshatch shading are part of a pattern of modulation symbols with additional energy corresponding to WT selected data rate 0; information bits are conveyed in tone-symbols of type 1916 using data rate 0, data rate 0 signifying a coding rate and/or a modulation scheme. Legend 1914 also indicates modulation symbols at normal energy level conveying information bits at data rate 0 are conveyed in tone-symbols of type 1918 as indicated by no shading. In addition legend 1914 indicates that tone-symbols of type 1919 are used to convey reference modulation symbols. Legend 1914 indicates that tone-symbols of type 1921 represented with vertical line shading are part of a pattern of modulation symbols with additional energy corresponding to WT selected data rate 0; reference modulation symbol values are conveyed in tone-symbols of type 1921, data rate 0 signifying a coding rate and/or a modulation scheme.

Figure 20:
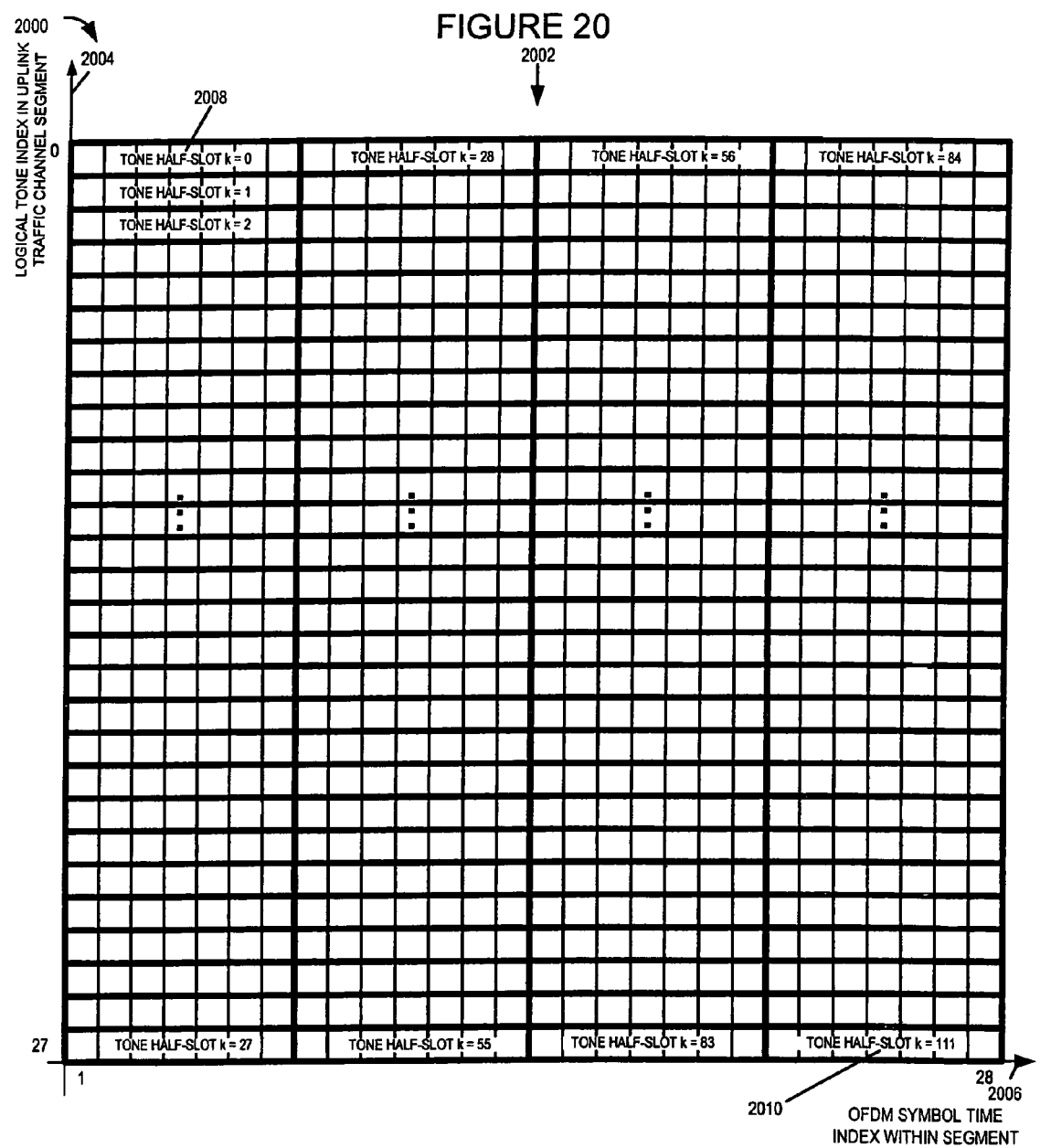
FIGS. 20-22 are drawing of different types of exemplary uplink traffic channel segments, in accordance with the present invention.

FIG. 20 is a drawing 2000 of an exemplary uplink traffic channel segment 2002, in accordance with the present invention. Vertical axis 2004 plots logical tone index of the uplink traffic channel segment 2002 which ranges from 0 to 27; horizontal axis 2006 plots OFDM symbol time index within the traffic channel segment 2002 which ranges from 1 to 28. Exemplary uplink traffic channel segment 2002 includes 784 tone-symbols represented by small boxes. A tone-symbol is a transmission unit. The tone-symbols are further grouped, as illustrated in FIG. 20, into 112 tone half-slots (tone-halfslot k=0 2008, tone-halfslot k=111 2010). A tone-halfslot includes 7 tone-symbols in a halfslot. The tone-symbols in a half-slot have the same prehopping index and posthopping index, which is kept constant over the half-slot.

Figure 21:
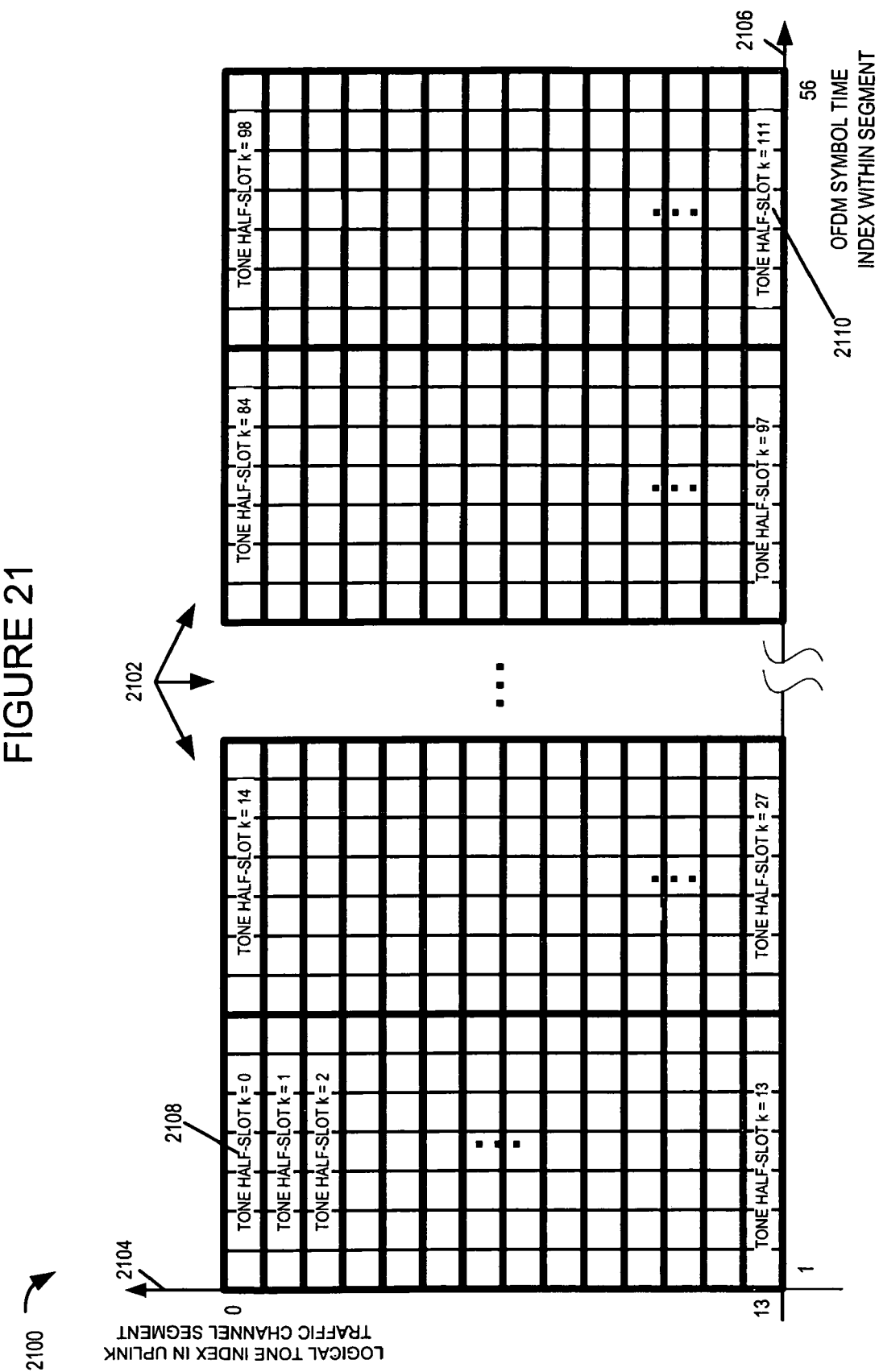

FIG. 21 is a drawing 2100 of an exemplary uplink traffic channel segment 2102, in accordance with the present invention. Vertical axis 2104 plots logical tone index of the uplink traffic channel segment 2102 which ranges from 0 to 13;

horizontal axis 2106 plots OFDM symbol time index within the traffic channel segment 2102 which ranges from 1 to 56. Exemplary uplink traffic channel segment 2102 includes 784 tone-symbols represented by small boxes. The tone-symbols are further grouped, as illustrated in FIG. 21, into 112 tone half-slots (tone-halfslot k=0 2108, tone-halfslot k=111 2110.

Figure 22:
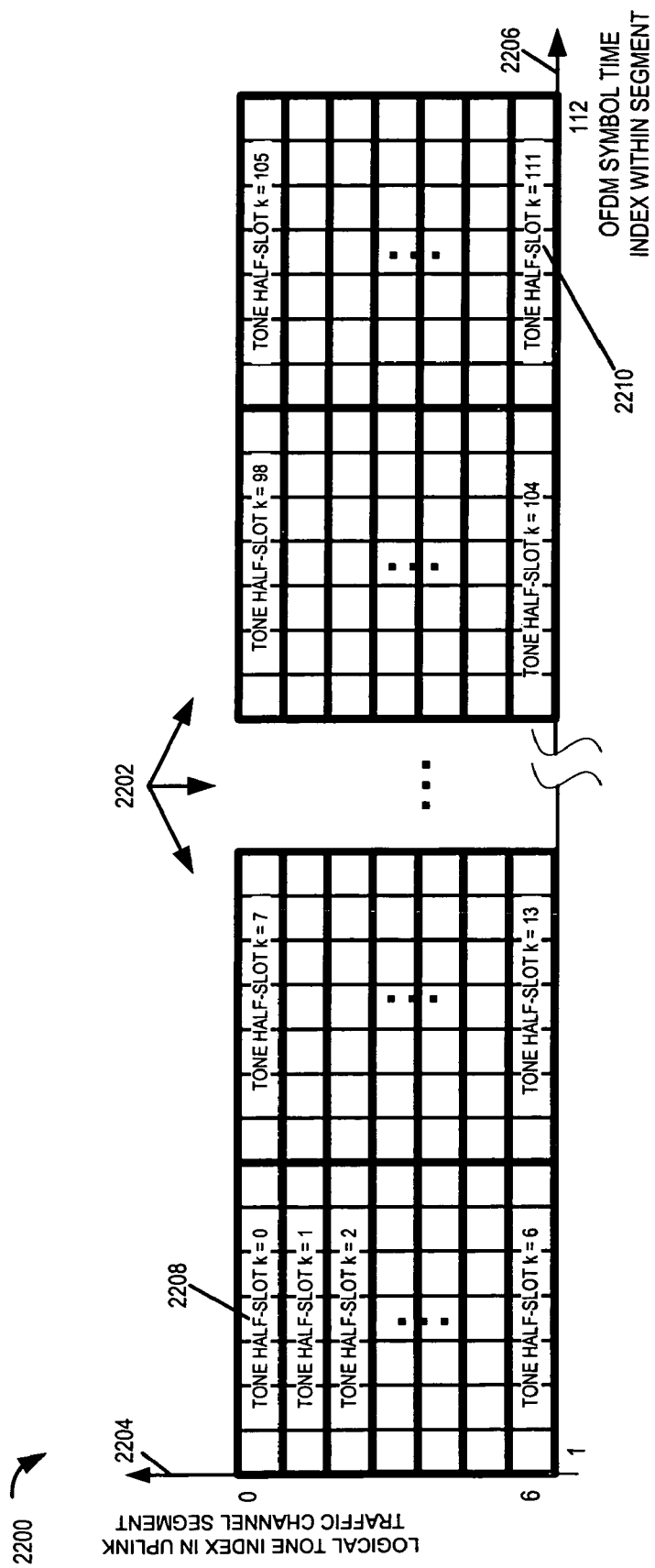

FIG. 22 is a drawing 2200 of an exemplary uplink traffic channel segment 2202, in accordance with the present invention. Vertical axis 2204 plots logical tone index of the uplink traffic channel segment 2202 which ranges from 0 to 6; horizontal axis 2206 plots OFDM symbol time index within the traffic channel segment 2202 which ranges from 1 to 112. Exemplary uplink traffic channel segment 2202 includes 784 tone-symbols represented by small boxes. The tone-symbols are further grouped, as illustrated in FIG. 22, into 112 tone half-slots (tone-halfslot k=0 2208, tone-halfslot k=111 2210.

FIG. 23 is a table 2300 of exemplary uplink traffic channel rate information, in accordance with various embodiments of the present invention. First column 2302 lists eight exemplary uplink traffic channel rate options (0, 1, 2, 3, 4, 5, 6, 7). Second column 2304 lists the corresponding framing format type for each of the rate options (first, first, first, first, first, second, second, second). Third column 2306 lists the number of MAC frames corresponding to each of the rate options (1, 2, 3, 4, 5, 6, 8, 10). Fourth column 2308 lists the number of information bits (k) corresponding to each of the rate options (224, 432, 640, 848, 1056, 1280, 1696, 2112. Fifth column 2310 lists the codeword length (n) corresponding to each of the rate options (1344, 1344, 1344, 1344, 1344, 2688, 2688, 2688). Sixth column 2312 list the modulation constellation used for each of the corresponding rate options (QPSK, QPSK, QPSK, QPSK, QPSK, QAM16, QAM16, QAM16).

FIG. 24 is a table 2400 illustrating exemplary mapping between an uplink traffic channel segment in-band indicator X and uplink traffic channel rate option values. First column 2402 lists the seven different values (0, 1, 2, 3, 4, 5, 6) that the uplink traffic channel segment in-band indicator X may have in the exemplary embodiment. Second column 2404 lists the corresponding rate options for each of the uplink traffic channel segment in-band indicator values for the cases where the wireless terminal has not been assigned a maximum rate indicator for the segment indicating that the maximum rate option (7) may be selected for use by the WT, and the assignment has been a regular assignment. For example, if a WT has been assigned, via a regular assignment, an uplink traffic channel segment to use and a maximum rate indicator value indicating that the highest allowable rate for the WT to use is rate option 6, then, the WT may select a rate option less than or equal to the maximum indicated allowable rate option from column 2404, e.g., based on the WTs current needs and WT determined conditions. For example, consider under such conditions, that the WT selects to use rate option 4 for the uplink traffic channel segment, then columns 2404 and 2402 of table 2400 indicates to the WT that the corresponding uplink traffic channel segment in-band indicator X should be a value of 4.

Third column 2406 lists the corresponding rate options for each of the uplink traffic channel segment in-band indicator values for the case where the wireless terminal has been assigned, via a regular assignment, a maximum rate indicator for the segment indicating that the maximum rate option (7) may be selected for use by the WT. For example, if a WT has been assigned an uplink traffic channel segment to use and a maximum rate indicator value indicating that the highest allowable rate for the WT to use is rate option 7, then, the WT may select a rate option less than or equal to the maximum indicated allowable rate option from column 2406, e.g., based on the WTs current needs and WT determined conditions. Note, that in this exemplary embodiment rate option 4 has been precluded from selection. For example, under such conditions, consider that the WT selects to use rate option 6 for the uplink traffic channel segment, then columns 2406 and 2402 of table 2400 indicates to the WT that the corresponding uplink traffic channel segment in-band indicator X should be a value of 5.

In addition, third column 2406 is used in the case where the uplink traffic channel segment assignment has been conveyed via a flash assignment.

The WT and base station both store the information represented in tables 2300 and 2400. The uplink traffic channel segment in-band indicator is communicated to the base station in the uplink traffic channel segment. The base station, having sent the maximum uplink rate indicator to the WT for the given assigned uplink traffic channel segment, and knowing whether the assignment was a regular assignment or a flash assignment, knows which column of table 2400 to use when interpreting a received and determined uplink traffic channel segment in-band indicator X, such that the base station can make the proper association and determine the uplink traffic channel rate option selected by the WT and being used by the WT for the segment.

Figure 25:
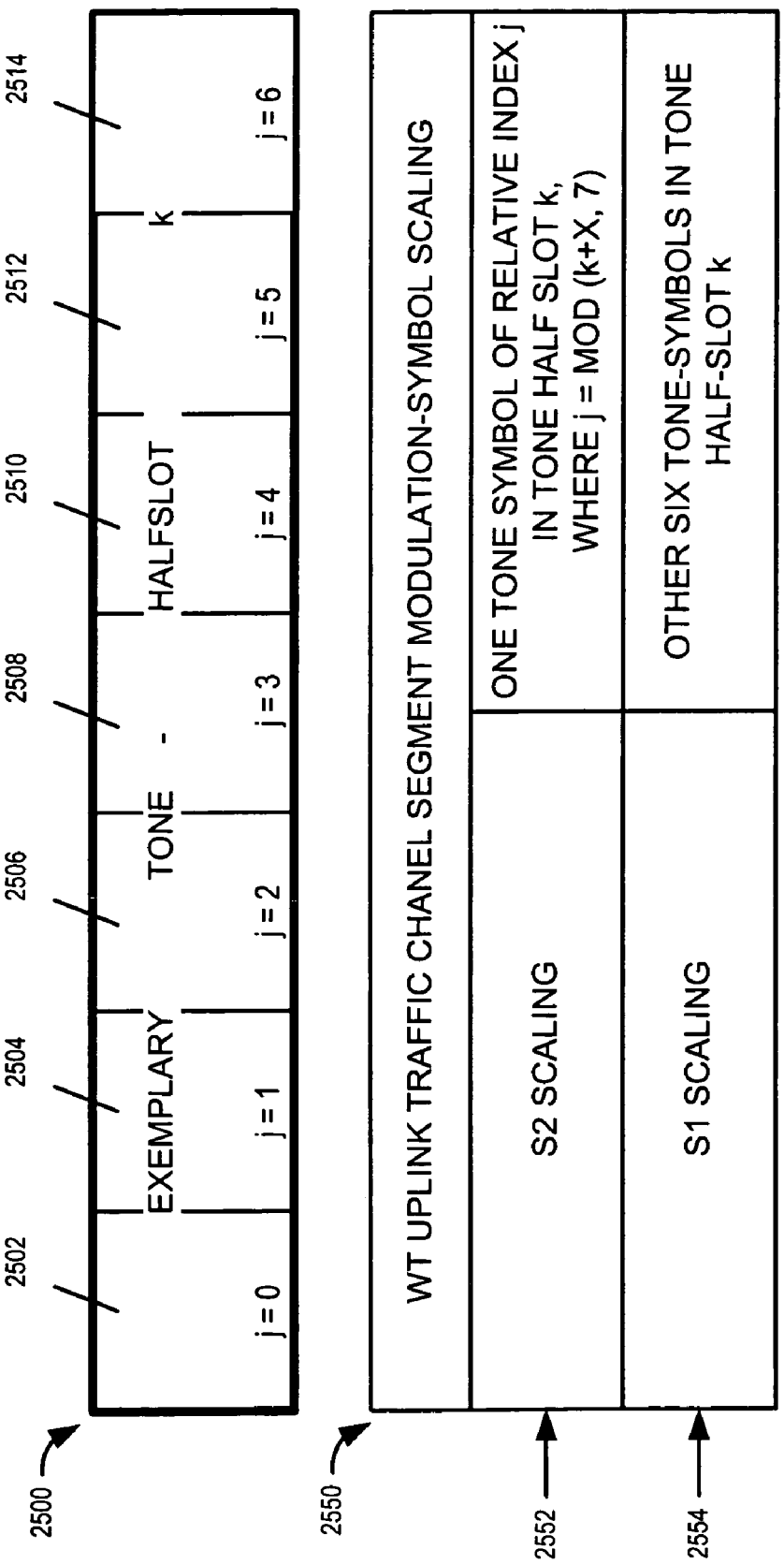
FIG. 25 includes a drawing of an exemplary tone-halfslot of index k, in accordance with the present invention.

FIG. 25 includes a drawing of an exemplary tone half-slot k 2500, in accordance with the present invention. Exemplary tone half-slot k 2500 may be any of the tone-half slots of the different exemplary uplink traffic channel segments of FIGS. 20, 21, or 22. Exemplary tone-halfslot k 2500 includes 7 successive OFDM tone-symbols (tone symbol with relative index j=0 2502, tone-symbol with relative index j=1 2504, tone-symbol with relative index j=2 2506, tone symbol with relative index j=3 2508, tone symbol with relative index j=4 2510, tone symbol with relative index j=5 2512, tone symbol with relative index j=6 2514).

FIG. 25 also includes table 2550 indicating WT uplink traffic channel segment modulation symbol scaling. For each tone-halfslot of an uplink traffic channel segment one of two level of modulation symbol scaling are used. First row 2552 indicates that S2 modulation symbol scaling is used for the one tone symbol of tone-half slot k with relative index value j, where j=mod (k+X, 7). Second row 2554 indicates that S1 modulation symbol scaling is used for the other six tone symbol of tone-half slot k.

Each tone-symbol of an assigned uplink traffic channel segment may convey a modulation symbol. Any modulation symbol of the uplink traffic channel segment shall be scaled using either S1 or S2 scaling. Whether to use S1 or S2 scaling for a given modulation symbol shall depend upon the tone-symbol to which the modulation symbol is mapped in the operation of segment mapping. In a given uplink traffic channel segment, a subset of tone-symbols uses S2 scaling and the subset of the remaining tone-symbols in the segment is to use S1 scaling. The partition into those two subsets depends upon the uplink traffic channel segment in-band indicator X, which is determined by the WT as s function of the BS assigned maximum rate option that may used for the segment and the actual rate being used for the segment, said actual rate being used having been selected by the WT.

In some embodiments, S1 denotes a wireless terminal relative channel power scaling factor for the uplink traffic channel segment expressed in dB, and S2 is set to a value larger than S1, e.g., S2=S1+2.67, where both S1 and S2 are expressed in dBs. In some such embodiments, the scaling factors using S1 and S2 are equal to SQRT (WT Nominal Power Level)* $10^{(S1/20)}$ and SQRT(WT Nominal Power Level)* $10^{(S2/20)}$, respectively. The WT Nominal Power level represents the WT nominal per tone transmission power in dBm, and the value of the WT Nominal Power, in some embodiments, is determined using methods including closed loop power control between the WT and the base station. In some embodiments, the value of S1 is determined as a function of the rate option, e.g., for rate option (0, 1, 2, 3, 4, 5, 6, 7), the corresponding value of S1 is (−1.4, 1.1, 2.9, 4.8, 6.7, 8.7, 10.7, 12.9) expressed in dBs.

Figure 26:
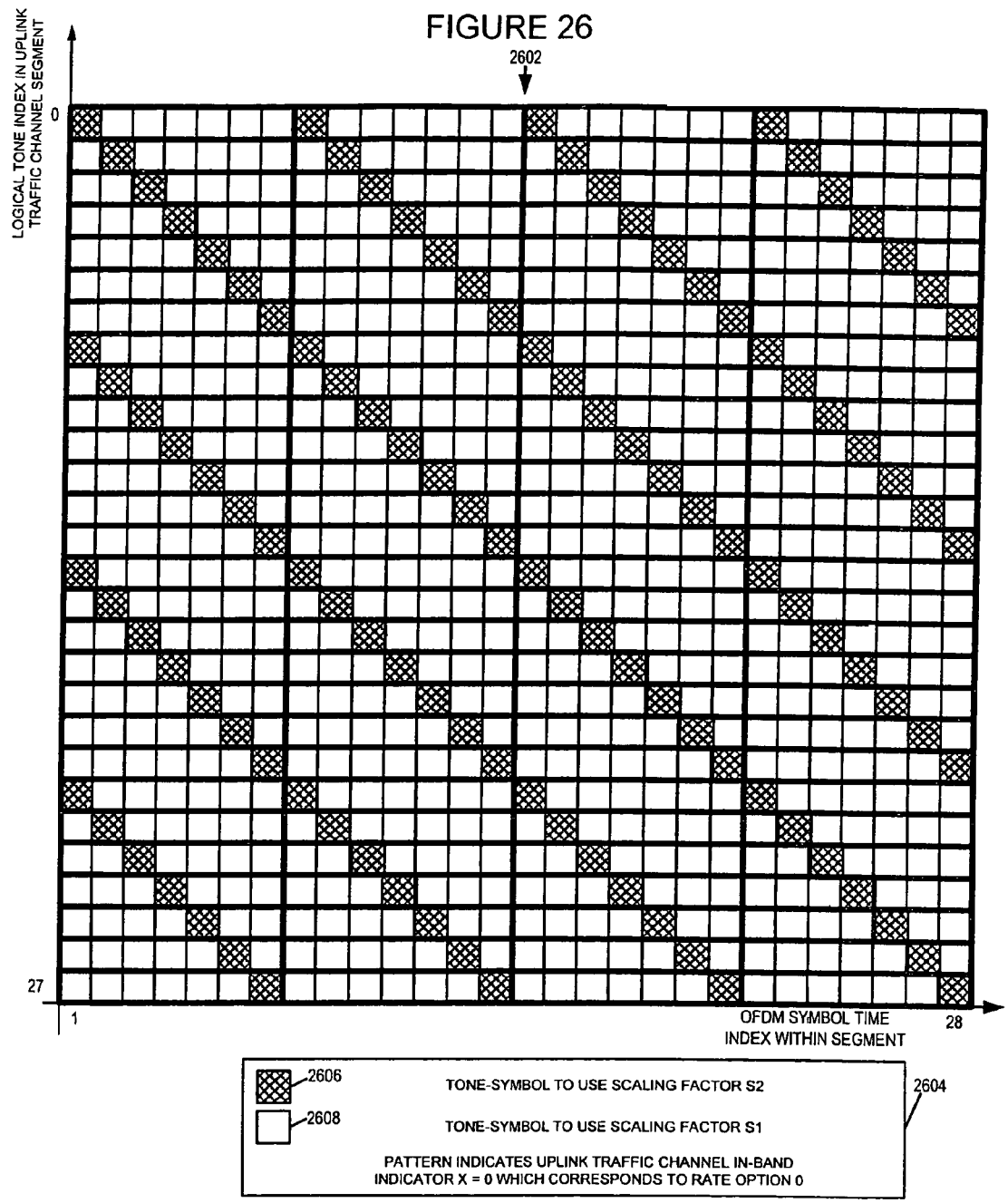
FIG. 26 illustrates an exemplary uplink traffic channel segment in which the WT has selected to use uplink traffic channel rate option 0 and conveys that selection via a mapped modulation symbol scaling pattern.

Consider the example of FIG. 26. FIG. 26 illustrates an exemplary uplink traffic channel segment 2602. The structure of the exemplary traffic channel segment 2602 may be that of exemplary traffic channel segment 2002 of FIG. 20, 28 tones× 28 OFDM tone symbol indexes, further divided into 112 ordered tone-halfslots. Consider that the WT has decided to use uplink channel rate option 0. The WT determines, e.g., from table 2400, that the uplink traffic channel segment in-band indicator X will be set to 0. Then for each tone-half slot k, k=0, 111 of segment 2602, the WT determines which one tone-symbol, in terms of relative index value j for the given tone-half-slot k, is to be assigned the S2 level of modulation symbol scaling. Information included in table 2550 can be used in the determination. Legend 2604 indicates that OFDM tone-symbols as indicated with crosshatch shading 2606 are to use scaling factor S2, while tone-symbols as indicated with no shading 2608 are to use scaling factor S1.

Figure 27:
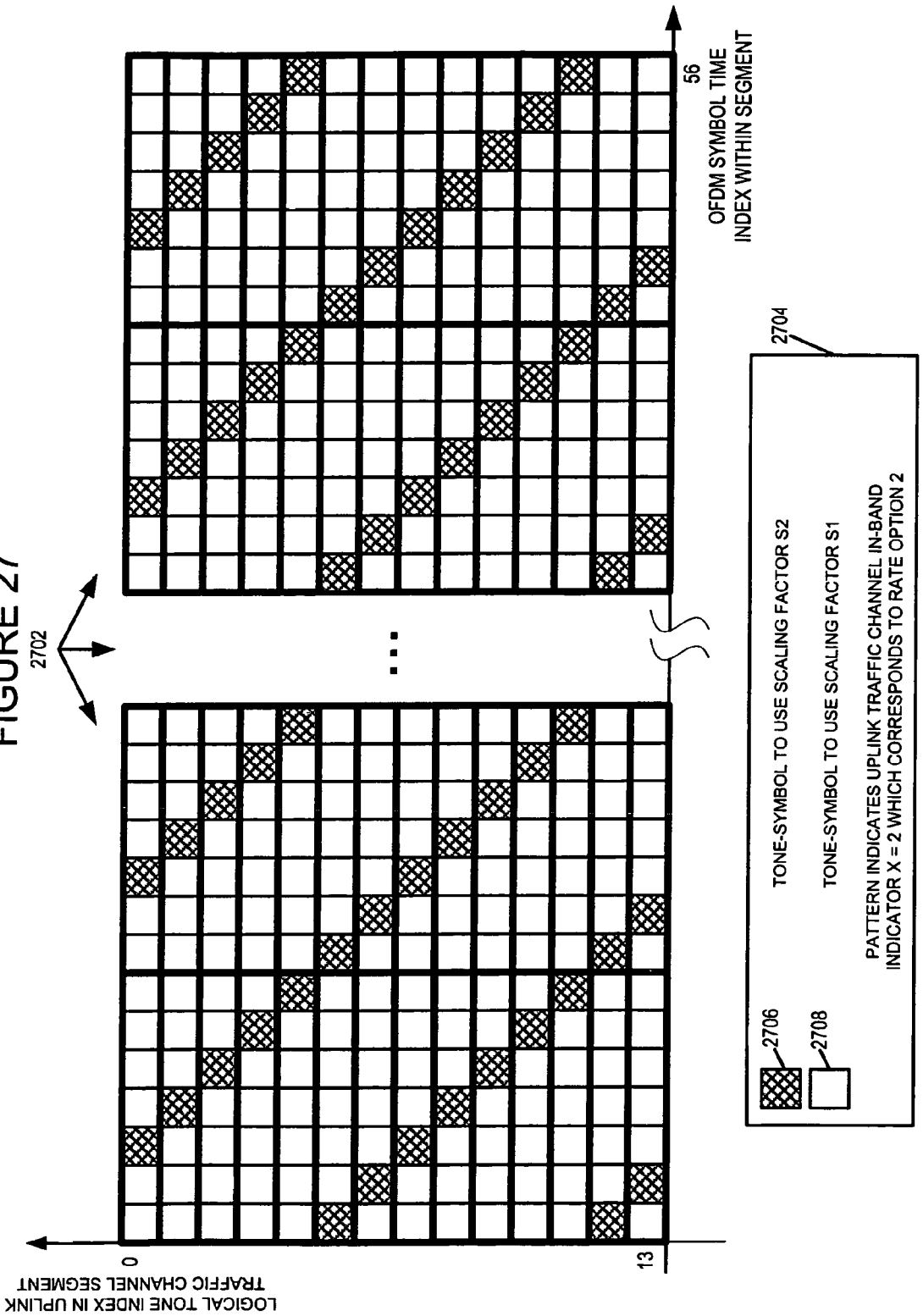
FIG. 27 illustrates an exemplary uplink traffic channel segment in which the WT has selected to use uplink traffic channel rate option 2 and conveys that selection via a mapped modulation symbol scaling pattern.

Consider the example of FIG. 27. FIG. 27 illustrates an exemplary uplink traffic channel segment 2702. The structure of the exemplary traffic channel segment 2702 may be that of exemplary traffic channel segment 2102 of FIG. 21, 14 tones× 56 OFDM tone symbol indexes, further divided into 112 ordered tone-halfslots. Consider that the WT has decided to use uplink channel rate option 2. The WT determines, e.g., from table 2400, that the uplink traffic channel segment in-band indicator X will be set to 2. Then for each tone-half slot k, k=0, 111 of segment 2702, the WT determines which one tone-symbol, in terms of relative index value j for the given tone-half-slot k, is to be assigned the S2 level of modulation symbol scaling. Information included in table 2550 can be used in the determination. Legend 2704 indicates that OFDM tone-symbols as indicated with crosshatch shading 2706 are to use scaling factor S2, while tone-symbols as indicated with no shading 2708 are to use scaling factor S1.

The uplink traffic channel segment in-band indicator X and the tone half-slot values k within the uplink traffic channel segment determine the mapping of S2 and S1 scaling for the segment. It should be noted that uplink traffic segment in-band indicator X, when it is a value of 4, 5, or 6 may indicate two different uplink rates options, depending upon the value of the maximum uplink rate allowed as communicated from the base station to the WT and/or the type of assignment regular or flash.

Figure 28:
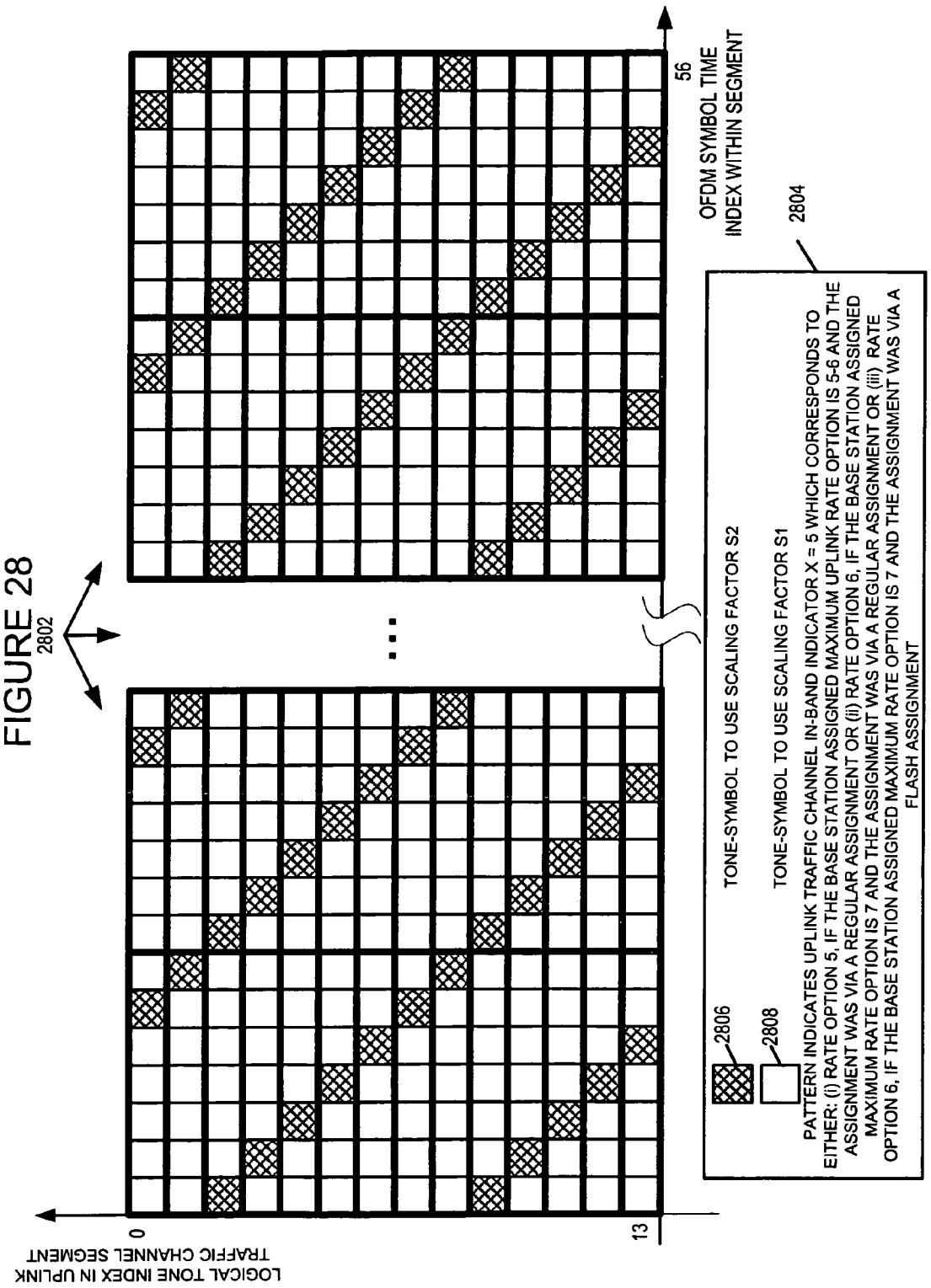
FIG. 28 illustrates an exemplary uplink traffic channel segment in which the WT has selected to use uplink traffic channel rate option 5 or 6 and conveys that selection via a mapped modulation symbol scaling pattern signifying that the uplink traffic channel in-band rate indicator X equals 5.

Now consider the example of FIG. 28. FIG. 28 illustrates an exemplary uplink traffic channel segment 2802. The structure of the exemplary traffic channel segment 2802 may be that of exemplary traffic channel segment 2102 of FIG. 21, 14 tones×56 OFDM tone symbol indexes, further divided into 112 ordered tone-halfslots. Consider that the BS assigned maximum rate option indicator indicated a maximum uplink rate option of 5 or 6, the assignment was via a regular assignment, and the WT decided to use uplink rate option 5. Alternately consider that the maximum rate option indicator indicated a maximum uplink rate option of 7, the assignment was via a regular assignment, and the WT decided to use rate option 6. Alternately, consider that the maximum rate option indicator indicated a maximum uplink rate option of 7, the assignment was via a flash assignment, and the WT decided to use uplink rate option 6. For any of the abovementioned scenarios, the WT determines, e.g., from table 2400, that the uplink traffic channel segment in-band indicator X will be set to 5. Then for each tone-half slot k, k=0, 111 of segment 2802, the WT determines which one tone-symbol, in terms of relative index value j for the given tone-half-slot k, is to be assigned the S2 level of modulation symbol scaling. Information included in table 2550 can be used in the determination. Legend 2804 indicates that OFDM tone-symbols as indicated with crosshatch shading 2806 are to use scaling factor S2, while tone-symbols as indicated with no shading 2808 are to use scaling factor S1.

For a given uplink traffic channel segment in various above described embodiments, each tone-halfslot conveys the same uplink traffic channel segment in-band indicator and thus same rate option information. By utilizing each of the tone-half slots of the segment to convey the rate option information, the difference in power level between the two modulation symbol scaling factors used for the segment can be set at a lower level than would otherwise be needed to accomplish the same level of detection capability if the rate option information were only conveyed on some of the tone-half slots of the segment. In some other embodiments, a portion, of the uplink traffic channel is used to convey uplink rate option information for the segment using the methods of the present invention, while a different portion of the uplink traffic channel segment is not used to convey uplink rate option information for the segment.

Figure 29:
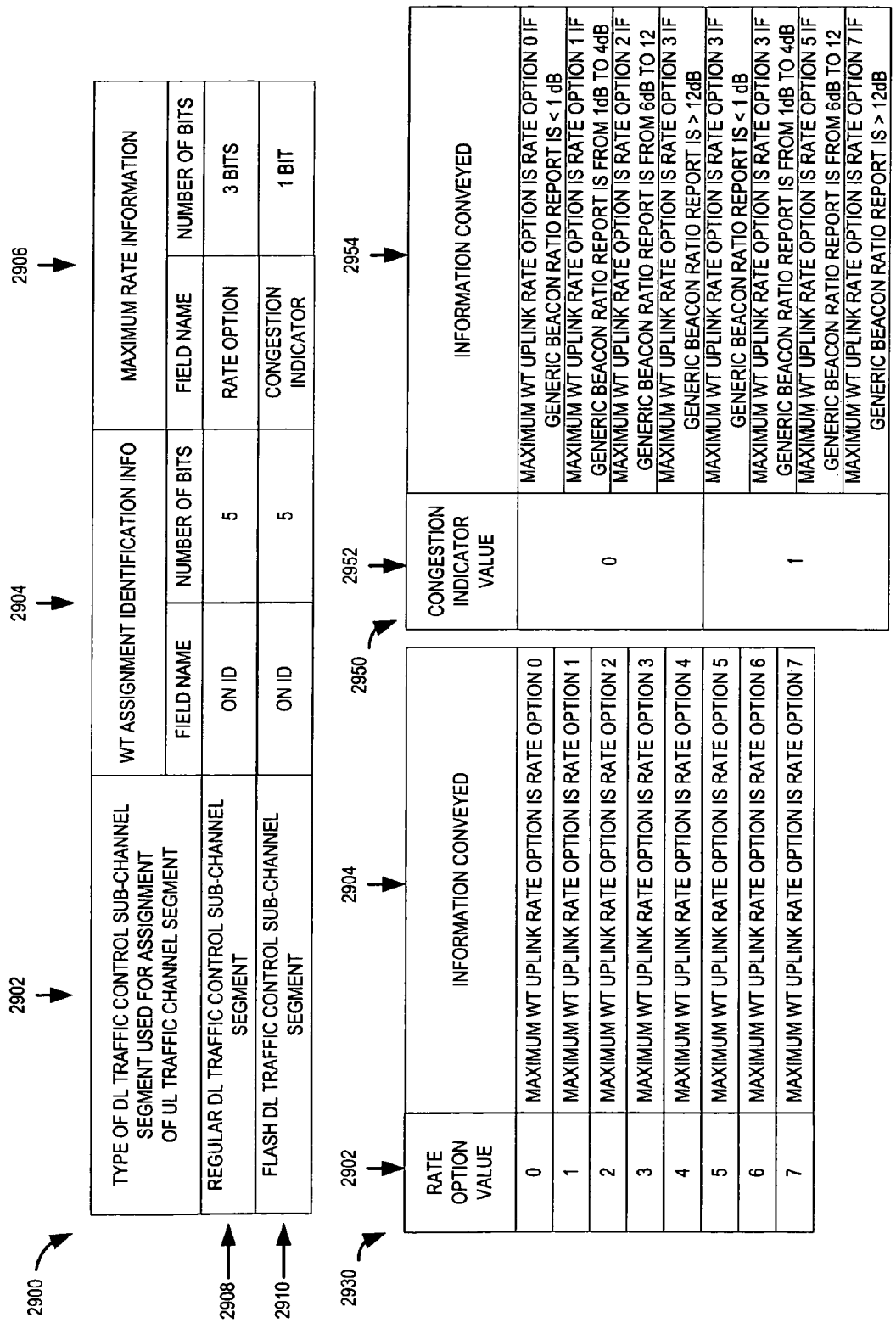
FIG. 29 includes tables illustrating different types of uplink traffic channel assignment signaling techniques and information conveyed, in accordance with the present invention.

FIG. 29 includes table 2900 illustrating two types of uplink traffic channel assignment signaling techniques, in accordance with the present invention. In some embodiments, different coding and/or modulation techniques are used for the different assignment signaling techniques. First column 2902 lists the type of downlink traffic control sub-channel used for assignment of uplink traffic channel segment, regular or flash. Second column 2904 includes WT assignment identification information including field name information and the number of bits corresponding to the field. Third column 2906 includes maximum rate information including field name information and the number of bits corresponding to the field. Row 2908 includes information identifying that a regular downlink traffic control sub-channel segment being used to provide assignment information for an uplink traffic channel segment includes an ON ID field of 5 bits used to identify the WT to which the assignment is directed and a rate option field of 3 bits used to identify the maximum rate option that the assigned WT is allowed to use in the corresponding assigned uplink traffic channel segment. Row 2910 includes information identifying that a flash downlink traffic control sub-channel segment being used to provide assignment information for an uplink traffic channel segment includes an ON ID field of 5 bits used to identify the WT to which the assignment is directed and a congestion indicator field of 1 bit used to convey information from the BS to the WT that can be used by the WT to identify the maximum uplink rate option that the assigned WT is allowed to use in the corresponding assigned uplink traffic channel segment.

FIG. 29 also includes table 2930 which provides additional information further identifying the maximum rate option information conveyed in the rate option field of the regular DL traffic control sub-hannel segment for a corresponding uplink traffic channel segment. First column 2902 lists the rate option value (0, 1, 2, 3, 4, 5, 6, 7) which can be conveyed by the 3 bit value of the rate option field. Second column 2904 lists the information conveyed from the BS to the WT by each rate option value. Rate option value (0, 1, 2, 3, 4, 5, 6, 7) conveys that the maximum WT uplink rate option that the WT is allowed to use for the corresponding uplink traffic channel segment is rate option (0, 1, 2, 3, 4, 5, 6, 7), respectively.

FIG. 29 also includes table 2950 which provides additional information further identifying the maximum rate option information conveyed in the congestion indicator field of the flash DL traffic control sub-channel segment for a corresponding uplink traffic channel segment. First column 2952 lists the congestion indicator values (0, 1) which can be conveyed by the one bit value of the congestion indicator field. Second column 2954 lists the information conveyed from the BS to the WT by each congestion indicator value. The congestion indicator value indicates a maximum wireless uplink rate option that may be used by the WT for the corresponding uplink traffic channel segment. For example, a congestion indicator value of 0 indicates that the WT is allowed a maximum uplink rate option of 3, subject to additional constraints imposed at the WT; a congestion indicator value of 1 indicates that the WT is allowed a maximum uplink rate option of 7, subject to additional constraints imposed at the WT. The WT performs beacon measurements and generates a generic beacon ratio report. The congestion indicator value, in accordance with the present invention, takes on different meanings as a function of a condition report, e.g., the generic beacon ratio report, performed by the WT. The condition report can be, e.g., a generic beacon ratio report, i.e., the ratio of the received power of the downlink beacon signal of the serving base station sector, with respect to the WT, and the sum of the received powers of the downlink beacon signals of each of the other interfering base station sectors, as determining by the WT receiving the beacon signals. The output values of the beacon ratio report may be quantized, e.g., into the following possible levels −6 dB, −4 dB, −2 dB, 0 dB, 1 dB, 2 dB, 3 dB, 4 dB, 6 dB, 8 dB, 10 dB, 12 dB, 14 dB, 16 dB, 18 dB, 20 dB. If the congestion indicator value is 0 and the generic beacon ratio report sent from the WT indicates a ratio less than 1 dB, then the maximum WT uplink rate option that the WT is allowed to use for the corresponding uplink traffic channel segment is rate option 0. If the congestion indicator value is 0 and the generic beacon ratio report indicates a ratio from 1 dB to 4 dB, then the maximum WT uplink rate option that the WT is allowed to use for the corresponding uplink traffic channel segment is rate option 1. If the congestion indicator value is 0 and the generic beacon ratio report sent from the WT indicates a ratio from 6 to 12 dB, then the maximum WT uplink rate option that the WT is allowed to use for the corresponding uplink traffic channel segment is rate option 2. If the congestion indicator value is 0 and the generic beacon ratio report indicates a ratio greater than 12 dB, then the maximum WT uplink rate option that the WT is allowed to use for the corresponding uplink traffic channel segment is rate option 3. If the congestion indicator value is 1 and the generic beacon ratio report sent from the WT indicates a ratio less than 1 dB, then the maximum WT uplink rate option that the WT is allowed to use for the corresponding uplink traffic channel segment is rate option 3. If the congestion indicator value is 1 and the generic beacon ratio report indicates a ratio from 1 dB to 4 dB, then the maximum WT uplink rate option that the WT is allowed to use for the corresponding uplink traffic channel segment is rate option 3. If the congestion indicator value is 1 and the generic beacon ratio report sent from the WT indicates a ratio from 6 to 12 dB, then the maximum WT uplink rate option that the WT is allowed to use for the corresponding uplink traffic channel segment is rate option 5. If the congestion indicator value is 1 and the generic beacon ratio report indicates a ratio greater than 12 dB, then the maximum WT uplink rate option that the WT is allowed to use for the corresponding uplink traffic channel segment is rate option 7.

FIG. 30 includes Table 3000 corresponding to exemplary QPSK constellation mapping and table 3050 corresponding to exemplary QAM16 constellation mapping. Table 3000 includes exemplary QPSK constellation mapping using scale factor 1.000000 and shows four exemplary bit patterns (00, 01, 10, 11) mapped to complex symbols ((1,1), (1,−1), (−1,1) and (−1,−1)), respectively. Table 3000 illustrates that for QPSK mapping, for a given scale factor applied, each of the four potential modulation symbols will have the same output level in terms of magnitude of the complex symbol, e.g., scale factor 1.000000 with each of the four modulation symbols having a magnitude of sqrt(2). Therefore when QPSK constellation mapping is used for an uplink traffic channel segment and two scaling factors are used, in accordance with the present invention, to convey rate option information, the margin in terms of power level in dB between modulation symbols of the two subsets is uniform, e.g., any modulation symbol of the segment using the lower scaling has the same power difference in terms of dB than any other modulation symbol of the segment using the higher scaling.

Table 3050 includes exemplary QAM 16 constellation mapping using scale factor 1/sqrt(5)=0.447214 and shows 16 exemplary bit patterns (0000, 0001, 0010, 0011, 0100, 0101, 0110, 0111, 1000, 1001, 1010, 1011, 1100, 1101, 1110, 1111) mapped to complex symbols ((1,−3), (1,−1), (1,3), (1,1), (3,−3), (3,−1), (3,3), (3,1), (−1,−3), (−1,−1), (−1,3), (−1,1), (−3,−3), (−3,−1), (−3,3), (−3,1), respectively, which are scaled by 0.447214. Table 3050 illustrates that for QAM16 mapping, for a given scale factor applied, a first set of four potential modulation symbols will have the same first output level in terms of magnitude of the complex symbol, a second set of four potential modulation symbols will have the same second output level in terms of magnitude of the complex symbol, and a third set of eight potential modulation symbols will have the same third output level in terms of magnitude of the complex symbol. For example, consider bit pattern (0011) which corresponds to complex symbol (1/sqrt(5), 1/sqrt(5)) which is a member of the first set with magnitude sqrt(2/5); bit pattern (0100) which corresponds to complex symbol (3/sqrt(5),−3/sqrt(5)) is a member of the second set with magnitude sqrt(18/5); bit pattern (0000) which corresponds to complex symbol (1/sqrt(5),−3/sqrt(5)) is a member of the third set with pre-scaling magnitude sqrt(10/5). Therefore when QAM16 constellation mapping is used for an uplink traffic channel segment the actual power used for transmission for a given modulation symbol or for the composite of modulation symbols for the segment is dependent upon the bit pattern(s) being communicated. In addition, when two scaling factors are used, in accordance with the present invention, to convey rate option information, the actual energy margin for a given segment is dependent upon the data pattern being communicated. Note that scaling factors S1 and S2, each representing a single value to be used for different subsets of the same given segment, are set on a per tone basis for a given average segment. The actual bit pattern for a given segment can alter the ability to successfully recover the rate option information conveyed by the energy differences when using QAM16 modulation. However, retransmission methods for unsuccessfully recovered segments, in accordance with the present invention, typically change the transmission bit pattern, when conveying the same information, increasing the likelihood that the rate option information will be successfully recovered in the retransmission.

Figure 31:
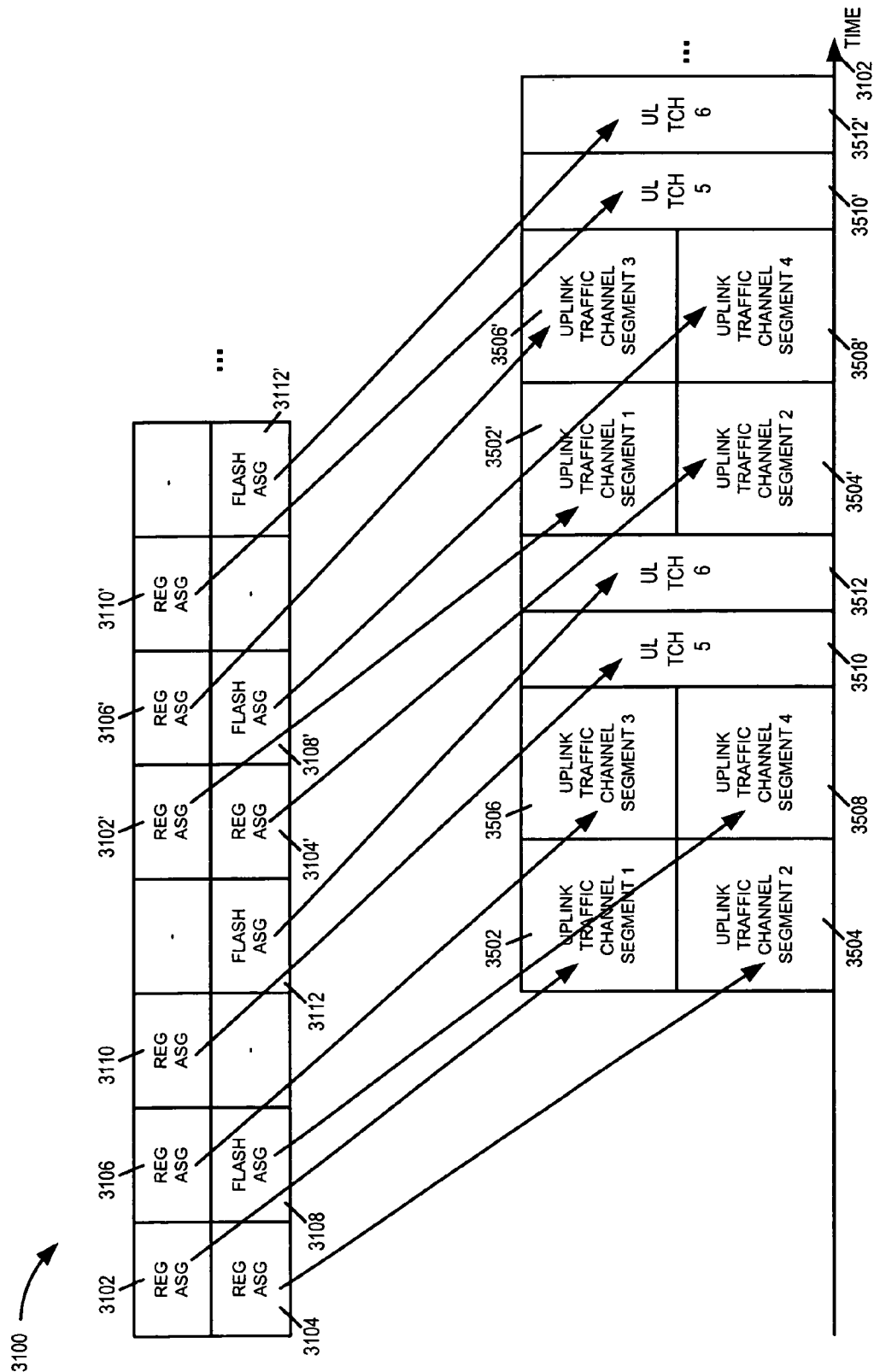
FIG. 31 illustrates exemplary assignment and exemplary corresponding uplink traffic channel segments.

FIG. 31 is a drawing 3100 illustrating exemplary assignments and exemplary corresponding uplink traffic channel segments. Horizontal axis 3102 represents time. Two types of assignments are shown a regular type assignment and a flash type assignment, each type of assignment using a different coding and modulation method. In some embodiments, the power level of flash assignments signals is higher than the power level of regular assignment signals for a given base station. The exemplary regular type assignment includes 3 bits for specifying a maximum rate indicator value, allowing the regular type assignment to distinguish between 8 different values corresponding to eight different maximum rate indicator options, e.g., one for each of the uplink rate options supported by the system, e.g., rate option 0, 1, 2, 3, 4, 5, 6, 7. The exemplary flash type assignment includes 1 bit for specifying a maximum rate indicator value, allowing the flash type assignment to distinguish between 2 different values corresponding to two maximum rate indicator options, e.g., one corresponding to the highest uplink rate option supported by the system, e.g., rate option 7, and one corresponding to an intermediate uplink rate option supported by the system, e.g., rate option 3. Each of the assignments (regular assignment 3102, regular assignment 3104, regular assignment 3106, flash assignment 3108, regular assignment 3110, flash assignment 3112) is associated with a corresponding uplink traffic channel (UL TCH) segment (UL TCH segment 1 3502, UL TCH segment 2 3504, UL TCH segment 3 3506, UL TCH segment 4 3508, UL TCH segment 5 3510, UL TCH segment 6 3512), respectively. The basic timing/frequency structure and association between assignments and uplink traffic channel segments repeats on a periodic basis. The assignments including the maximum rate indicator information is transmitted by the base station according to a predetermined periodic transmission schedule having a fixed timing relationship to the uplink segments being assigned. Assignments (regular assignment 3102', regular assignment 3104', regular assignment 3106', flash assignment 3108', regular assignment 3110', flash assignment 3112') associated with corresponding uplink traffic channel (UL TCH) segments (UL TCH segment 1 3502', UL TCH segment 2 3504', UL TCH segment 3 3506', UL TCH segment 4 3508', UL TCH segment 5 3510', UL TCH segment 6 3512'), respectively, represents a repeat of the set of assignments (3102, 3104, 3106, 3108, 3110, 3112) and corresponding uplink traffic channel segments (3502, 3504, 3506, 3508, 3510, 3512). In the example of FIG. 30 there are six uplink traffic channel segments in the repetitive structure. In other embodiments, there may be a different numbers of uplink traffic channel segments in the repetitive structure, e.g., 77 indexed uplink traffic channel segments in a timing and frequency structure with 49 of the indexed uplink traffic channel segments corresponding to regular assignments and 28 of the indexed uplink traffic channel segments corresponding to flash assignments.

Figure 32:
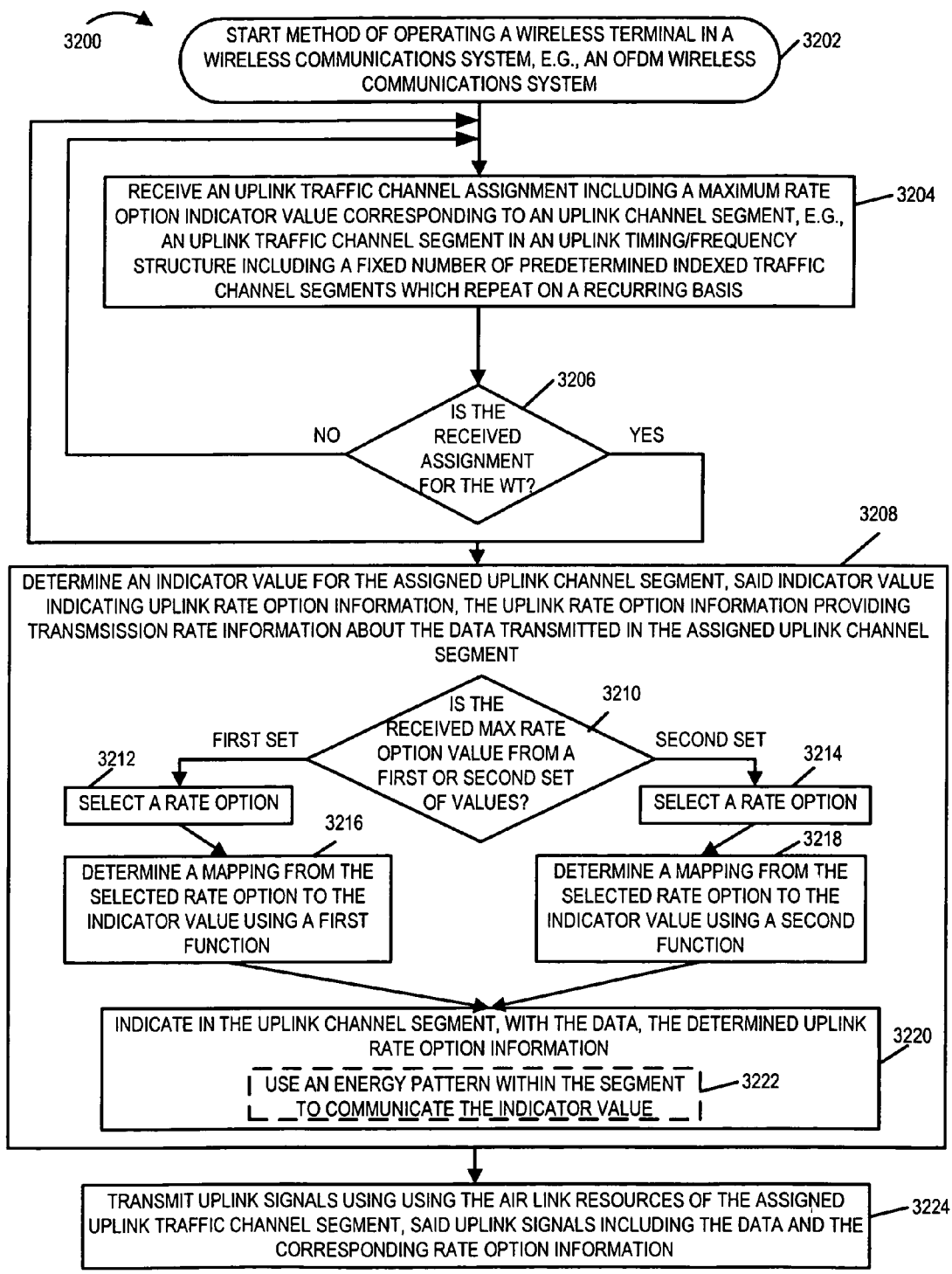
FIG. 32 is a flowchart of an exemplary method of operating a wireless terminal in a wireless communications system, in accordance with the present invention.

FIG. 32 is a flowchart 3200 of an exemplary method of operating a wireless terminal in a wireless communications system, in accordance with the present invention. For example, the wireless communications system may be an OFDM spread spectrum multiple access wireless communications system in which the base station signals a maximum uplink rate indicator value for an uplink traffic channel segment, and the WT transmits data in the assigned uplink traffic channel segment using a selected data rate option which is less than or equal to the received indicated maximum uplink data rate option. In such an exemplary OFDM system, the basic transmission unit may be an OFDM tone symbol representing the air link resource associated with one tone for the duration of one OFDM symbol transmission time interval.

The method of operation starts in step 3202, where the WT is powered on and initialized. In step 3202, the WT may register with one of a plurality of base stations in the system, e.g., the base station corresponding to the cell in which it is currently located, and be transitioned into an ON state of operation, e.g., receiving a base station assigned wireless terminal identifier. Operation proceeds from step 3202 to step 3204.

In step 3204, the WT is operated to receive an uplink traffic channel assignment including a maximum rate option indicator value corresponding to an uplink traffic channel segment, e.g., an uplink traffic channel segment in an uplink timing/frequency structure including a fixed number of predetermined indexed traffic channel segments which repeat on a recurring basis. Then, in step 3206 the WT determines whether the received assignment is for the WT or for another WT registered with the base station, e.g., by examining the contents of an WT identifier field included as part of the assignment information and comparing the recovered information to the WT's BS assigned WT identifier.

If the assignment is not intended for the WT, operation proceeds from step 3206 back to step 3204, where the WT receives and processes other assignments. If the assignment is intended for the WT, operation proceeds from step 3206 to step 3208 for operations related to the assignment, and to step 3204 to receive and process additional assignments.

In step 3208, the WT is operated to determine an indicator value for the assigned uplink channel segment, said indicator value indicating uplink rate option information providing transmission rate information about the data transmitted in the assigned uplink channel segment. Step 3208 includes sub-step 3210 in which the WT determines whether the received max rate option value is from a first set of values or a second set of values. For example, with regard to the received maximum rate option values, an exemplary first set of values may be the set of values {0, 1, 2, 3, 4, 5, 6} and an exemplary second set of values may be the value {7}. If the received maximum rate option is from a first set of values then operation proceeds to sub-step 3212, but if the received maximum rate option value is from a second set of values, operation proceeds to sub-step 3214.

In sub-step 3212 the WT selects a rate option less than or equal to the received maximum rate option value. Then, in sub-step 3216, the WT determines a mapping from the selected rate option to the indicator value using a first function. In some embodiments, the first function is also a function of the type of assignment, e.g., regular or flash, corresponding to the uplink channel segment. For example, an exemplary first function mapping from selected rate option to indicator value may be (0, 1, 2, 3, 4, 5, 6)→(0, 1, 2, 3, 4, 5, 6) corresponding to regular type assignments, and (0, 1, 2, 3, 5, 6)→(0, 1, 2, 3, 5, 6) corresponding to flash type assignments, and this mapping function may be used by the WT in sub-step 3216.

In sub-step 3214, the WT selects a rate option less than or equal to the received maximum rate option value. Then, in sub-step 3218, the WT determines a mapping from the selected rate option value to the indicator value using a second function. For example an exemplary second function mapping from selected rate option to indicator value may be (0, 1, 2, 3, 5, 6, 7)→(0, 1, 2, 3, 4, 5, 6), and this mapping may be used by the WT in sub-step 3218.

Operation proceeds from either sub-step 3216 or sub-step 3218 to sub-step 3220. In sub-step 3220, the WT is operated to indicate in the uplink channel segment, with the data, the determined uplink rate option information. In some embodiments, sub-step 3220 includes sub-step 3222. In sub-step 3222, the wireless terminal uses an energy pattern within the segment to communicate the indicator value. In other embodiments, the indicator value, which is a mapped selected rate option value, is included in the uplink traffic channel segment signaling using a different method, e.g., a coded sub-block within the uplink traffic channel segment conveying coded bits representing the indicator via modulation symbol constellation values using a predetermined coding and modulation scheme.

Operation proceeds from step 3208 to step 3224. In step 3224, the WT is operated to transmit uplink signals using the air link resources of the assigned uplink channel segment, the uplink signals including the data and the corresponding rate option information.

In some embodiments, the indicator value is one of N possible values and the total number of uplink data rate options supported by the WT is greater than N, where N is a positive integer greater than 1. For example N may be equal to 7 and the total number of uplink data rate options supported by the wireless terminal may be 8.

In various embodiments, an uplink segment includes a plurality of transmission units, the indicator value is one of the N possible indicator values, and each of the N possible indicator values correspond to a different subset of transmission units in the segment, and the indicator value is communicated by applying a higher power scale factor to the subset of the transmission units in said segment corresponding to the indicator value being communicated. In some such embodiments, each of the N different subsets of transmission units are non-overlapping with each transmission unit corresponding to at most one of the N different subsets. In some such embodiments, all the transmission units in the segment are included in a set of subsets which is formed from the combination of the N different subsets.

In some embodiments, a transmission unit is an OFDM tone symbol. In some such embodiments, an uplink channel segment, e.g., uplink traffic channel segment, includes a plurality of tone-halfslots, e.g., 112 tone-halfslots, each tone-halfslot including a predetermined number, e.g., seven, of temporarily consecutive tone-symbols corresponding to the same tone, the tone-halfslots having a predetermined tone-halfslot index value k, each tone-symbol within a tone half-slot being identified by a relative tone-symbol index j, the equation j=MOD (k+X, 7) identifying tone-symbols within the tone-halfslot which belong to the subset of tone-symbols, corresponding to the one of the N indicator values, one-tone symbol in each tone-halfslot corresponding to the indicator value being communicated, where X is the indicator value being communicated and X is an integer in the range 0 to 6; where j is an integer in the range 0 to 6; and k is an integer in the range of 0 to the total number of tone-halfslots in the segment minus 1, e.g. 0 to 111.

In some embodiments, a transmission unit is an OFDM tone symbol. In some such embodiments, an uplink channel segment, e.g., uplink traffic channel segment, includes a plurality of tone-halfslots, e.g., 112 tone-halfslots, each tone-halfslot including a predetermined number, e.g., seven, of temporarily consecutive tone-symbols corresponding to the same tone, the tone-halfslots having a predetermined tone-halfslot index value k, each tone-symbol within a tone half-slot being identified by a relative tone-symbol index j, the equation j=MOD (k−X, 7) identifying tone-symbols within the tone-halfslot which belong to the subset of tone-symbols, corresponding to the one of the N indicator values, one-tone symbol in each tone-halfslot corresponding to the indicator value being communicated, where X is the indicator value being communicated and X is an integer in the range 0 to 6; where j is an integer in the range 0 to 6; and k is an integer in the range of 0 to the total number of tone halfslots in the segment minus 1, e.g., 0 to 111.

In some embodiments, a transmission unit is an OFDM tone symbol. In some such embodiments, an uplink channel segment, e.g., uplink traffic channel segment, includes a plurality of tone-halfslots, e.g., n tone-halfslots, each tone-halfslot including a predetermined number, e.g., m, of temporarily consecutive tone-symbols corresponding to the same tone, the tone-halfslots having a predetermined tone-halfslot index value k, each tone-symbol within a tone half-slot being identified by a relative tone-symbol index j, the equation j=MOD (k+X, m) identifying tone-symbols within the tone-halfslot which belong to the subset of tone-symbols, corresponding to the one of the N indicator values, one-tone symbol in each tone-halfslot corresponding to the indicator value being communicated, where X is the indicator value being communicated and X is an integer in the range 0 to m−1; where j is an integer in the range 0 to m−1; and k is an integer in the range of 0 to the total number of tone halfslots in the segment minus 1, n−1, where n is a positive integer greater than or equal to two and m is a positive integer greater than or equal to four. In some such embodiments, m=7.

In some embodiments, a transmission unit is an OFDM tone symbol. In some such embodiments, an uplink channel segment, e.g., uplink traffic channel segment, includes a plurality of tone-halfslots, e.g., n tone-halfslots, each tone-halfslot including a predetermined number, e.g., m, of temporarily consecutive tone-symbols corresponding to the same tone, the tone-halfslots having a predetermined tone-halfslot index value k, each tone-symbol within a tone half-slot being identified by a relative tone-symbol index j, the equation j=MOD (k−X, m) identifying tone-symbols within the tone-halfslot which belong to the subset of tone-symbols, corresponding to the one of the N indicator values, one-tone symbol in each tone-halfslot corresponding to the indicator value being communicated, where X is the indicator value being communicated and X is an integer in the range 0 to m−1; where j is an integer in the range 0 to m−1; and k is an integer in the range of 0 to the total number of tone halfslots in the segment minus 1, n−1, where n is a positive integer greater than or equal to two and m is a positive integer greater than or equal to four. In some such embodiments, m=7.

Figure 38:
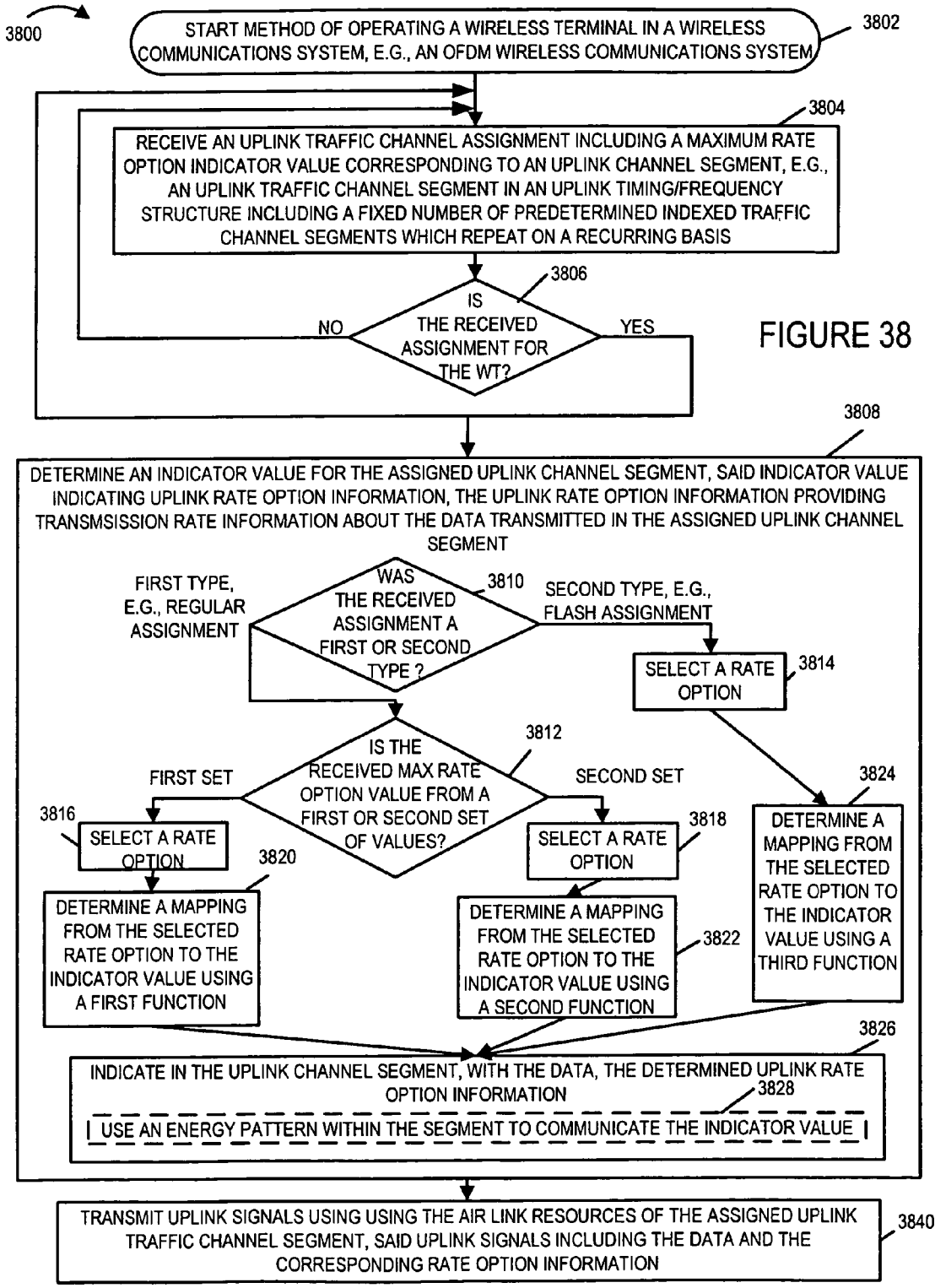
FIG. 38 is a flowchart of an exemplary method of operating a wireless terminal in a wireless communications system, in accordance with the present invention.

FIG. 38 is a flowchart 3800 of an exemplary method of operating a wireless terminal in a wireless communications system, in accordance with the present invention. For example, the wireless communications system may be an OFDM spread spectrum multiple access wireless communications system in which the base station signals a maximum uplink rate indicator value for an uplink traffic channel segment, and the WT transmits data in the assigned uplink traffic channel segment using a selected data rate option which is less than or equal to the received indicated maximum uplink data rate option. In such an exemplary OFDM system, the basic transmission unit may be an OFDM tone-symbol representing the air link resource associated with one tone for the duration of one OFDM symbol transmission time interval.

The method of operation starts in step 3802, where the WT is powered on and initialized. In step 3802, the WT may register with one of a plurality of base stations in the system, e.g., the base station corresponding to the cell in which it is currently located, and be transitioned into an ON state of operation, e.g., receiving a base station assigned wireless terminal identifier. Operation proceeds from step 3802 to step 3804.

In step 3804, the WT is operated to receive an uplink traffic channel assignment including a maximum rate option indicator value corresponding to an uplink traffic channel segment, e.g., an uplink traffic channel segment in an uplink timing/frequency structure including a fixed number of predetermined indexed traffic channel segments which repeat on a recurring basis. Then, in step 3806 the WT determines whether the received assignment is for the WT or for another WT registered with the base station, e.g., by examining the contents of an WT identifier field included as part of the assignment information and comparing the recovered information to the WT's BS assigned WT identifier.

If the assignment is not intended for the WT, operation proceeds from step 3806 back to step 3804, where the WT receives and processes other assignments. If the assignment is intended for the WT, operation proceeds from step 3806 to step 3808 for operations related to the assignment, and to step 3804 to receive and process additional assignments.

In step 3808, the WT is operated to determine an indicator value for the assigned uplink channel segment, said indicator value indicating uplink rate option information providing transmission rate information about the data transmitted in the assigned uplink channel segment. Step 3808 includes sub-step 3810 in which the WT determines whether the received assignment was a first, e.g., regular type assignment, or second type of assignment, e.g., a flash type assignment. If the received assignment was a first type of assignment, operation proceeds from sub-step 3810 to sub-step 3812, but if the received assignment was a second type of assignment, operation proceeds from sub-step 3810 to sub-step 3814.

In sub-step 3812, the WT determines whether the received max rate option value is from a first set of values or a second set of values. For example, with regard to the received maximum rate option values, an exemplary first set of values may be the set of values {0, 1, 2, 3, 4, 5, 6} and an exemplary second set of values may be the value {7}. If the received maximum rate option is from a first set of values then operation proceeds to sub-step 3812, but if the received maximum rate option value is from a second set of values, operation proceeds to sub-step 3818.

In sub-step 3816 the WT selects a rate option less than or equal to the received maximum rate option value and within a set of rate options associated with the first set. For example, the WT may select an uplink data rate option within the set of rate options {0, 1, 2, 3, 4, 5, 6} which is less than or equal to the received maximum rate option value communicated from the base station. Then, in sub-step 3820, the WT determines a mapping from the selected rate option to the indicator value using a first function. For example, an exemplary first function mapping from selected rate option to indicator value may be (0, 1, 2, 3, 4, 5, 6)→(0, 1, 2, 3, 4, 5, 6) and this mapping function may be used by the WT in sub-step 3820.

In sub-step 3818, the WT selects a rate option less than or equal to the received maximum rate option value and within a set of rate options associated with the second set. For example, the WT may select an uplink data rate option within the set of rate options {0, 1, 2, 3, 5, 6, 7} which is less than or equal to the maximum rate option communicated to the base station. Then, in sub-step 3822, the WT determines a mapping from the selected rate option value to the indicator value using a second function. For example an exemplary second function mapping from selected rate option to indicator value may be (0, 1, 2, 3, 5, 6, 7)→(0, 1, 2, 3, 4, 5, 6), and this mapping may be used by the WT in sub-step 3822.

In sub-step 3814, the WT selects a rate option less than or equal to the received maximum rate option value and within a set of rate options associated with the second type of assignment. In some embodiments, the set of rate options associated with the second type of assignment is the same as the set of rate options associated with the second set. For example, the WT may select an uplink data rate option within the set of rate options {0, 1, 2, 3, 5, 6, 7} which is less than or equal to the maximum rate option communicated to the base station. In some embodiments, the selection of a rate option in step 3814 includes using interference information, e.g., a beacon ratio report. For example, the received maximum rate option value communicated from the base station may be subjected to a potential decrease as a function of interference measurements performed by the WT resulting in a new maximum rate option value less than or equal to the received maximum rate option value; then the WT selects a uplink data rate option to use, e.g., as a function of the amount of data to communicate and/or time critically of the data, the selected uplink data rate option being less than or equal to the new maximum rate option value. Operation proceeds from step 3814 to step 3824.

In sub-step 3824, the WT determines a mapping from the selected rate option value to the indicator value using a third function. In some embodiments, the third function of step 3824 is the same as the second function used in step 3822. For example an exemplary third function mapping from selected rate option to indicator value may be (0, 1, 2, 3, 5, 6, 7)→(0, 1, 2, 3, 4, 5, 6), and this mapping may be used by the WT in sub-step 3224.

Operation proceeds from sub-step 3820 or sub-step 3822 or sub-step 3824 to sub-step 3826. In sub-step 3826, the WT is operated to indicate in the uplink channel segment, with the data, the determined uplink rate option information. In some embodiments, sub-step 3826 includes sub-step 3828. In sub-step 3828, the wireless terminal uses an energy pattern within the segment to communicate the indicator value. In other embodiments, the indicator value, which is a mapped selected rate option value, is included in the uplink traffic channel segment signaling using a different method, e.g., a coded sub-block within the uplink traffic channel segment conveying modulation symbol values using a predetermined coding and modulation scheme. In some such embodiments, the sub-block conveying the indicator value may use a non-coherent modulation method, e.g., a combination of zero and non-zero QPSK modulation symbols, while the portion of the uplink segment conveying the coded user data may use a coherent modulation scheme.

Operation proceeds from step 3226 to step 3840. In step 3840, the WT is operated to transmit uplink signals using the air link resources of the assigned uplink channel segment, the uplink signals including the data and the corresponding rate option information.

In some embodiments, the indicator value is one of N possible values and the total number of uplink data rate options supported by the WT is greater than N, where N is a positive integer greater than 1. For example N may be equal to 7 and the total number of uplink data rate options supported by the wireless terminal may be 8.

In various embodiments, an uplink segment includes a plurality of transmission units, the indicator value is one of the N possible indicator values, and each of the N possible indicator values correspond to a different subset of transmission units in the segment, and the indicator value is communicated by applying a higher power scale factor to the subset of the transmission units in said segment corresponding to the indicator value being communicated. In some such embodiments, each of the N different subsets of transmission units are non-overlapping with each transmission unit corresponding to at most one of the N different subsets. In some such embodiments, all the transmission units in the segment are included in a set of subsets which is formed from the combination of the N different subsets.

In some embodiments, a transmission unit is an OFDM tone symbol. In some such embodiments, an uplink channel segment, e.g., uplink traffic channel segment, includes a plurality of tone-halfslots, e.g., 112 tone-halfslots, each tone-halfslot including a predetermined number, e.g., seven, of temporarily consecutive tone-symbols corresponding to the same tone, the tone-halfslots having a predetermined tone-halfslot index value k, each tone-symbol within a tone halfslot being identified by a relative tone-symbol index j, the equation j=MOD (k+X, 7) identifying tone-symbols within the tone-halfslot which belong to the subset of tone-symbols, corresponding to the one of the N indicator values, one-tone symbol in each tone-halfslot corresponding to the indicator value being communicated, where X is the indicator value being communicated and X is an integer in the range 0 to 6; where j is an integer in the range 0 to 6; and k is an integer in the range of 0 to the total number of tone-halfslots in the segment minus 1, e.g. 0 to 111.

In some embodiments, a transmission unit is an OFDM tone symbol. In some such embodiments, an uplink channel segment, e.g., uplink traffic channel segment, includes a plurality of tone-halfslots, e.g., 112 tone-halfslots, each tone-halfslot including a predetermined number, e.g., seven, of temporarily consecutive tone-symbols corresponding to the same tone, the tone-halfslots having a predetermined tone-halfslot index value k, each tone-symbol within a tone halfslot being identified by a relative tone-symbol index j, the equation j=MOD (k−X, 7) identifying tone-symbols within the tone-halfslot which belong to the subset of tone-symbols, corresponding to the one of the N indicator values, one-tone symbol in each tone-halfslot corresponding to the indicator value being communicated, where X is the indicator value being communicated and X is an integer in the range 0 to 6; where j is an integer in the range 0 to 6; and k is an integer in the range of 0 to the total number of tone halfslots in the segment minus 1, e.g., 0 to 111.

In some embodiments, a transmission unit is an OFDM tone symbol. In some such embodiments, an uplink channel segment, e.g., uplink traffic channel segment, includes a plurality of tone-halfslots, e.g., n tone-halfslots, each tone-halfslot including a predetermined number, e.g., m, of temporarily consecutive tone-symbols corresponding to the same tone, the tone-halfslots having a predetermined tone-halfslot index value k, each tone-symbol within a tone half-slot being identified by a relative tone-symbol index j, the equation j=MOD (k+X, m) identifying tone-symbols within the tone-halfslot which belong to the subset of tone-symbols, corresponding to the one of the N indicator values, one-tone symbol in each tone-halfslot corresponding to the indicator value being communicated, where X is the indicator value being communicated and X is an integer in the range 0 to m−1; where j is an integer in the range 0 to m−1; and k is an integer in the range of 0 to the total number of tone halfslots in the segment minus 1, n−1, where n is a positive integer greater than or equal to two and m is a positive integer greater than or equal to four. In some such embodiments, m=7.

In some embodiments, a transmission unit is an OFDM tone symbol. In some such embodiments, an uplink channel segment, e.g., uplink traffic channel segment, includes a plurality of tone-halfslots, e.g., n tone-halfslots, each tone-halfslot including a predetermined number, e.g., m, of temporarily consecutive tone-symbols corresponding to the same tone, the tone-halfslots having a predetermined tone-halfslot index value k, each tone-symbol within a tone half-slot being identified by a relative tone-symbol index j, the equation j=MOD (k−X, m) identifying tone-symbols within the tone-halfslot which belong to the subset of tone-symbols, corresponding to the one of the N indicator values, one-tone symbol in each tone-halfslot corresponding to the indicator value being communicated, where X is the indicator value being communicated and X is an integer in the range 0 to m−1; where j is an integer in the range 0 to m−1; and k is an integer in the range of 0 to the total number of tone halfslots in the segment minus 1, n−1, where n is a positive integer greater than or equal to two and m is a positive integer greater than or equal to four. In some such embodiments, m=7.

Figure 33:
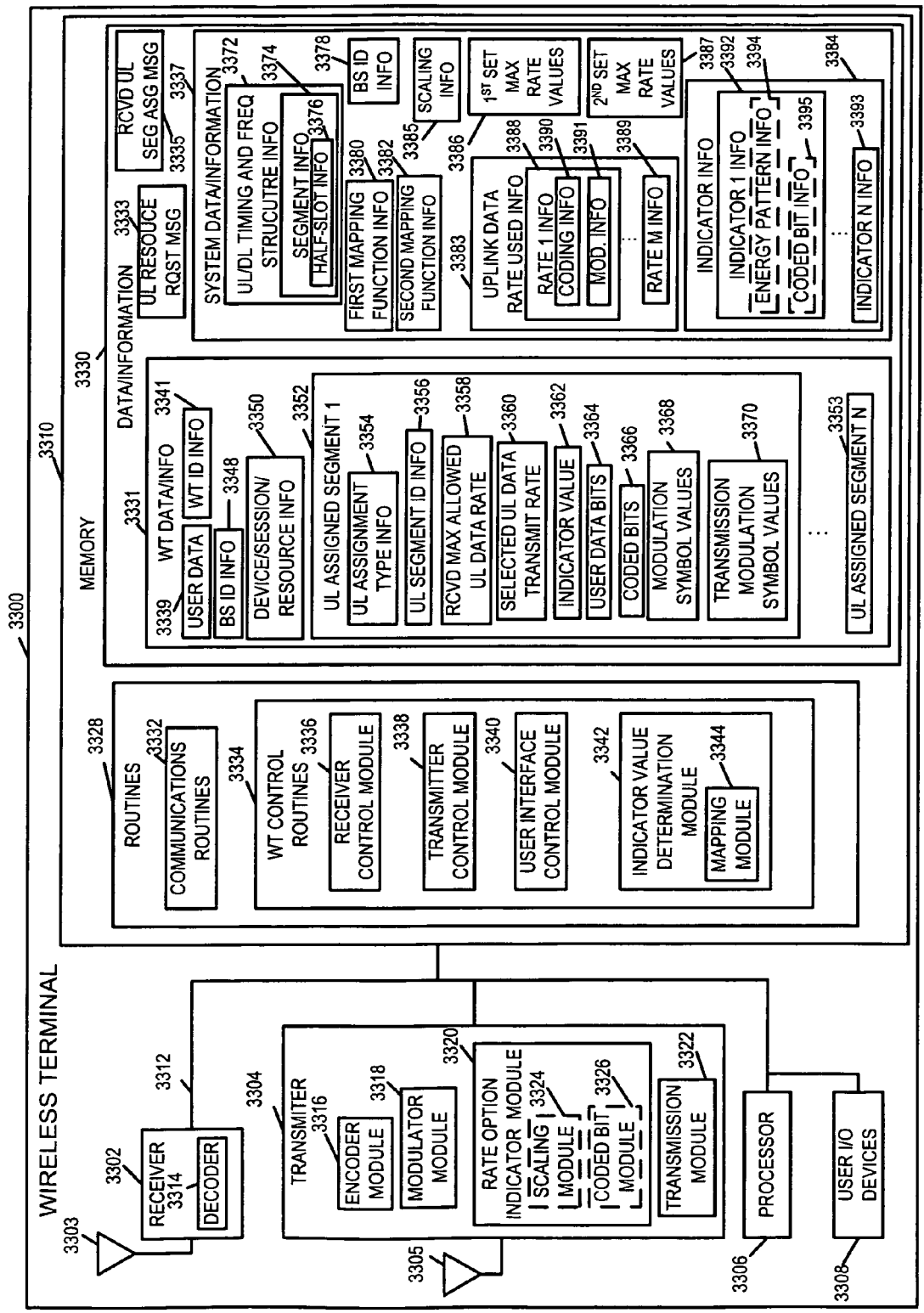
FIG. 33 is a drawing of an exemplary wireless terminal, e.g., mobile node, implemented in accordance with the present invention and using methods of the present invention.

FIG. 33 is a drawing of an exemplary wireless terminal 3300, e.g., mobile node, implemented in accordance with the present invention and using methods of the present invention. Wireless terminal 3300 includes a receiver 3302, a transmitter 3304, a processor 3306, user I/O devices 3308, and memory 3310, coupled together via a bus 3312 over which the various elements can interchange data and information.

Receiver 3302 is coupled to receive antenna 3303 via which wireless terminal 3300 can receive downlink signals from base stations including assignment signals, e.g., assignment signals including assignments of uplink, e.g., traffic channel, segments including maximum uplink rate option indicator information. Receiver 3302 includes a decoder 3314 for decoding received downlink signals.

Transmitter 3304 is coupled to transmit antenna 3305 via which WT 3300 can transmit uplink signals, e.g., uplink resource request signals and uplink traffic channel signals using assigned segments, to base stations. In some embodiments, the same antenna is used for both the transmitter 3304 and receiver 3302. Transmitter 3304 includes an encoder module 3316, a modulator module 3318, a rate option indicator module 3320, and a transmission module 3322.

Encoder module 3316 generates coded bits at a coding rate corresponding to an uplink rate option, the coded bits being generated from data bits to be transmitted. Modulator module 3318 modulates the coded bits into modulation symbols using a modulation method corresponding to the uplink rate option. For example, the WT 3300 may have selected to use a particular uplink data rate option for an uplink traffic channel segment assigned to the WT, and the selected data rate option corresponds to a coding rate and a modulation method. The corresponding coding rate information is used by the encoder module 3316 to perform encoding, e.g., block encoding for the segment, of a set of data bits, sometimes referred to as information bits, to a set of coded bits. The corresponding modulation method, e.g., QPSK or QAM16, determines the constellation used for mapping the coded bits output from encoder module 3316 into modulation symbol values by modulator module 3318.

Rate option indicator module 3320 generates, on a per uplink transmission segment basis, an indication of the uplink rate option used, for encoding of data corresponding to the uplink transmission segment. In some embodiments, rate option indicator module 3320 includes one of the following modules: scaling module 3324 and coded bit module 3326. Scaling module 3324 scales, for a given uplink traffic channel segment, at least some of the modulation symbols output from modulation module 3318, as a function of a determined rate option indicator value corresponding to the uplink traffic channel segment, to produce an energy pattern within the segment, the energy pattern communicating the indicator value. Coded bit module 3326 generates the indication of the uplink rate option by including coded bits, indicating the rate option indicator value, which are transmitted as symbol constellation values within the uplink traffic channel segment.

Transmission module 3322, e.g., a power amplifier output stage of transmitter 3304, transmits transmission modulation symbols conveying both the data bits and an indicator of the uplink rate option corresponding to the transmission segment. For example, in an embodiment using scaling module 3324, the transmission modulation symbols may correspond to the output modulation symbols from modulation module 3318, but with a subset of the output modulation symbols from the modulation module 3318 having been rescaled by module 3324. In some embodiments using coded bit module 3326, the transmission modulation symbols may be partitioned into those conveying the coded indicator bits and those conveying the coded indicator bits. In other embodiments using coded bit module 3326, at least some of the transmission modulation symbols may convey both coded data bits and coded indicator bits.

User I/O devices 3308, e.g., display, speaker, microphone, camera, keypad, keyboard, mouse, control switches, etc., allow the user of WT 3300 to input data/information, output data/information, and control functions, e.g., power on, initiate a call, etc.

Memory 3310 includes routines 3328 and data/information 3330. The processor 3306, e.g., a CPU, executes the routines 3328 and uses the data/information 3330 in memory 3310 to control the operation of the WT 3300 and implement the methods of the present invention. Routines 3328 include a communications routines 3332 and WT control routines 3334. The communications routines 3332 implement the communications protocols implemented by the WT 3300. WT control routines 3334 include a receiver control module 3336, a transmitter control module 3338, a user interface control module 3340, and an indicator value determination module 3342. Receiver control module 3336 controls operation of receiver 3302; transmitter control module controls operation of transmitter 3304, user interface control module 3340 controls operation of user I/O devices 3308.

Indicator value determination module 3342 determines, e.g., for a given uplink traffic channel segment assigned to the WT, an indicator value from a maximum rate option value and a selected rate option. The determined indicator value is used by the rate option indicator module 3320 to generate the indication of the uplink rate option. Indicator value determination module 3342 includes mapping module 3344. Mapping module 3344 maps the selected rate option, corresponding to an uplink traffic channel segment assigned to WT 3300, to an indicator value, using a first function when the received maximum rate option value corresponding to the segment is in a first set of values and using a second function, which is different from the first function, when the received maximum rate option value is in a second set of values, the second set of values being different from the first set of values.

Data/information 3330 includes WT data/information 3331, uplink resource request messages 3333, received uplink segment assignment messages 3335, and system data/information 3337. WT data/information 3331 includes user data 3339, base station identification information 3348, WT identification information 3341, device/session/resource information 3350, and uplink assigned segment information (UL assigned segment 1 information 3352, . . . , UL assigned segment N information 3353). User data 3339, e.g., voice data, video data, text data, file data, etc., includes data pertaining to communications sessions with a peer nodes of WT 3300. WT identification information 3341 includes a base station assigned WT user identifier, e.g., an active user identifier. Base station identification information 3348 includes an identifier associated with the base station which WT 3300 is currently using as its point of network attachment. Device/session/resource information 3350 includes, e.g., device control information, ongoing session information such as information identifying the peer node, routing information, etc., and assignment segment information including information identifying uplink and downlink traffic channel segments assigned to the WT 3300 by the base station.

Uplink assigned segment 1 information 3352 includes uplink assignment type information 3354, uplink segment identification information 3356, received maximum allowed uplink data rate information 3358, selected uplink data transmit rate information 3360, indicator value 3362, user data bits 3364, coded bits 3366, modulation symbol values 3368, transmission modulation symbol values 3370. Uplink assignment type information 3354 includes information identifying the type of assignment corresponding to the uplink segment, e.g., a regular assignment or a flash assignment. In some embodiments, a mapping function or functions may also depend upon the type of assignment. Uplink segment identification information 3356 includes information identifying the uplink segment, e.g., via an index value. For example, the uplink timing and frequency structure may include a fixed number of indexed uplink traffic channel segments, and the set of indexed uplink segments may repeat. Received maximum allowed uplink data rate 3358 includes a base station communicated maximum uplink rate option indicator value. Selected uplink data transmit rate 3360 includes a WT selected uplink data rate option to be used for the uplink traffic channel segment, e.g., corresponding to number of data bits or frames of data bits to be communicated in the uplink traffic channel segment. The selected uplink rate option is less than or equal to the received maximum allowed uplink rate option. In some embodiments, for some segments, in the selection process of the WT uplink rate option for an uplink traffic channel segment, the maximum uplink rate option is further reduced from the BS value based on interference information determined at the WT, e.g., a beacon ratio report, and then the selection is performed by the WT, e.g., based on the amount of information to be communicated and/or urgency of the information.

Indicator value 3362 is the output of indicator value determination module 3342 and is used by rate option indicator module 3320 to incorporate the value into the uplink traffic channel segment signals. In some embodiments, the indicator value is one of N possible indicator values, each of the N possible indicator values corresponding to a different subset of transmission units in the uplink traffic channel segment, each transmission unit corresponding to one of said modulation symbols to be communicated in the segment, the indicator value being communicated by the scaling module 3324 applying a higher power scale factor to the modulation symbols corresponding to the subset of transmission units in the segment corresponding to the indicator value to be communicated, where N is a positive integer greater than 1. In some embodiments, each of the N different subsets of transmission units are non-overlapping with each transmission unit corresponding to at most one of the N different subsets. In some such embodiments, all the transmission units are included in a set of subsets which is formed from the combination of the N different subsets of transmission units.

User data bits 3364 are bits of user information, e.g., representing voice, video, text, files, etc., corresponding to the segment, to be input to encoder module 3316, while coded bits 3366 represents the output bits of the encoder module 3316. The coded bits 3366 are mapped onto modulation symbol values 3368 by the modulation module 3318. The transmission module symbol values 3370 are the symbol values transmitted by transmission module 3322 and correspond to the modulation symbol values, e.g., with some of the modulation symbol values 3368 having been rescaled by the scaling module 3324 to generate an energy pattern for the segment conveying the indicator value 3362.

UL resource request messages 3333 includes requests for uplink traffic channel air link resources, e.g., requests for segments and/or requests identifying the amount of user data bits to be communicated via the uplink, e.g., a number of frames. Received uplink segment assignment message 3335 includes received information identifying the WT to which the corresponding uplink segment is assigned and a maximum rate option indicator value.

System data/information 3337 includes uplink/downlink timing and frequency structure information 3372, BS identification information 3378, first mapping function information 3380, second mapping function information 3382, uplink data rate used information 3383, scaling information 3385, $1^{st}$ set of max rate values 3386, $2^{nd}$ set of max rate values 3387, and indicator information 3384. Uplink/downlink timing and frequency structure information 3372 includes, e.g., carrier frequencies used, tones used, tone blocks used, tone hopping sequences used, transmission unit information, e.g., OFDM tone-symbol information, OFDM symbol transmission timing information, grouping of OFDM symbols into half-slots, slots, superslots, beaconslots, etc. UL/DL timing and frequency structure information 3372 includes segment information 3374, e.g., information identifying indexed uplink traffic channel segments in the structure. Segment information 3374 includes half-slot information 3376, e.g., information identifying indexing of tone-halfslots within an uplink traffic channel segment and information identifying indexed tone-symbols within the tone-halfslots. Base station identification information 3378 includes information identifying different base stations within the wireless communications system which may be used by WT 3300 as its point of attachment, e.g., beacon information, pilot tone information, hopping pattern information, carrier information, etc., associated with each particular base station. First mapping function information 3380 includes information used by mapping module 3344 to map a selected UL rate option to an indicator value, when the received max rate option value is in the $1^{st}$ set of rate values. Second mapping function information 3382 includes information used by mapping module 3344 to map a selected UL rate option to an indicator value, when the received max rate option value is in the $2^{nd}$ set of rate values. Scaling information 3385 is used by scaling module 3324 to determine the amount to rescale the selected modulation symbol values in order to generate an energy pattern in the uplink traffic channel segment which conveys the indicator value. The possibilities of maximum rate indicator values that may be communicated from the base station may be partitioned into a $1^{st}$ set of maximum rate values 3386 and a second set of maximum rate values 3387, each set corresponding to a mapping function 3380, 3382, respectively. For example, in a WT supporting eight uplink rate options, but with the indicator value being limited to seven different value possibilities, an exemplary first set of maximum rate values 3386 may be the set of values {0, 1, 2, 3, 4, 5, 6} while an exemplary second set of maximum rate values may be the set {7}. The base station, having communicated the maximum rate value for the uplirk segment in its assignment message knows which mapping function was used by the WT to generate the indicator and thus is able to properly interpret the indicator and associate the indicator with the uplink data rate option being used by the WT.

Uplink data rate used information 3383 includes a plurality of sets of information corresponding to the different uplink data rate options supported by the WT (data rate 1 information 3388, data rate M information 3389). Data rate 1 information 3388 includes coding information 3390, e.g., identifying a coding rate, and modulation information 3391, e.g., identifying a modulation method with a modulation constellation, e.g., QPSK or QAM 16. In some embodiments, the WT supports more data rate options than can be indicated by the number of possible indicator values. For example, the indicator value can be one of N possible values, the total number of rate options supported by the wireless terminal can be M, M and N are positive values greater than 1, and M>N. For example, N can be equal to 7 and M can be equal to 8.

Indicator information 3384 includes a plurality of sets of indicator information (indicator 1 information 3392, . . . , indicator N information 3393), each associated with a different indicator value. Indicator 1 information 3394 includes one of energy pattern information 3394 and coded bit information 3395. The coded bit information 3395 includes mapping information associating the indicator value with a pattern of coded bits to be transmitted as symbol constellation values.

Energy pattern information 3394 includes information used in generating the energy pattern within the segment corresponding to the indicator value. For example, the uplink transmission segment includes a plurality of tone-halfslots, each tone-halfslot including a predetermined number of temporally consecutive tone-symbols corresponding to the same tone, the tone-halfslots having a predetermined tone-halfslot index order within the segment, each tone half-slot being identified by a tone-halfslot index value k, each tone-symbol within a tone-halfslot being identified by a relative tone-symbol index j, the equation j=MOD (k+X, m) identifying tone-symbols within the tone-halfslots which belong to the subset of tone-symbols, corresponding to the one of the N indicator values, one tone-symbol in each tone-halfslot corresponding to the indicator value being communicated, where X is the indicator value being communicated and X is an integer in the range 0 to m−1; where j is an integer value in the range 0 to m−1; k is an integer value in the range of 0 to the total number of tone-halfslots in the segment minus 1, and m is greater than 4. In some embodiments m=7.

Figure 34A:
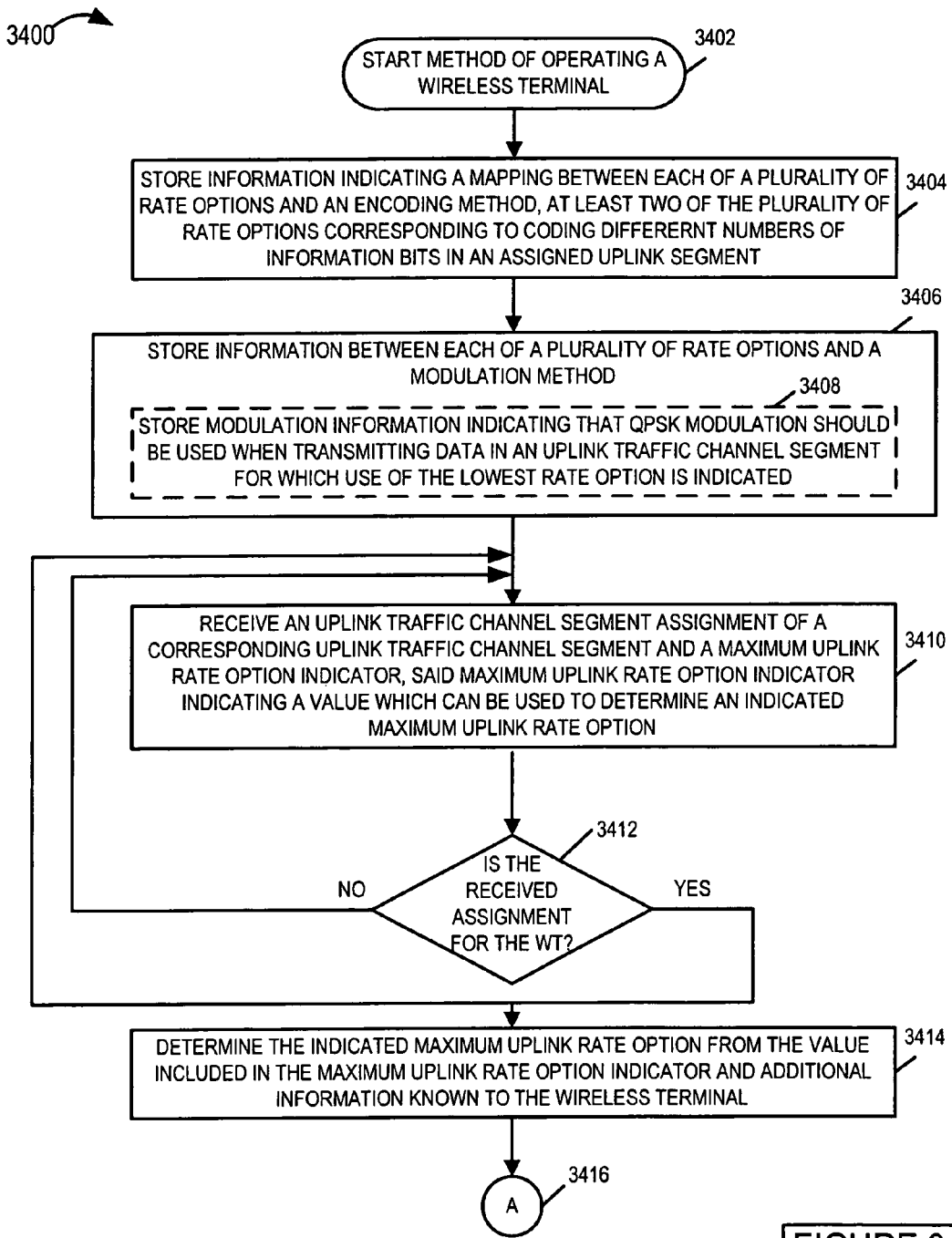
FIG. 34 comprising the combination of FIG. 34A
FIG. 34B is a flowchart of an exemplary method of operating a wireless terminal in accordance with the present invention.
Figure 34B:
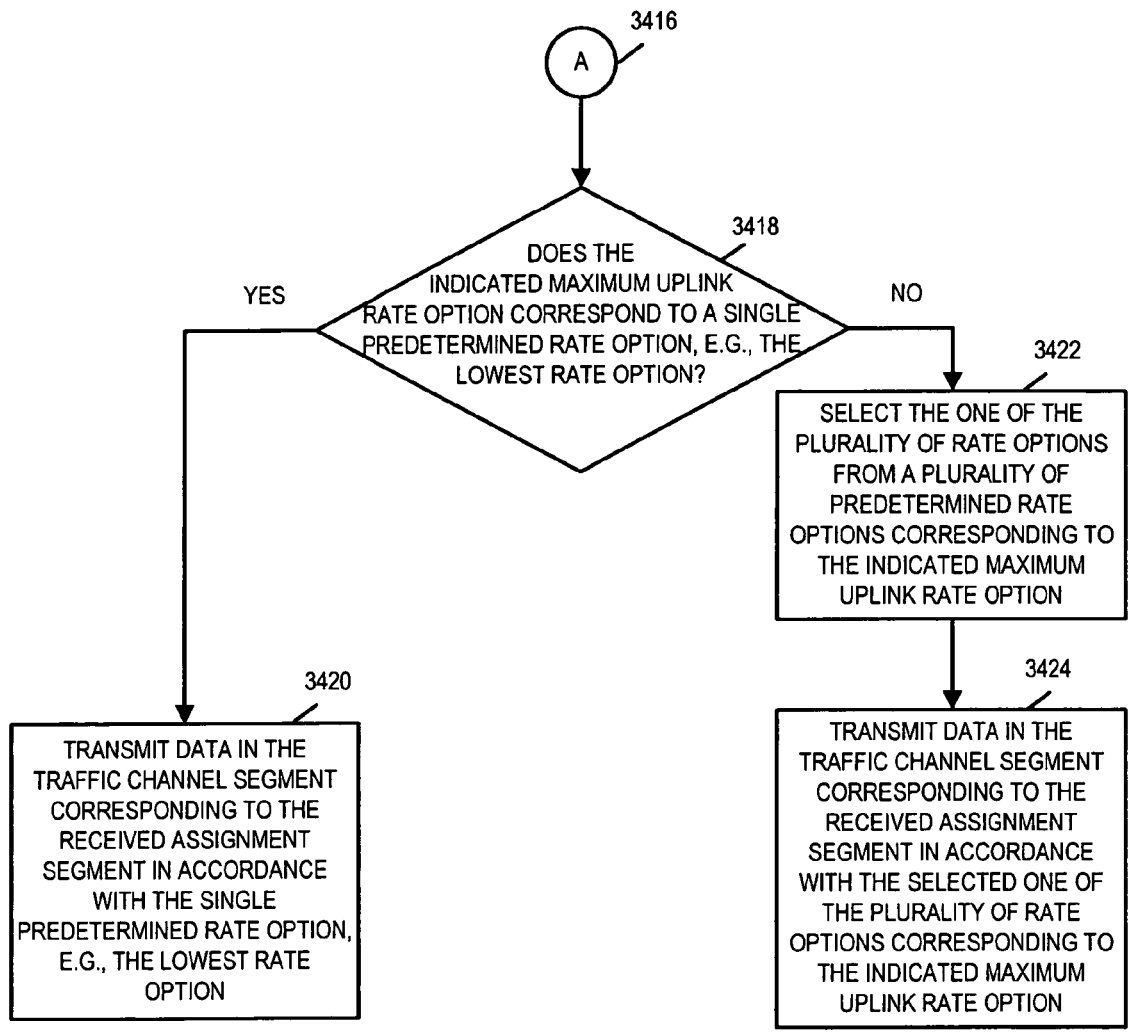

FIG. 34 comprising the combination of FIG. 34A and FIG. 34B is a flowchart 3400 of an exemplary method of operating a wireless terminal in accordance with the present invention. The exemplary wireless terminal, e.g., a mobile node, implemented in accordance with the present invention, may be, e.g., part of a wireless spread spectrum OFDM communications system including at least one base station and a plurality of wireless terminals. In some embodiments, the wireless communications system includes a plurality of base stations, and the WT registers with the base station in whose cell it is currently located. The base station or stations transmit downlink assignment information for uplink traffic channel segments, the assignment information for an uplink traffic channel segment including a maximum rate option indicator. In some embodiments, the maximum rate option indicator may be communicated as part of an OFDM signal. For at least some of the uplink traffic channel segment assignments assigned to the WT, the WT selects the uplink rate option to use for the corresponding uplink traffic channel segment, the selected rate option being less than or equal to an maximum uplink rate option. Each uplink rate option may correspond to a coding rate and modulation scheme. For example, the table of FIG. 23 lists 8 uplink rate options that may be supported by a WT in an exemplary system.

The method of operation starts in start step 3402, where the WT is powered on. Operation proceeds to step 3404, where the WT stores information indicating a mapping between each of a plurality of rate options and an encoding method, at least two of the plurality of rate options corresponding to coding different numbers of information bits in an assigned uplink traffic channel segment. Operation proceeds from step 3404 to step 3406, where the WT stores information between each of a plurality of rate options and a modulation method. In some embodiments at least 8 different maximum rate options can be indicated. In some embodiments, at least two of the plurality of rate options corresponds to different modulation methods, e.g., QPSK and QAM16. In some embodiments, step 3406 includes sub-step 3408. In sub-step 3408, the WT stores modulation information indicating that QPSK modulation should be used when transmitting data in an uplink traffic channel segment for which the lowest rate option is indicated. In some embodiments, steps 3404 and step 3406 are performed as part of a WT software load/initialization process, e.g., downloading mapping information into a non-volatile memory for future use by the WT. In some such embodiment, steps 3404 and 3406 need not be repeated during subsequent turn-ons provided the stored mapping information does not change. Operation proceeds from step 3406 to step 3410.

In step 3410, the WT is operated to receive an uplink traffic channel segment assignment of a corresponding uplink traffic channel segment and a maximum uplink rate option indicator, said maximum uplink rate option indicator indicating a value which can be used to determine an indicated maximum uplink rate option. In some embodiments, for at least some types of uplink traffic channel assignments, e.g., regular uplink traffic channel assignments, the maximum rate option indicator is a 3 bit indicator and the WT includes information associating each of the 8 values which can be indicated with information indicating different numbers of information bits to be coded into the segment. In some embodiments, for at least some types of uplink traffic channel assignments, e.g., flash uplink traffic channel assignments, the maximum rate option indicator is communicated in the received signal using fewer bits than the number of bits required to uniquely identify each of the selectable uplink rate options, e.g., one bit is used for the maximum uplink rate option indicator and the WT supports more than two selectable uplink rate options. In some embodiments, the WT supports first and second signaling methods for communicating maximum rate option indicators, and the maximum rate option indicator includes one bit if it was communicated using a first signaling method and 3 bits if it was communicated using a second signaling method. For example, the first signaling method may use conventional coherent modulation techniques using QPSK with per tone average transmission power for non-zero modulation symbol values at a first level, while the second signaling method may use non-coherent modulation techniques including some zero and some non-zero QPSK modulation symbols values assigned to allocated resources, with the non-zero QPSK modulation symbol values being transmitted at a second level, wherein the second level is higher than the first level. Operation proceeds from step 3410 to step 3412.

In step 3412, the WT determines as to whether or not the received uplink traffic channel segment assignment was intended for the WT or for another WT. For example, the WT, having previously registered with the BS which transmitted the assignment may have been previously assigned a WT identifier by the BS, the assignment signal may include a WT identifier to associate the assignment with a particular registered WT, and the WT may compare the WT identifier in the received assignment with its own BS assigned WT identifier to determine whether it is the intended recipient of the assignment. If the received assignment of step 3410 was not for the WT, operation proceeds from step 3412 to step 3410, wherein step 3410 the WT continues to receive additional assignments. If the received assignment was for the WT operation proceeds from step 3412 to step 3414, where the WT performs operations related to the assignment and back to step 3410, where the WT receives additional uplink traffic channel assignments. The WT can receive multiple uplink traffic channel assignments from the same BS intended for the WT, e.g., with different uplink traffic channel assignments corresponding to different uplink traffic channel segments and with each assignment including a maximum uplink rate option indicator. In some embodiments, some assignment messages, e.g., some regular assignment channel messages, may include multiple, e.g., two, uplink traffic channel assignments, and one or more of those assignments may be directed to the WT.

In step 3414, the WT determines the indicated maximum uplink rate option from the value included in the maximum uplink rate option indicator and additional information known to the wireless terminal. In some embodiments, the additional information is information indicating whether the maximum uplink rate option indicator was received in a first or second assignment channel, e.g., a regular assignment channel or a flash assignment channel. In some embodiments, when the maximum uplink rate option information was received in a second assignment channel, the additional information further includes signal interference information, e.g., beacon ratio report information. For example, a single bit value communicated in a received second assignment channel may distinguish between two maximum uplink rates, e.g., rate option 3 or rate option 7, and then generic beacon ratio report results, based on WT measurements, can be used to further qualify, e.g., reduce, the maximum WT uplink rate option allowed. Operation proceeds from step 3414 via connecting node A 3416 to step 3418.

In step 3418, the wireless terminal determines if the indicated maximum uplink rate option corresponds to a single predetermined rate option, e.g., the lowest rate option. If the WT determines that the indicated rate option corresponds to a single predetermined rate option, then operation proceeds from step 3418 to step 3420; otherwise, operation proceeds from step 3418 to step 3422.

In step 3420, the WT transmits data in the traffic channel segment corresponding to the received assignment segment in accordance with the single predetermined rate option, e.g., the lowest uplink rate option supported by the WT. In some embodiments, the single predetermined rate option corresponds to the lowest traffic channel coding rate option which can be indicated by the maximum uplink rate option indicator, e.g., uplink traffic channel rate option 0 which codes 224 information bits into a codeword of 1344 coded bits and represents a coding rate of 1/6.

In step 3422, the WT selects one of the plurality of rate options from a plurality of predetermined rate options corresponding to the indicated maximum uplink rate option. In some embodiments, the selection of step 3422 may be based upon how much information the WT needs to communicate and/or the time urgency of the communication. Operation proceeds from step 3422 to step 3424. In step 3424, the WT transmits data in the traffic channel segment corresponding to the received assignment segment in accordance with the selected one of the plurality of rate options corresponding to the indicated maximum uplink rate option.

Figure 35:
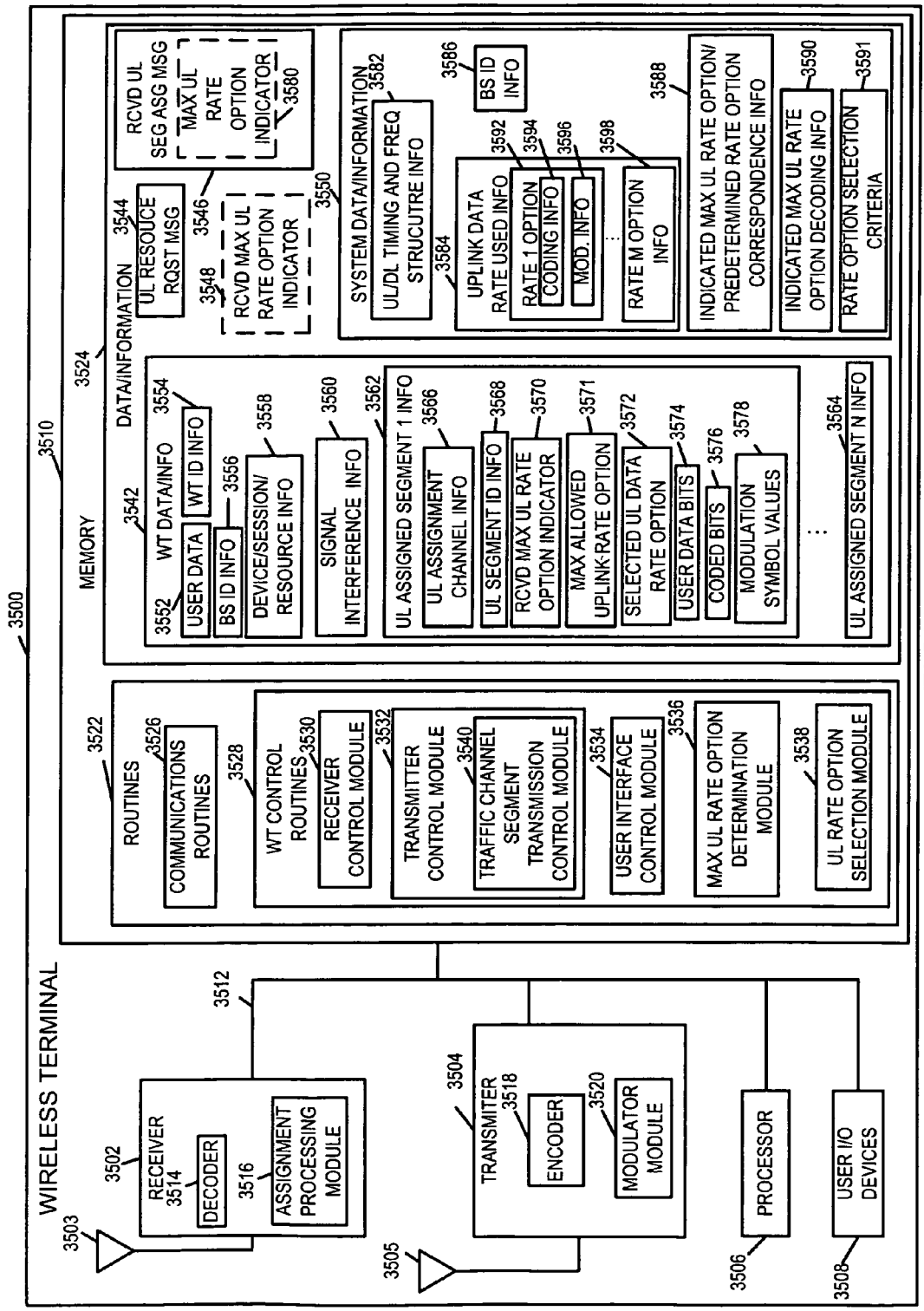
FIG. 35 is a drawing of an exemplary wireless terminal, e.g., a mobile node, implemented in accordance with the present invention and using methods of the present invention.

FIG. 35 is a drawing of an exemplary wireless terminal 3500, e.g., a mobile node, implemented in accordance with the present invention and using methods of the present invention. Exemplary WT 3500 includes a receiver 3502, a transmitter 3504, a processor 3506, user I/O devices 3508, and memory 3510 coupled together via a bus 3512 via which the various elements can interchange data and information. Receiver 3502 is coupled to a receive antenna 3503 via which the WT 3500 can receive downlink signals, e.g., downlink OFDM signals, from base stations, the received downlink signals including assignments of uplink traffic channel segments and corresponding maximum uplink rate option indicators. Receiver 3502 includes a decoder 3514 for decoding received signals and an assignment processing module 3516. The assignment processing module 3516 processes the one or more received traffic channel assignments from a base station indicating assignment of uplink traffic channels to WT 3500. In some embodiments, an uplink traffic channel assignment message includes a maximum uplink rate option indicator, which is processed by module 3516.

Transmitter 3504 is coupled to a transmit antenna 3505 via which the WT 3500 transmits uplink traffic channel signals including uplink traffic channel segment signals, e.g., uplink OFDM traffic channel segment signals, to base stations. In some embodiments, the same antenna is used for both receiver 3502 and transmitter 3504. Transmitter 3504 includes an encoder 3518 and a modulation module 3520. For a given uplink traffic channel segment, the rate option being used; e.g., selected, by WT 3500, corresponds to a coding rate and modulation method. Encoder 3518, e.g., a block encoder such as an LDPC encoder, utilizes the coding rate for the segment and codes user data bits into coded data bits. Modulation module 3520 utilizes the modulation method, e.g., identifying a modulation constellation, for the segment and maps the coded bits from the output of the encoder 3518 to modulation symbol values.

User I/O devices 3508, e.g., display, keyboard, keypad, mouse, speaker, microphone, camera, control switches, etc., allows the user of WT 3500 to input user data/info intended for peer nodes and to output user data/info from peer nodes. In addition, user I/O devices 3508 allow the user to control operations of WT 3500, e.g., initiating a call, powering down, etc.

Memory 3510 includes routines 3522 and data/information 3524. The processor 3506, e.g., a CPU, executes the routines 3522 and uses the data/information 3524 in memory 3510 to control the operation of the WT 3500 and implement methods of the present invention.

Routines 3522 includes communications routines 3526, which implements the communication protocols used by the WT 3500, and WT control routines 3528. WT control routines 3528 includes a receiver control module 3530, a transmitter control module 3532, a user interface control module 3534, a maximum uplink rate option determination module 3536, and an uplink rate option selection module 3538. Receiver control module 3530 controls operations of receiver 3502; transmitter control module 3532 controls operations of transmitter 3504; user interface control module controls operations of user I/O devices 3508. Transmitter control module 3532 includes a traffic channel segment transmission control module 3540. Traffic channel segment transmission control module 3540, operating in conjunction with transmitter 3504, enables the transmission of uplink signals in uplink traffic channel segments corresponding to received assignments, in accordance with the uplink rate option the WT is using for each of the assigned uplink traffic channel segments. For some uplink traffic channel segments, the WT may have received a maximum uplink rate option indicator allowing the WT to select between a plurality of different rate options. For some uplink traffic channel segments, the WT may have received a maximum uplink rate option indicator that corresponds to a single predetermined rate option that the WT uses. For example, the single predetermined rate option may correspond to the lowest traffic channel uplink rate option which can be indicated by the maximum uplink rate option indicator. In some embodiments the single predetermined rate option may correspond to the lowest coding rate supported by the WT for uplink traffic channel segments and QPSK modulation.

Maximum uplink rate option determination module 3536, which is coupled to receiver 3502, determines the indicated maximum uplink rate option from the value included in the maximum uplink rate option indicator and additional information known to the WT 3500. For example, the additional information may be information indicating whether the maximum uplink rate option information was received in a first or second assignment signal channel. In some embodiments, a first assignment signal channel may be a regular assignment signal channel using coherent modulation signaling while a second assignment signal channel may be a flash assignment channel using non-coherent modulation signaling. In some embodiments, the additional information includes stored signal interference information. For example, for some segments, the received maximum uplink rate option indicator may limit, e.g., cap, the uplink rate options that the WT may select, and interference information measurements by the WT may be used to further limit, e.g., cap, the rate options that the WT may select.

Uplink rate option selection module 3538, for at least some uplink traffic channel segments, selects, the one of the plurality of rate options from a plurality of predetermined rate options corresponding to the indicated maximum uplink rate option, to be used subsequently in transmitting data in the assigned uplink traffic channel segment in accordance with the selected one of a plurality of rate options. For example, consider that the WT supports 8 uplink rate option (0, . . . 7), that the assignment is received via a regular assignment channel, that the received assignment includes a maximum rate indicator which indicates the maximum allowed uplink rate option for the assigned uplink traffic channel segment is 5, and that the WT determines that its current uplink data transmission requirements could be satisfied by using rate option 3. In such an exemplary case, the selection module 3538 may select to use uplink rate option 3 from a potential set of allowable rate option {0, 1, 2, 3, 4, 5}. The selected uplink rate option 3 corresponds to coding rate information and modulation information, which is utilized by transmitter 3504.

Data/information 3524 includes WT data/information 3542, uplink resource request messages 3544, received uplink segment assignment messages 3546, and system data/information 3550. In some embodiments, data/info 3524 includes a received maximum uplink rate option indicator 3548, e.g., the rate option indicator is communicated outside of the uplink segment assignment message, e.g., as a separate message or incorporated in a message with other control information.

WT data/information 3542 includes user data 3552, e.g., voice, video, text, files, etc., WT identification information 3554, e.g., a base station assigned WT identifier; base station identification information 3556, e.g., information identifying the BS being used currently by WT 3550 as its point of network attachment, device/session/resource information 3558, signal interference information 3560, and sets of uplink assigned segment information (UL assigned segment 1 information 3562, UL assigned segment N information 3564). Device session/resource information 3558 includes, e.g., information identifying ongoing communications sessions, peer nodes, routing information, uplink and downlink channel segments assigned to WT 3500, etc. Signal interference information 3560 includes, e.g., beacon ratio report information. In some embodiments, for some types of uplink assignment signals, e.g., uplink assignment signals associated with a flash assignment channel, the signal interference information 3560 may be use to further limit the maximum allowable uplink data rate option that may be selected by the WT for an uplink traffic channel segment.

Uplink assigned segment 1 information 3562 includes uplink assignment channel information 3566, uplink segment identification information 3568, received maximum uplink rate option indicator 3570, a maximum allowed uplink rate option 3571, a selected uplink data rate option 3572, user data bits 3574, coded bits 3576, and modulation symbol values 3578. Uplink assignment channel information 3562 includes information indicating whether the maximum uplink rate option indicator was received in a first of second assignment channel, e.g., a regular or flash assignment channel. Uplink segment identification information 3568 includes, e.g., a segment index number identifying the segment within a repetitive uplink timing and frequency structure including a fixed number of indexed uplink traffic channel segments. Received maximum uplink rate option indicator 3570 includes information indicating the maximum uplink rate option that may be used by the WT from the perspective of the BS. Maximum allowed uplink rate option 3571 is the maximum rate option that may be used by the WT for the uplink segment taking into consideration the base stations input, and, in some embodiments, for some types of assignments, additionally taking into consideration signal interference information 3560. Selected UL data rate option 3572 is the output of module 3538 and is a data rate option less than or equal to the data rate option indicated by maximum allowed uplink rate option 3571. User data bits 3574, e.g., user bits representing voice, video, text, files, etc., are input for a coding block for the uplink traffic channel segment, while coded bits 3576 are output for the coding block, with the coding being performed by encoder 3518, using the coding rate that is mapped to correspond to the selected data rate option 3572 for the segment. Modulation symbol values 3578 are the modulation symbol values corresponding to when the coded bits 3576 are mapped to modulation symbols of the modulation constellation used by the modulation method for the segment, the modulation method having been mapped to correspond to the selected data rate option 3572.

Uplink resource request messages 3544 are messages to be communicated via uplink signaling to a base station requesting uplink traffic channel segments, and/or identifying amounts of uplink data to be communicated by the WT 3500. Received uplink segment assignment messages 3546 convey uplink segment assignment information. In some embodiment, some assignment messages include one or a plurality of uplink assignments. In some embodiments, some assignment messages include at most one uplink assignment. For example a regular traffic channel assignment message may include one or two uplink traffic channel segment assignments, while a flash assignment channel message may include at most one uplink traffic channel segment assignment. In some embodiments, a received uplink segment assignment message 3546 includes a maximum uplink rate option indicator or indicators 3580, with each indicator corresponding to an assigned uplink segment of the message.

System data/information 3550 includes uplink/downlink timing and frequency structure information 3582, uplink data rate used information 3584, base station identification information 3586, indicated maximum uplink rate option/predetermined rate option correspondence information 3588, indicated maximum uplink rate option decoding information 3590, and rate option selection criteria 3591. Uplink data rate used information 3584 includes a plurality of sets of rate option information (rate 1 option information 3594, . . . , rate M option information 3598). Coding information and modulation information is mapped to correspond to each of the rate options supported by the WT 3500. Rate 1 option information 3594 includes coding rate information 3594 and modulation information 3596. For example coding rate information specifies a number of data bits or frames of data bits, a corresponding number of coded bits obtained, and a cod used, while modulation information 3596 identifies a modulation method, e.g., QPSK or QAM 16 with its associated modulation constellation. At least two of the plurality of uplink rate options correspond to coding different numbers of information bits for a given uplink traffic channel segment that may be assigned to WT 3500. At least two of the plurality of uplink rate options correspond to different modulation methods, e.g., QPSK and QAM 16.

Information 3588 includes information linking maximum uplink rate option information with predetermined sets of rate options, e.g., mapping tables or mapping information associating rate option indicator types and/or values with uplink rate options. In some embodiments, correspondence information 3588 may also include information identifying criteria, e.g., signal interference information criteria used to further restrict the received indicated maximum uplink rate option. Indicated maximum uplink rate option decoding information 3590 includes information identifying types of assignment signals with number of bits, e.g., in a field conveying the maximum uplink rate option indicator, and with a modulation method used to convey the assignment signal. For example a flash type assignment channel signal may use a one bit field to convey the maximum rate option indicator and may use a non-coherent modulation scheme, while a regular type assignment channel signal may use a three bit field to convey the maximum rate option indicator and may use a coherent modulation scheme. The flash assignment channel maximum rate option indicator uses fewer bits than the number of bits required to signal to uniquely identify each of the selectable uplink rate options, e.g., one bit is used for the flash maximum rate option indicator, but three bits would be required to uniquely indicate each of the eight uplink rate options supported by the WT. In some embodiments, the WT supports eight uplink data rate options and a first type of assignment can encode a maximum uplink rate option indicator which may convey any of the eight possibilities, while a second type of assignment encodes two possibilities. In some such embodiments, if the assignment signal is of the first type and conveys a maximum rate option indicator indicating the lowest rate, the wireless terminal is effectively assigned to use to lowest rate by the base station for that particular uplink traffic channel segment.

In some embodiments, where the maximum rate option indicator is a 3 bit indicator, the WT includes stored information associating each of the 8 values which can be indicated with information indicating different numbers of information bits to be coded in the segment. For example, the uplink data rate used info 3584 can include 8 sets of information, each set corresponding to a different number of information bits, e.g., user data bits, to be coded for the segment.

Rate option selection criteria 3591 is used by the uplink rate option selection module 3538 to determine the rate option to use less than or equal to the maximum allowed uplink rate option, where the maximum allowed uplink rate option indicates a rate option higher than the lowest rate option supported by the WT 3500. For example, rate option selection criteria 3591 may include criteria based on amounts of uplink data to be communicated, data transmission time urgency information, and/or a service tier level.

Figure 36:
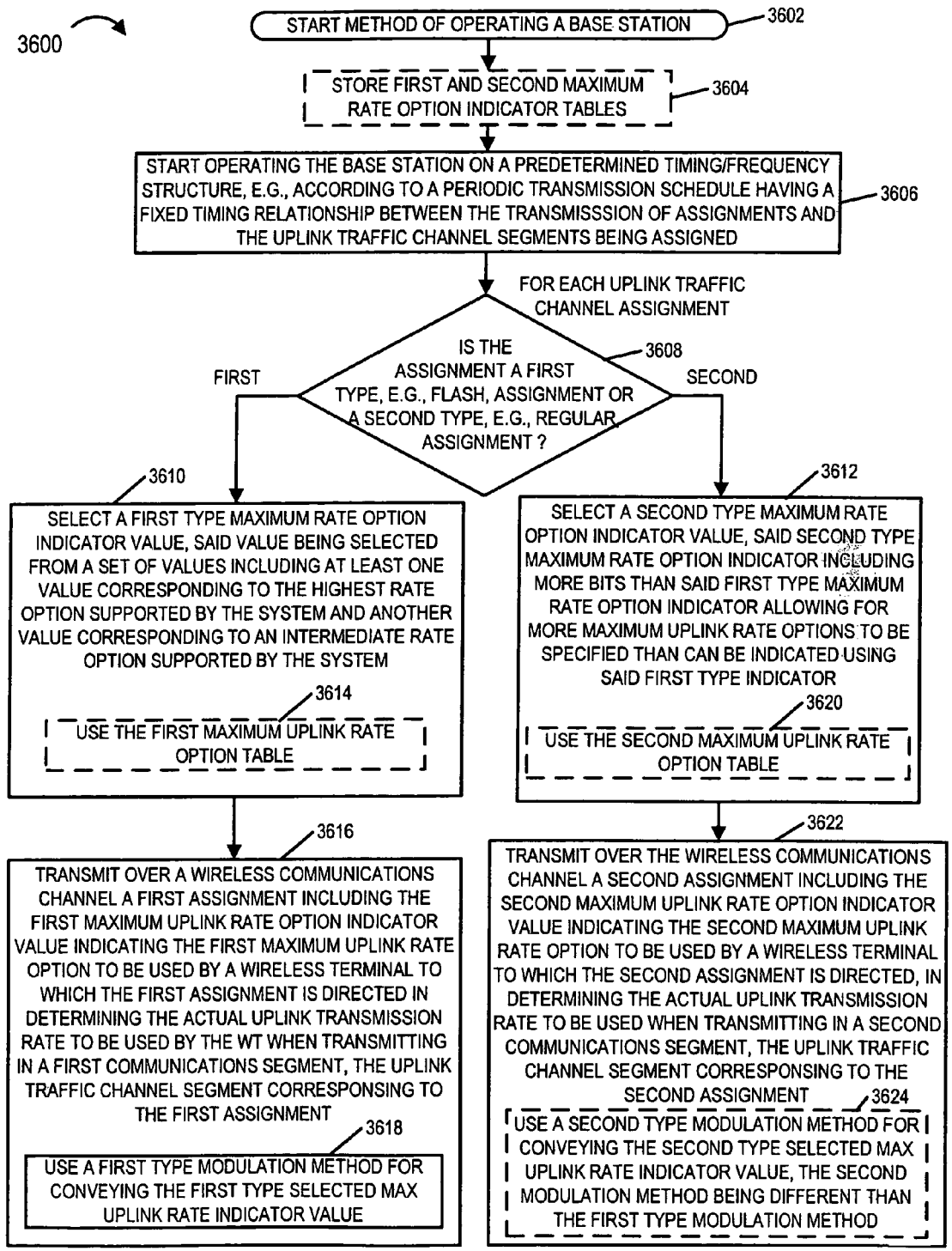
FIG. 36 is a flowchart illustrating an exemplary method, in accordance with the present invention, of operating a base station in a communications system to generate and transmit assignment information indicating the assignment of uplink communications segments, each uplink communications segment having a predetermined duration.

FIG. 36 is a flowchart 3600 illustrating an exemplary method, in accordance with the present invention, of operating a base station in a communications system to generate and transmit assignment information indicating the assignment of uplink communications segments, each uplink communications segment having a predetermined duration. For example, the base station may be a base station in an exemplary OFDM spread spectrum wireless communications system using a plurality of different types uplink traffic channel segments. For example the exemplary system may have an uplink traffic channel using three different types of uplink traffic channel segments: a first type of uplink traffic channel segment using 7 tones for a duration of 112 OFDM symbol transmission time intervals, a second type of uplink traffic channel segment using 14 tones for 56 OFDM symbol transmission time intervals, a third type of uplink traffic channel segment using 28 tones for a duration of 28 OFDM symbol transmission time intervals. Operation starts in step 3602, where the exemplary base station is powered on and initialized, and proceeds to either step 3604 or step 3606.

In some embodiments, the base station uses information from first and second maximum rate option indicator tables, and step 3604 is performed, e.g., during an initialization process of the base station, where the base station stores first and second maximum rate option indicator tables. In some such embodiments, step 3604 is performed once, e.g., when the base station is being configured; while in some other such embodiments, step 3604 is performed once during each turn-on or re-initialization of the base station, e.g., where maximum rate option information is transferred from non-volatile memory into first and second maximum rate option indicator tables in volatile memory. In other embodiments, maximum rate option indicator tables may not be used, e.g., maximum rate option information corresponding to information included in first and second rate option indicator tables can be embedded in a routine or routines.

In step 3606, the base station is controlled to start operating the base station on a predetermined timing/frequency structure, e.g., according to a periodic transmission schedule having a fixed timing relationship between the transmission of assignments and the uplink traffic channel segments being assigned. For example, the base may operate using an uplink timing/frequency structure including an indexed set of uplink traffic channel segments, which repeat on a periodic basis, with each of the indexed uplink traffic channel segments being associated with a particular assignment in the downlink timing and frequency structure. For example, the uplink timing/frequency structure may include a set of seventy-seven indexed (0 . . . 76) uplink traffic channel segments, 28 of which are associated with first type assignments and 49 of which are associated with second type assignments.

Operation proceeds from step 3606 to step 3608. Step 3608 is performed and operational processing further directed for each uplink traffic channel assignment, depending upon the result of step 3608. In step 3608, it is determined whether the assignment is a first type assignment or a second type assignment. For example, first type assignments may be designated as flash type assignments and second type assignments may be designated as regular type assignments; the set of indexed uplink traffic channel segments may be partitioned such that some are associated with first type assignments and some are associated with second assignments. If an assignment is a first type assignment operation proceeds to step 3610, while if an assignment is a second type assignment operation proceeds to step 3612.

In step 3610, the base station is operated to select a first type maximum rate option indicator value, said value being selected from a set of values including at least one value corresponding to the highest rate option supported by the system and another value corresponding to an intermediate rate option supported by the base station. For example an exemplary system may support 8 uplink data rate options (0, 1, 2, 3, 4, 5, 6, 7) for uplink traffic channel segments, with rate option 0 representing the lowest data rate option and rate option 7 representing the highest data rate option, and the first type maximum rate option indicator may be designated as a congestion indicator. The congestion indicator may use one information bit to convey either a value of 1 corresponding to maximum WT uplink data rate option 7 or a value of 0 corresponding to a maximum WT uplink data rate option 3, and the base station may select between the two possibilities. For example, the base station may, for a given first type assignment, select, e.g., a value of 0 corresponding to maximum WT uplink data rate option 3. In some embodiments, step 3610 includes sub-step 3614, where the base station uses the first maximum uplink rate option table. Operation proceeds from step 3610 to step 3616.

In step 3616, the base station transmits over a wireless communications channel a first assignment including the first maximum uplink rate option indicator value indicating the first maximum uplink rate option to be used by a wireless terminal to which the first assignment is directed in determining the actual uplink transmission rate to be used when the wireless terminal is transmitting in a first communications segment. The first communications segment is the uplink traffic channel segment corresponding to the first assignment, the first assignment being a first type assignment, e.g., a flash assignment. For example, the base station may transmit an assignment corresponding to uplink traffic channel segment with index number=3, the assignment including a WT identifier field of 5 bits, and a congestion indicator field of 1 bit. The WT identifier field may include a BS assigned WT ON state identifier, identifying the WT to which the assignment is directed from among the plurality of WTs currently registered with the BS and in the ON state of operation. The congestion indicator may be, e.g., a value of 0 indicating that the maximum WT uplink data rate option that the WT may use for the corresponding uplink traffic channel segment is data rate option 3. The WT receiving the assignment, in some embodiments, uses additional criteria, in further limiting the maximum uplink data rate to use, e.g., generic beacon ratio report information.

Step 3616 includes sub-step 3618. In step 3618, the base station uses a first type modulation method for conveying the first type selected max uplink rate indicator value. For example, the first type selected max uplink rate indicator value may be part of information conveyed in a flash downlink control sub-channel segment used for assigning uplink traffic channel segments, and flash modulation signaling techniques may be used. The flash modulation signaling techniques may use a non-coherent modulation scheme.

Returning to step 3612, in step 3612, the base station is operated to select a second type maximum rate option indicator value, said second type maximum rate option indicator including more bits than said first type maximum rate option indicator allowing for more maximum uplink rate options to be specified than can be indicated using the first type indicator. For example, consider the exemplary system, described with respect to step 3610 supporting 8 uplink data rate options (0, 1, 2, 3, 4, 5, 6, 7) for uplink traffic channel segments, with rate option 0 representing the lowest data rate option and rate option 7 representing the highest data rate option, and consider that second type maximum rate option indicator may be designated as a rate option in the assignment. The rate option may use three information bit to convey either a value of (0, 1, 2, 3, 4, 5, 6, 7) corresponding to maximum WT uplink data rate option (0, 1, 2, 3, 4, 5, 6, 7), respectively, and the base station may select between the eight possibilities. For example, the base station may, for a given second type assignment, select, e.g., a value of 5 corresponding to maximum uplink data rate option 5. In some embodiments, step 3612 includes sub-step 3620, where the base station uses the second maximum uplink rate option table. Operation proceeds from step 3612 to step 3622.

In step 3622, the base station transmits over a wireless communications channel a second assignment including the second maximum uplink rate option indicator value indicating the second maximum uplink rate option to be used by a wireless terminal to which the second assignment is directed in determining the actual uplink transmission rate to be used when the wireless terminal is transmitting in a second communications segment. The second communications segment is the uplink traffic channel segment corresponding to the second assignment, the second assignment being a second type assignment, e.g., a regular assignment. For example, the base station may transmit an assignment corresponding to uplink traffic channel segment with index number=9, the assignment including a WT identifier field of 5 bits, and a rate option field of 3 bits. The WT identifier field may include a BS assigned WT ON state identifier, identifying the WT to which the assignment is directed from among the plurality of WTs currently registered with the BS and in the ON state of operation. The WT to which the second communications segment is assigned may be the same or a different WT than the WT to which the first communications segment was assigned as referred to in step 3616. The rate option may be, e.g., a value of 5 indicating that the maximum uplink data rate option that the WT may use for corresponding uplink traffic channel segment is data rate option 5.

In some embodiments, step 3622 includes sub-step 3624. In sub-step 3624, the base station uses a second type modulation method for conveying the second type selected max uplink rate indicator value. For example the second type selected max uplink rate indicator value may be part of information conveyed in a regular downlink control sub-channel segment used for assigning uplink traffic channel segments, and using coherent modulation with a QPSK modulation constellation.

In some embodiments, transmitted non-zero modulation symbol values corresponding to the first type modulation method are transmitted at a higher energy level than the transmission energy level of the non-zero modulation symbol values corresponding to the second modulation method. In some embodiments, the per-tone relative transmission power difference is at least 6 dBs, 9 dBs, or 12 dBs. In some embodiments, with regard to the different types of downlink signals transmitted by the base station, only beacon signals are transmitted with higher per-tone relative transmission power than first type assignment signals.

In some embodiments each first type uplink traffic channel assignment, e.g., flash type assignment, may be included as part of a message including at most one first type uplink traffic channel assignment. In some such embodiments, such a message may also include an acknowledgment to an uplink traffic channel segment.

In some embodiments, each second type uplink traffic channel assignment, e.g., regular type assignment, may be included as part of a message including at most one or two uplink traffic channel assignments. In some such embodiments, such a message may also include downlink traffic channel assignment information and/or uplink traffic channel acknowledgment information.

In some embodiments messages conveying first type assignments, e.g., using flash signaling techniques, provide more robust error protection than messages conveying second type assignments, e.g., using non-flash modulation and coding. In some embodiments, some of the air link resources used to convey a message including a first type assignment are used simultaneously by a message including a second type assignment.

Figure 37:
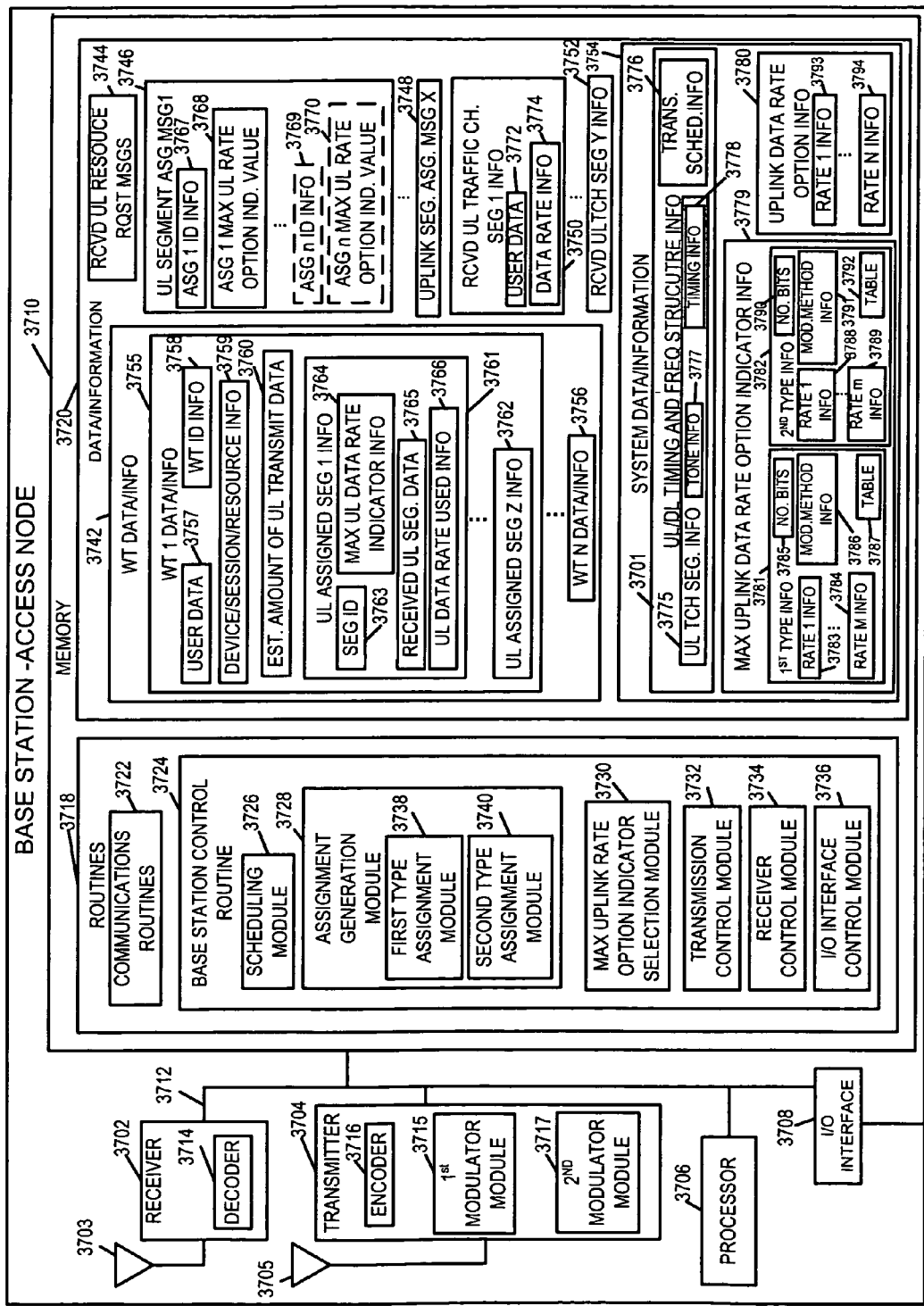
FIG. 37 is a drawing of an exemplary base station implemented in accordance with the present invention and using methods of the present invention.

FIG. 37 is a drawing of an exemplary base station 3700 implemented in accordance with the present invention and using methods of the present invention. Exemplary base station 3700 is sometimes referred to as an access node as it provides access to the network for wireless terminals, e.g., mobile nodes. In some embodiments base station 3700 communicates with WTs via OFDM uplink and downlink signaling. Base station 3700 includes a receiver 3702, a transmitter 3704, a processor 3706, I/O interface 3708 and memory 3710 coupled together via a bus 3712 over which the various elements may interchange data/information.

Receiver 3702 is coupled to receive antenna 3703 via which the BS can receive uplink signals from WTs including resource request messages and uplink traffic channel segment signals. Receiver 3702 includes decoder 3714 for decoding received uplink signals.

Transmitter 3704 is coupled to transmit antenna 3705 via which the BS can transmit downlink signals to WTs including assignment signals, the assignment signals including maximum uplink rate option indicator information. Transmitter 3704 includes an encoder module 3716 for encoding signals prior to transmission. In some embodiments, the same antenna is used for both receiver 3702 and transmitter 3704. Transmitter 3704 also includes a $1^{st}$ modulation module 3715 and a $2^{nd}$ modulation module 3717. $1^{st}$ modulation module 3715 is used to module $1^{st}$ type assignment signals, e.g., flash assignment signals, from first type assignment module 3738 using a first type of modulation, e.g., a non-coherent modulation scheme. $2^{nd}$ modulation module 3717 is used to module $2^{nd}$ type assignment signals, e.g., regular type assignment signals, from second type assignment module 3740 using a second type of modulation, e.g., a coherent modulation scheme using for example, a QPSK constellation. In some embodiments, for the non-zero modulation symbols of a first type assignment signal the per tone average power is higher than the per tone average power of the non-zero modulation symbols of a second type assignment signal.

I/O interface 3708 provides an interface to other network nodes, e.g., other base stations, routers, home agent nodes, AAA server nodes, etc., and/or the Internet. I/O interface 3708 provides connectivity, via a backhaul network, for wireless terminals using BS 3700 as their point of network attachment, to other peer nodes located in other wireless cells in the system and using a different BS as their point of network attachment.

Memory 3710 includes routines 3718 and data/information 3720. The processor 3706, e.g., a CPU, executes the routines 3718 and uses the data/information 3720 in memory 3710 to control the operation of the base station 3700 and implement the methods of the present invention.

Routines 3718 include communications routines 3722 and base station control routine 3724. Communications routines 3722 implement the various communications protocols used by BS 3700. Base station control routine 3724 includes scheduling module 3726, assignment generation module 3728, maximum uplink rate option indicator selection module 3730, transmission control module 3732, receiver control module 3734 and I/O interface module 3736.

Scheduling module 3726, e.g., a scheduler, schedules uplink and downlink segments to wireless terminals including uplink traffic channel segments. Assignment generation module 3728 generates assignment signals to be transmitted, e.g., an uplink assignment including an assignment of an uplink traffic channel segment to a WT and a maximum uplink rate option indicator value indicating a maximum uplink rate option to be used by the wireless terminal to which the segment is assigned in determining an actual uplink data transmission rate to be used when transmitting into the uplink traffic channel communications segment corresponding to the assignment. Assignment generation module 3728 includes a first type assignment module 3738 and a second type assignment module 3740. First type assignment module 3738 is used for generating assignments of a first type, e.g., flash type assignments, where at most one uplink traffic channel segment assignment is included in a flash assignment message, a one bit field conveying the maximum uplink rate option indicator is used, and a non-coherent modulation method is used. Second type assignment module 3740 is used for generating assignments of a second type, e.g., regular type assignments, where one or two uplink traffic channel segment assignments are included in an assignment message, for each uplink assigned segment a three bit field conveys the maximum rate option indicator, and a coherent modulation method is used.

Transmission control module 3732 controls transmitter 3704 operations including controlling the transmission of assignments including maximum rate indicators, e.g., first types of assignments including first type maximum rate indicators and second types of assignments including second type maximum rate indicators, according to a predetermined periodic transmission schedule having a fixed timing relationship to the uplink traffic channel segments being assigned. In some embodiments, the uplink traffic channel is partitioned into a number of indexed uplink traffic channel segments, and some are associated with first type assignments while others are associated with second type assignments.

Receiver control module 3734 controls operations of receiver 3702. I/O interface control module 3736 controls operation of I/O interface 3708.

Data/information 3720 includes WT data/information 3742, received uplink resource request messages 3744, uplink segment assignment messages (uplink segment assignment message 1 3746, . . . , uplink segment assignment message X 3748), received uplink traffic channel segment information (received uplink traffic channel segment 1 information 3750, received uplink traffic channel segment Y information 3752), and system data/information 3754. WT data/information 3742 includes a plurality of sets of WT data/information, e.g., corresponding to WTs currently registered with BS 3700 (WT 1 data/information 3755, WT N data/information 3756). WT 1 data/info 3755 includes user data 3757, e.g., user data corresponding to voice, video, text, files, etc., WT identification information 3758, e.g., a BS assigned WT identifier, device/session/resource info 3759, e.g., device identification information of WT 1, session information identifying peer nodes and routing information, and uplink and downlink traffic channel segments assigned to WT 1. WT 1 data/info 3755 also includes an estimate of uplink transmit data 3760 corresponding to WT 1, e.g., based on received resource requests and allocated uplink traffic channel segment assignments, and, if assigned, one or more sets of uplink assigned segment information (uplink assigned segment 1 information 3761, . . . , uplink assigned segment Z information 3762). Uplink assigned segment 1 information 3761 includes segment identification information 3763, maximum uplink data rate indicator information 3764, received uplink segment data 3765, and uplink data rate used information 3766. Segment identification information 3763 is, e.g., an uplink segment index identifier identifying the uplink segment within the uplink timing and frequency structure. Maximum uplink data rate indicator information 3764 includes, e.g., a maximum uplink rate option, an assignment type, and an indicator value. Receive uplink segment data 3765 includes the coded and/or decoded user data corresponding to the uplink traffic channel segment. Uplink data rate used option 3766 is the uplink data rate which the WT used, e.g., WT selected to use, for the uplink traffic channel segment, the rate used being less than or equal to the maximum uplink data rate-indicated by information 3764 and the WT used rate being recovered by the BS from the received uplink traffic channel segment signals.

Received uplink resource request messages 3744 are received messages from WTs for uplink traffic channel segments, e.g., requesting uplink traffic channel segments or indicating amounts of uplink data needed to be communicated. In some embodiments, some of the uplink segment assignment messages 3746, 3748 have different formats, e.g., with first, e.g., flash type, and second, e.g., regular type, of assignments having different formats. In some embodiments, some of the second type of assignments messages have different formats, e.g., with one or two uplink segment assignments being included in a message. Uplink segment assignment message 3746 includes assignment 1 identification information 3767 and a corresponding maximum uplink rate option indicator value 3768, indicating the maximum uplink rate option that the assigned WT may use for the corresponding uplink traffic channel segment. In some embodiments, at least some of the assignments messages include assignments for more than one uplink traffic channel segment. For example, uplink segment assignment message 1 may include assignment n ID information 3769 and corresponding assignment n maximum uplink rate option indicator value 3770. Received uplink traffic channel segment 1 information 3750 includes user data 3772 and corresponding data rate information 3774, e.g., identifying the data rate used for the segment where the data rate used identifies the coding rate and the modulation method used for the user data of the segment.

System data/information 3754 includes uplink and downlink timing and frequency structure information 3701, maximum uplink data rate option indicator information 3779, and uplink data rate option information 3780. Uplirk and downlink timing and frequency structure information 3701 includes uplink traffic channel segment information 3775 and transmission scheduling information 3776. Uplink traffic segment information 3775 includes tone information 3777 and timing information 3778. Each communications segment, e.g., each uplink OFDM uplink traffic channel communication segment, includes multiple tones used for a plurality of OFDM symbol transmission time periods. In some embodiments, each uplink traffic channel segment in the uplink timing and frequency structure uses predetermined logical tones which are frequency hopped in accordance with a predetermined uplink tone hopping sequence. Each of the uplink traffic channel segments, in the uplink timing and frequency structure has a predetermined duration. In some embodiments, at least some uplink traffic channel segments have different predetermined durations. In some embodiments, each of the uplink traffic channel segments in the uplink timing and frequency structure has the same number of basic transmission units, e.g., tone-symbols. For example, one type of uplink traffic channel segment may be allocated a first number of tones (N1) for a first number of OFDM transmission time intervals (N2), and a second type of uplink traffic channel segment may be allocated a second number of tones (N3) for a second number of OFDM transmission time intervals (N4), where N1, N2, N3, N4 are positive integers, where N1>N3, where N4>N2, and where N1×N2 N3×N4. Transmission scheduling information 3776 includes information identifying a predetermined periodic transmission schedule having a fixed timing relationship between each of the uplink traffic channel segments and the assignments.

Maximum uplink data rate option indicator information 3779 includes a $1^{st}$ type of maximum uplink data rate option indicator information 3781 and a $2^{nd}$ type of maximum uplink data rate option indicator information 3782. 1st type information 3781 corresponding to first type assignment module 3738 and $1^{st}$ modulation module 3715 includes a plurality of rate option information (rate 1 information 3783, . . . , rate M info 3784, a number of bits 3785, modulation method information 3786, and a maximum uplink data rate option indicator table 3787. For example, the WT may support 8 uplink rate options, the number of bits 3785 for a $1^{st}$ type maximum rate option indicator field may be one permitting two rates to be identified, e.g., rate 1 information with an indicator bit value of zero may correspond to rate option 3, an intermediate rate option level, and rate M information with an indicator bit value of 1 may correspond to rate option 7, the highest rate option; the modulation method information may identify a non-coherent modulation method using a combination of zero and non-zero QPSK modulation symbols mapped to the assignment segment tone-symbols. First rate option indicator table 3787, including at least some of information 3783, 3784, 3785, 3786, is included in some embodiments, and is used by first type assignment module 3738 in generating first type indicator assignments.

$2^{nd}$ type information 3782 corresponding to second type assignment module 3740 and $2^{nd}$ modulation module 3717 includes a plurality of rate option information (rate 1 information 3788, . . . , rate m info 3789, a number of bits 3790, modulation method information 3791, and a maximum uplink data rate option indicator table 3792. For example, the WT may support 8 uplink rate options, the number of bits for a $2^{nd}$ type maximum rate option indicator field may be three permitting each of the supported uplink rates to be identified, e.g., rate 1 information with indicator bit values of (000) may correspond to rate option 0 which is the lowest rate option, rate information 2 with indicator bit values of (001) may correspond to rate option 1, . . . , rate option m with indicator bit values of (111) may correspond to rate option 7 which is the highest rate option; the modulation method information may identify a conventional coherent modulation method, e.g., using a QPSK modulation constellation. Second rate option indicator table 3792, including at least some of information 3788, 3789, 3790, 3791, is included in some embodiments, and is used by second type assignment module 3740 in generating second type indicator assignments. In some embodiments, second rate option indicator table 3792 includes each supported rate option.

Uplink data rate option information 3780 includes information corresponding to each of the uplink data rate options supported by the WT (rate 1 information 3793, . . . , rate N option information 3794) for uplink traffic channel segment communications. Each set of data rate option information (3793, 3794) corresponds to a coding rate and modulation method used. In some embodiments, at least two of the data rate options use different coding rates. In some embodiments, at least two of the data rate options use different modulation methods, e.g., QPSK and QAM16.

This application is directed to numerous methods and apparatus which can be used to implement a communications system. In various embodiments one or more features described with respect to an exemplary embodiment may be combined with one or more features described with respect to another exemplary embodiment.

While described in the context of an OFDM system, many of the methods and apparatus of the present invention, are applicable to a wide range of communications systems including many non-OFDM and/or non-cellular systems.

In various embodiments nodes described herein are implemented using one or more modules to perform the steps corresponding to one or more methods of the present invention, for example, selecting a maximum uplink data transmission rate, transmitting a maximum uplink data rate indicator, estimating interference levels, selecting an uplink data rate to use, encoding uplink data rate information with user data/info, recovering uplink data rate information, etc. In some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

What is claimed is:

1. A method of operating a wireless terminal comprising:
receiving an uplink traffic channel segment assignment of a corresponding uplink traffic channel segment to said wireless terminal, said uplink traffic channel segment assignment including a maximum uplink rate option indicator, said maximum uplink rate option indicator including a value which can be used to determine an indicated maximum uplink rate option;
determining the indicated maximum uplink rate option from said value included in said maximum uplink rate option indicator and additional information known to said wireless terminal, said value corresponding to multiple possible maximum uplink rate options, said additional information including information indicating which one of a plurality of assignment channels, used to communicate unlink traffic channel segment assignments, said uplink traffic channel segment assignment was received in; and transmitting data in the assigned uplink traffic channel segment in accordance with one of a plurality of rate options corresponding to said indicated maximum uplink rate option.

2. The method of claim 1, wherein said additional information further includes interference information transmitted by said wireless terminal; and wherein determining the indicated maximum uplink rate option from said value included in said maximum uplink rate option indicator and additional information known to said wireless terminal includes:

distinguishing between a plurality of possible maximum uplink rate options to which said value included in same maximum uplink rate option indicator may correspond based on said interference information to thereby determine the indicated maximum uplink rate option.

3. The method of claim 2, wherein said interference information is a beacon ratio report.

4. The method of claim 1, further comprising:

selecting the one of the plurality of rate options from a plurality of predetermined rate options corresponding to said indicated maximum uplink rate option, prior to performing said transmitting step.

5. The method of claim 4, further comprising:

storing information indicating a mapping between each of said plurality of rate options and an encoding method, at least two of the plurality of rate options corresponding to coding different numbers of information bits in the assigned segment.

6. The method claim 4, further comprising:

storing information indicating a mapping between each of said plurality of rate options and a modulation method.

7. The method of claim 6, wherein at least two of said plurality of rate options corresponds to different modulation methods.

8. The method of claim 7, wherein said different modulation methods include QPSK and QAM16.

9. The method of claim 4, further comprising:

receiving additional traffic channel, segment assignments from a base station indicating assignments of additional traffic channel segments to said wireless terminal, each of said additional traffic channel segment assignments include a maximum uplink rate option indicator, said base station being the same base station which transmitted said uplink traffic channel segment assignment.

10. The method of claim 9, wherein at least one of said additional traffic channel segment assignments includes a maximum uplink rate option indicator that corresponds to a single predetermined uplink rate option.

11. The method of claim 10, further comprising:

transmitting in a traffic channel segment corresponding to said at least one of said additional traffic channel segment assignments in accordance with the single predetermined rate option.

12. The method of claim 11, wherein said single predetermined rate option corresponds to the lowest traffic channel uplink data rate option which can be indicated by the maximum uplink rate option indicator.

13. The method of claim 12, further comprising:

storing modulation information indicating that QPSK modulation should be used when transmitting data in a traffic channel for which use, of the lowest rate option is indicated.

14. The method of claim 9, wherein at least 8 different maximum uplink rate options can be indicated.

15. The method of claim 14, wherein said maximum uplink rate option indicator is a 3 bit indicator and wherein said wireless terminal includes information associating each of the 8 values which can be indicated with information indicating different numbers of information bits to be coded into the segment.

16. The method of claim 15, wherein the maximum uplink rate option indicator is communicated as part of an OFDM signal.

17. The method of claim 1, wherein the maximum uplink rate option indicator is communicated in the received signal using fewer bits than the number of bits required to signal to uniquely identify each of the selectable uplink rate options.

18. The method of claim 1, wherein the maximum uplink rate option indicator is a single bit if it was communicated using a first assignment channel and 3 bits if it is communicated using a second assignment channel, the single bit single being communicated using non-coherent modulation, the 3 bits being communicated using coherent modulation.

19. The method of claim 1, wherein said additional information is information that indicates whether the maximum uplink rate option indicator was received in a first assignment channel or another assignment channel, uplink traffic channel segment assignment signals received in the first assignment channel being communicated using non-coherent modulation, uplink traffic channel segment assignment signals received in the another assignment channel being communicated using coherent modulation.

20. A method of operating a wireless terminal comprising:

receiving an uplink traffic channel segment assignment of a corresponding uplink traffic channel segment to said wireless terminal, said uplink traffic channel segment assignment including a maximum uplink rate option indicator, said maximum uplink rate option indicator including a value which can be used to determine an indicated maximum uplink rate option;

determining the indicated maximum uplink rate option from said value included in said maximum uplink rate optibn indicator and additional information known to said wireless terminal, said additional information including information indicating which one of a plurality of assignment channels said uplink traffic channel segment assignment was received in;

transmitting data in the assigned uplink traffic channel segment in accordance with one of a plurality of rate options corresponding to said indicated maximum uplink rate option; and wherein said additional information is information indicating whether the maximum uplink rate option indicator was received in a first or second assignment channel, uplink traffic channel segment assignment signals received in the first assignment channel being communicated using non-coherent modulation, uplink traffic channel segment assignment signals received in the second assignment channel being communicated using coherent modulation.

21. A method of operating a wireless terminal comprising:

receiving an uplink traffic channel segment assignment of a corresponding uplink traffic channel segment to said wireless terminal, said uplink traffic channel segment assignment including a maximum uplink rate option indicator, said maximum uplink rate option indicator including a value which can be used to determine an indicated maximum uplink rate option;

determining the indicated maximum uplink rate option from said value included in said maximum uplink rate option indicator and additional information known to said wireless terminal, said additional information including information indicating which one of a plurality of assignment channels said uplink traffic channel segment assignment was received in;

transmitting data in the assigned uplink traffic, channel segment in accordance with one of a plurality of rate options corresponding to said indicated maximum uplink rate option; and wherein said additional information is information indicating whether the maximum uplink rate option indicator was received in a first or second assignment channel, uplink traffic channel segment assignment signals received in the first assignment channel including multiple bits used to communicate said value, uplink traffic channel segment assignment signals received in the second channel being single bit assignment signals;

wherein when said uplink traffic channel segment assignment signal is received in the first assignment channel, determining the indicated maximum uplink rate option from said value includes determining the maximum uplink rate option indicator from a direct one to one mapping between said value and one of a plurality of possible uplink rate options which may be indicated; and wherein when said uplink traffic channel segment assignment signal is received in the second assignment channel, determining the indicated maximum uplink rate option from said value includes determining the maximum uplink rate option indicator from one of a plurality of possible uplink rate options to which said value may map based on a report generated by said wireless terminal.

22. A wireless terminal comprising:
a receiver for receiving an uplink traffic channel segment assignment of a corresponding uplink traffic, channel segment to said wireless terminal, said uplink traffic channel segment assignment including a maximum uplink rate option indicator, said maximum uplink rate option indicator including a value which can be used to determine an indicated maximum uplink rate option;
a determination module for determining the indicated maximum uplink rate option from said value included in said maximum uplink rate option indicator and additional information known to said wireless terminal, said value corresponding to multiple possible maximum uplink rate options, said additional information including information indicating which one of a plurality of assignment channels, used to communicate uplink traffic channel segment assignments, said uplink traffic channel segment assignment was received in; and
a transmitter for transmitting data in the assigned uplink traffic channel segment in accordance with one of a plurality of rate options corresponding to said indicated maximum uplink rate option.

23. The wireless terminal of claim 22, wherein the maximum uplink rate option indicator is a single bit if it was communicated using a first assignment channel and 3 bits if it is communicated using a second assignment channel, the single bit single being communicated using non-coherent modulation, the 3 bits being communicated using coherent modulation.

24. The wireless terminal of claim 22, further comprising:
a selection module for selecting the one of the plurality of rate options from a plurality of predetermined rate options corresponding to said indicated maximum uplink rate option, prior to transmitting data in the assigned uplink traffic channel segment in accordance with the one of a plurality of rate options.

25. The wireless terminal of claim 24, further comprising:
stored information indicating a mapping between each of said plurality of rate options and an encoding method, at least two of the plurality of rate options corresponding to coding different numbers of information bits in the assigned segment.

26. The wireless terminal of claim 24, further comprising:
additional stored information indicating a correspondence between each of said plurality of rate options and a modulation method.

27. The wireless of claim 26, wherein at least two of said plurality of rate options corresponds to different modulation methods.

28. The wireless terminal of claim 27, wherein said different modulation methods include QPSK and QAM16.

29. The wireless terminal of claim 24, further comprising:
said receiver including means for processing additional received traffic channel segment assignments from a base station indicating assignments of additional traffic channel segments to said wireless terminal, each of said additional traffic channel segment assignments including within the segment assignment maximum uplink rate option indicator, said base station being the same base station which transmitted said uplink traffic channel segment assignment.

30. The wireless terminal of claim 29, wherein at least one of said additional traffic channel segment assignments includes a maximum uplink rate option indicator that corresponds to a single, predetermined uplink rate option.

31. The wireless terminal of claim 30, wherein said transmitter includes:
means for transmitting in a traffic channel segment corresponding to said at least one of said additional traffic channel segment assignments in accordance with the single predetermined rate option.

32. The wireless terminal of claim 31, wherein said, single predetermined rate option corresponds to the lowest traffic channel uplink data rate option which can be indicated by the maximum uplink rate option indicator.

33. The wireless terminal of claim 22, wherein the maximum uplink rate option indicator is communicated in the received signal using fewer bits than the number of bits required to signal to uniquely identify each of the selectable uplink rate options.

34. The wireless terminal of claim 22, wherein the maximum uplink rate option indicator includes one bit if it was communicated using a first signaling method and 3 bits if it is communicated using a second signaling method.

35. A wireless terminal comprising:
a receiver for receiving an uplink traffic channel segment assignment of a corresponding uplink traffic channel segment to said wireless terminal, said uplink traffic channel segment assignment including a maximum uplink rate option indicator, said maximum uplink rate option indicator including a value which can be used to determine an indicated maximum uplink rate option;
a determination module, coupled to said receiver, for determining the indicated maximum uplink rate option from said value included in said maximum uplink rate option indicator and additional information known to said wireless terminal, said additional information including information indicating which one of a plurality of assignment channels said uplink traffic channel segment assignment was received in;

a transmitter for transmitting data in the assigned uplink traffic channel segment in accordance with one of a plurality of rate options corresponding to said indicated maximum uplink rate option;

a data storage device for storing said additional information, said additional information indicating whether the maximum uplink rate option indicator was received in a first or second assignment channel, uplink traffic channel segment assignment signals received in the first assignment channel including multiple bits used to communicate said value, uplink traffic channel segment assignment signals received in the second assignment channel being signal bit assignment signals;

wherein when said uplink traffic channel segment assignment signal is received in the first assignment channel, said determination module determines the indicated maximum uplink rate option from said value by determining the maximum uplink rate option indicator from a direct one to one mapping between said value and one of a plurality of possible uplink rate options which may be indicated; and wherein when said uplink traffic channel segment assignment, signal is received in the second assignment channel, said determination module determines the indicated maximum uplink rate option from said value by determining the maximum uplink rate option indicator from one of a plurality of possible uplink rate options to which said value may map based on a report generated by said wireless terminal.

36. The wireless terminal of claim 35, wherein said data storage device further includes stored interference information.

37. A wireless terminal, comprising:
means for receiving an uplink traffic channel segment assignment of a corresponding uplink traffic channel segment to said wireless terminal, said uplink, traffic channel segment assignment including a maximum uplink rate option indicator, said maximum uplink rate option indicator including a value which can be used to determine an indicated maximum uplink rate option;

means for determining the indicated maximum uplink rate option from said value included in said maximum uplink rate option indicator and additional information known to said wireless terminal, said value corresponding to multiple possible maximum uplink rate options, said additional information including information indicating which one of a plurality of assignment channels, used to communicate uplink traffic channel segment assignments, said uplink traffic channel segment assignment was received in; and means for transmitting data in the assigned uplink traffic channel segment in accordance with one of a plurality of rate options corresponding to said indicated maximum uplink rate option.

38. The wireless terminal of claim 37, further comprising:
means for determining that said received uplink traffic channel segment assignment is an assignment for said wireless terminal from a wireless terminal identifier included in said received assignment.

39. The wireless terminal of claim 37, wherein said additional information is information indicating whether the maximum uplink rate option indicator was received in a first or second assignment channel, uplink traffic channel segment assignment signals received in the first assignment channel being communicated using non-coherent modulation, uplink traffic channel segment assignment signals received in the second assignment channel being communicated using coherent modulation.

40. The wireless terminal of claim 37, wherein the maximum uplink rate option indicator is a single bit if it was communicated using a first assignment channel and 3 bits if it is communicated using a second assignment channel, the single bit single being communicated using non-coherent modulation, the 3 bits being communicated using coherent modulation.

41. A device comprising a processor configured to control a wireless terminal to:
receive an uplink traffic channel segment assignment of a corresponding uplink traffic channel segment to said wireless terminal, said uplink traffic channel segment assignment including a maximum uplink rate option indicator, said maximum uplink rate option indicator including a value which can be used to determine an indicated maximum uplink rate option;

determine the indicated maximum uplink rate option from said value included in said maximum uplink rate option indicator and additional information known to said wireless terminal, said value corresponding to multiple possible maximum uplink rate options, said additional information including information indicating which one of a plurality of assignment channels, used to communicate uplink traffic channel segment assignments, said uplink traffic channel segment assignment was received in; and transmit data in the assigned uplink traffic channel segment in accordance with one of a plurality of rate options corresponding to said indicated maximum uplink rate option.

42. The device of claim 41, wherein the processor is further configured to control a wireless terminal to:
determine that said received uplink traffic channel segment assignment is an assignment for said wireless terminal from a wireless terminal identifier included in said received assignment; and wherein said additional information is information indicating whether the maximum uplink rate option indicator was received in a first or second assignment channel, uplink traffic channel segment assignment signals received in the first assignment channel being communicated using non-coherent modulation, uplink traffic channel segment assignment signals received in the second assignment channel being communicated using coherent modulation.

43. The device of claim 41, wherein the maximum uplink rate option indicator is a single bit if it was communicated using a first assignment channel and 3 bits if it is communicated using a second assignment channel, the single bit single being communicated using non-coherent modulation, the 3 bits being communicated using coherent modulation.

44. A non-transitory machine readable medium embodying machine executable instructions for controlling a wireless terminal, the non-transitory machine readable medium comprising:
instructions for causing said wireless terminal to receive an uplink traffic channel segment assignment of a corresponding uplink traffic channel segment to said wireless terminal, said uplink traffic-channel segment assignment including a maximum uplink rate option indicator, said maximum uplink rate option indicator including a value which can be used to determine an indicated maximum uplink rate option;

instructions for causing said wireless terminal to determine the indicated maximum uplink rate option from said value included in said maximum uplink rate option indicator and additional, information known to said wireless terminal, said value corresponding to multiple possible maximum uplink rate options, said additional information including information indicating which one of a plurality of assignment channels, used to communicate uplink traffic channel segment assignments, said uplink traffic channel segment assignment was received in; and instructions for causing said wireless terminal to transmit data in the assigned uplink traffic channel segment in accordance with one of a plurality of rate options corresponding to said indicated maximum uplink rate option.

45. The non-transitory machine readable medium of claim 44, further comprising:

instructions for causing said wireless terminal to determine that said received uplink traffic channel segment assignment is an assignment for said wireless terminal from a wireless terminal identifier included in said received assignment; and wherein said additional information is information indicating whether the maximum uplink rate option indicator was received in a first or second assignment channel, uplink traffic channel segment assignment signals received in the first assignment channel being communicated using non-coherent modulation, uplink traffic channel segment assignment signals received in the second assignment channel being communicated using coherent modulation.

46. The non-transitory machine readable medium of claim 44, wherein the maximum uplink rate option indicator is a single bit if it was communicated using a first assignment channel and 3 bits if it is communicated using a second assignment channel, the single bit single being communicated using non-coherent modulation, the 3 bits being communicated using coherent modulation.

* * * * *